US009794467B2

(12) United States Patent
Hongu et al.

(10) Patent No.: US 9,794,467 B2
(45) Date of Patent: Oct. 17, 2017

(54) FOCUS ADJUSTMENT APPARATUS, METHOD FOR CONTROLLING FOCUS ADJUSTMENT APPARATUS, AND STORAGE MEDIUM

(71) Applicant: CANON KABUSHIKI KAISHA, Tokyo (JP)

(72) Inventors: Hideyasu Hongu, Tokyo (JP); Makoto Yokozeki, Tokyo (JP); Kazunori Ishii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 189 days.

(21) Appl. No.: 14/527,635

(22) Filed: Oct. 29, 2014

(65) Prior Publication Data
US 2015/0124157 A1  May 7, 2015

(30) Foreign Application Priority Data

Nov. 1, 2013  (JP) .................................. 2013-228317
Nov. 1, 2013  (JP) .................................. 2013-228318

(51) Int. Cl.
G03B 13/00 (2006.01)
H04N 5/232 (2006.01)
G03B 13/36 (2006.01)

(52) U.S. Cl.
CPC ......... *H04N 5/23212* (2013.01); *G03B 13/36* (2013.01)

(58) Field of Classification Search
USPC ......... 348/208.12, 220.1, 345, 348–357, 361
See application file for complete search history.

(56) References Cited

U.S. PATENT DOCUMENTS

2012/0300116 A1* 11/2012 Nakamoto ......... H04N 5/23212
                                                    348/349
2012/0327291 A1* 12/2012 Takeuchi ........... H04N 5/23212
                                                    348/353

(Continued)

FOREIGN PATENT DOCUMENTS

JP    2001-083407 A    3/2001
JP    2012-128316 A    7/2012
JP    2013003486 A     1/2013

(Continued)

*Primary Examiner* — Lin Ye
*Assistant Examiner* — Euel Cowan
(74) *Attorney, Agent, or Firm* — Canon U.S.A., Inc. IP Division

(57) ABSTRACT

A focus adjustment apparatus includes an imaging unit, a first detection unit, a second detection unit, and a control unit. The imaging unit receives and photoelectrically converts a light flux passed through a photographing optical system including a focus lens. The first detection unit detects a phase difference between a pair of image signals output from the imaging unit. The second detection unit detects contrast information from a signal output from the imaging unit. The control unit controls driving of the focus lens based on a detection result of at least one of the first detection unit and the second detection unit. If the detection result of the first detection unit satisfies a first condition, the control unit controls driving of the focus lens by using the detection result of the first detection unit, and changes the first condition according to the contrast information detected by the second detection unit.

15 Claims, 36 Drawing Sheets

(56) References Cited

U.S. PATENT DOCUMENTS

2013/0308040 A1* 11/2013 Ishii ................... H04N 5/3696
348/353
2014/0016021 A1* 1/2014 Uchida ................. G03B 13/36
348/353

FOREIGN PATENT DOCUMENTS

| JP | 2013-025129 A | 2/2013 |
| JP | 2013029803 A | 2/2013 |
| WO | 2012133413 A1 | 10/2012 |

* cited by examiner

FIG.2A

PIXEL CONFIGURATION OF NON-IMAGING SURFACE PHASE-DIFFERENCE SYSTEM

| R  | Gr | R  | Gr | R  | Gr | R  | Gr | R  | Gr |
|----|----|----|----|----|----|----|----|----|----|
| Gb | B  | Gb | B  | Gb | B  | Gb | B  | Gb | B  |

FIG.2B

PIXEL CONFIGURATION OF IMAGING SURFACE PHASE-DIFFERENCE SYSTEM

| R A | R B | Gr A | Gr B | R A | R B | Gr A | Gr B | R A | R B | Gr A | Gr B | R A | R B | Gr A | Gr B | R A | R B | Gr A | Gr B |
|-----|-----|------|------|-----|-----|------|------|-----|-----|------|------|-----|-----|------|------|-----|-----|------|------|
| Gb A | Gb B | B A | B B | Gb A | Gb B | B A | B B | Gb A | Gb B | B A | B B | Gb A | Gb B | B A | B B | Gb A | Gb B | B A | B B |

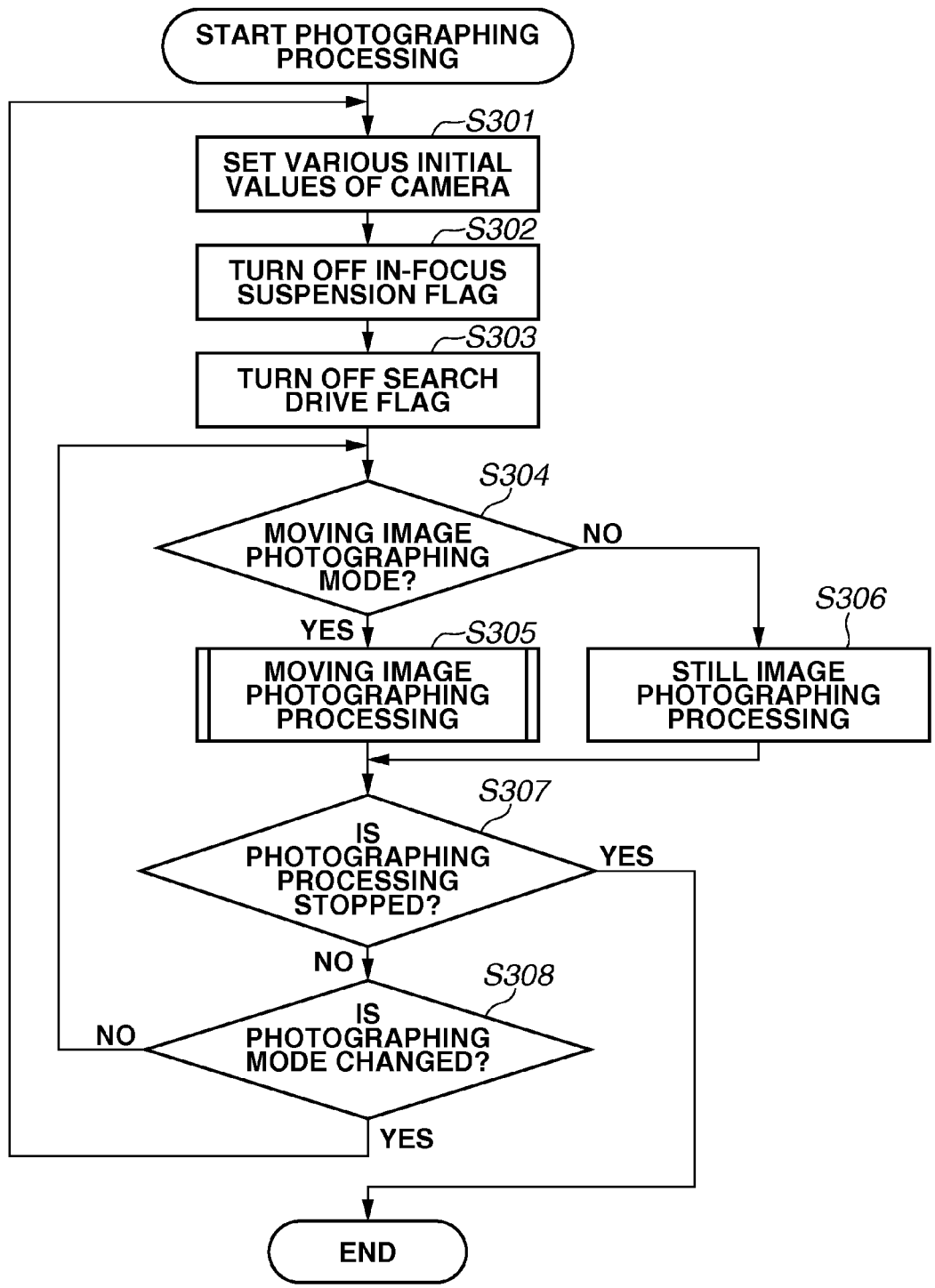

FIG.15B

|  |  | NUMBER OF EFFECTIVE AREAS OF PHASE-DIFFERENCE AF | | | | | | |
|---|---|---|---|---|---|---|---|---|
|  |  | 1 | 2 | 3 | 4 | 5 | 6 | 7 |
| IN-FOCUS DEGREE OF CONTRAST | IN-FOCUS | C | C | P | P | P | P | P |
|  | SMALL BLUR | C | C | C | P | P | P | P |
|  | LARGE BLUR | C | C | C | C | P | P | P |

C: RESULT OF CONTRAST AF IS EFFECTIVE
P: RESULT OF PHASE-DIFFERENCE AF IS EFFECTIVE

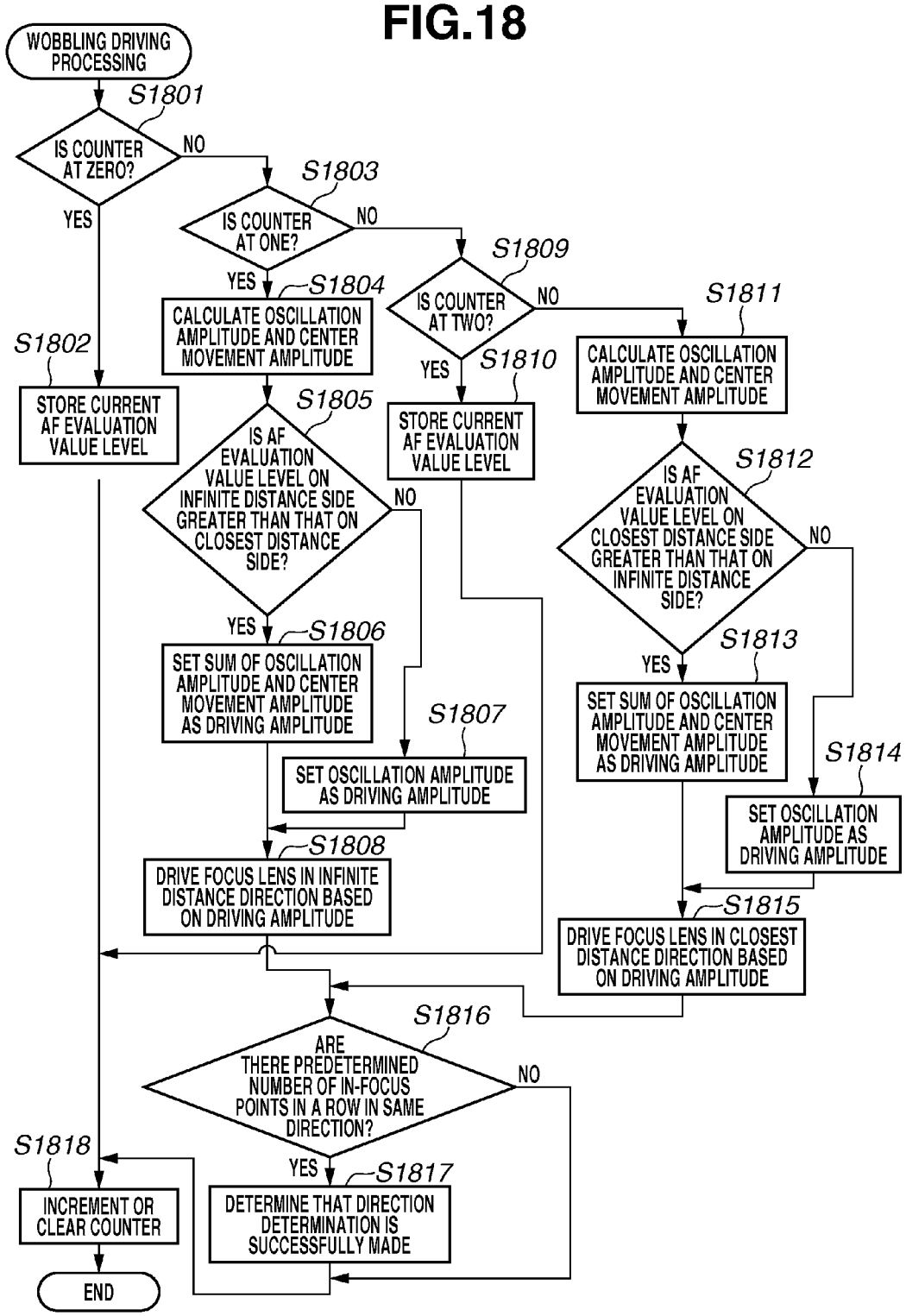

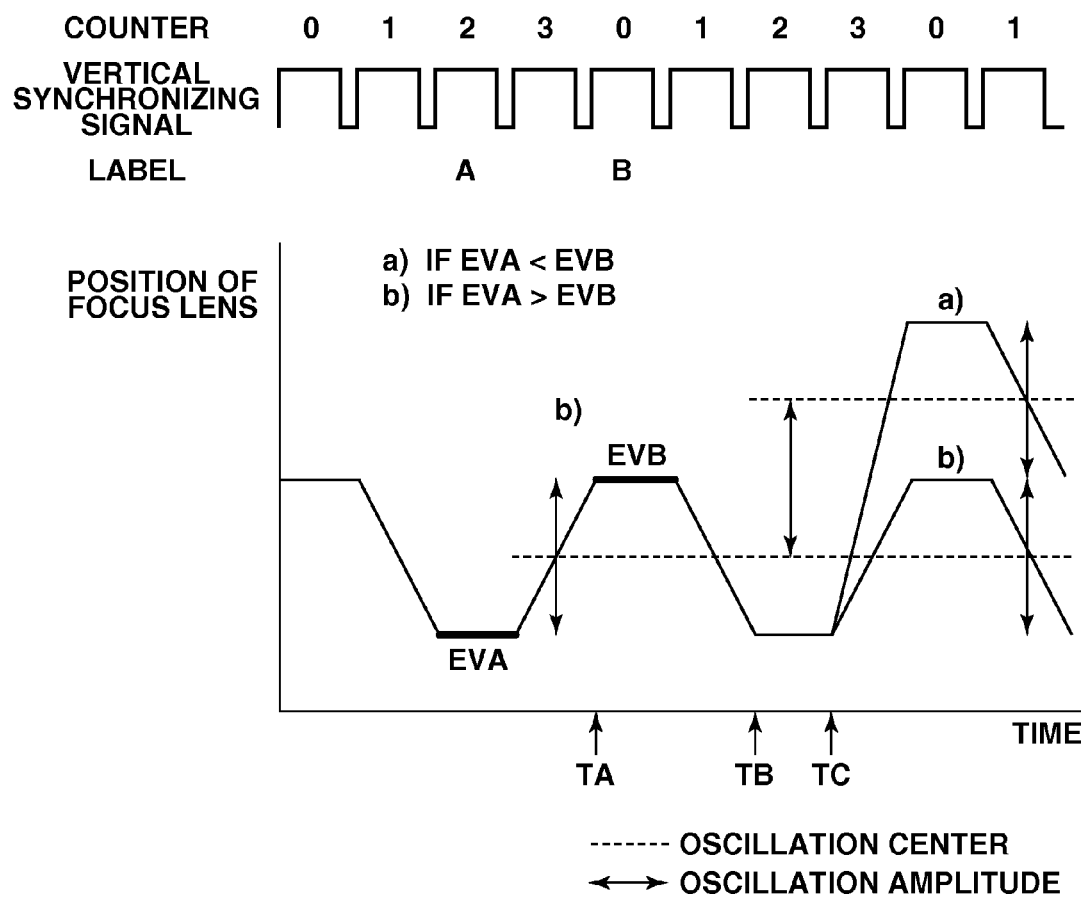

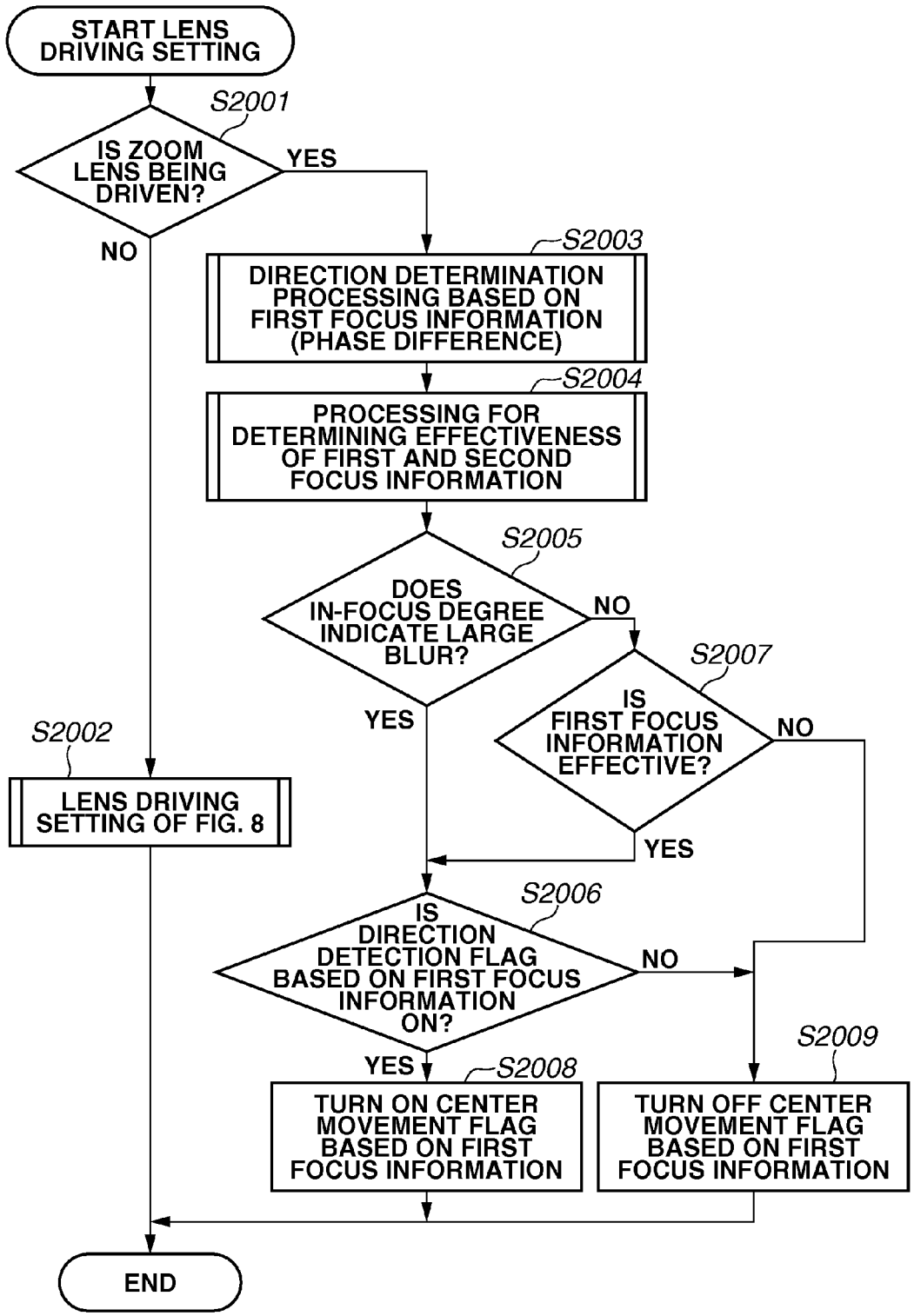

FIG.24B

|  |  | NUMBER OF EFFECTIVE AREAS OF PHASE-DIFFERENCE AF | | | | | | |
|---|---|---|---|---|---|---|---|---|
|  |  | 1 | 2 | 3 | 4 | 5 | 6 | 7 |
| IN-FOCUS DEGREE OF CONTRAST | IN-FOCUS | C | C | C | C | C | C | C/P |
|  | SMALL BLUR | C | C | C | C | C | C/P | C/P |
|  | LARGE BLUR | C/P | C/P | C/P | C/P | C/P | C/P | C/P |

C: RESULT OF CONTRAST AF IS EFFECTIVE
P: RESULT OF PHASE-DIFFERENCE AF IS EFFECTIVE

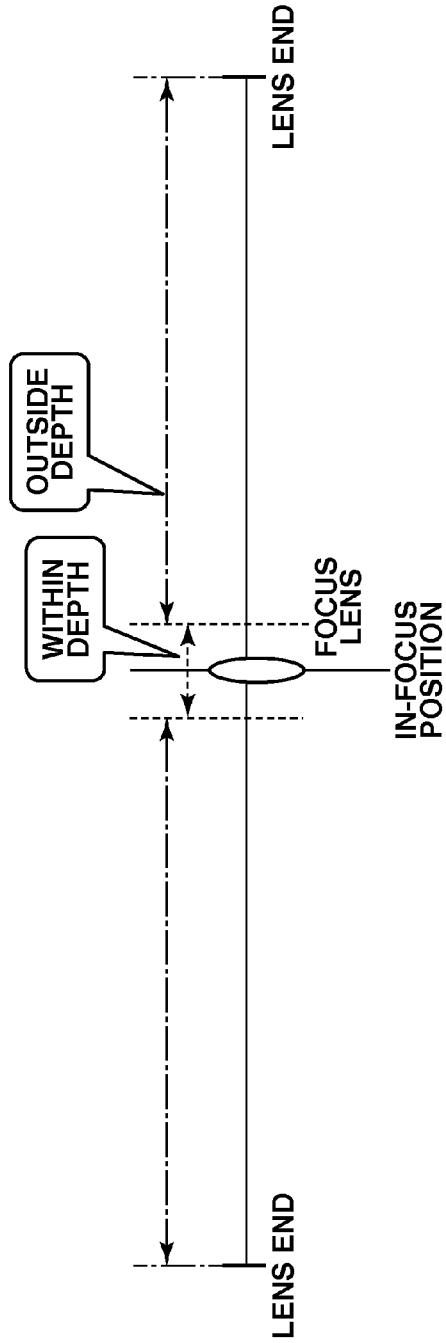

FOCUS ADJUSTMENT APPARATUS, METHOD FOR CONTROLLING FOCUS ADJUSTMENT APPARATUS, AND STORAGE MEDIUM

BACKGROUND OF THE INVENTION

Field of the Invention

The present invention relates to a focus adjustment apparatus equipped with a phase-difference detection method and a contrast detection method.

Description of the Related Art

In imaging apparatuses typified by a single-lens reflex camera, a method for capturing an image while viewing a live view (LV) screen has recently been gaining in great importance. Demand for moving image photographing has been growing in particular. In moving image photographing, it is important that photographing can be performed while viewing a LV screen in a comfortable way.

Various techniques have been discussed as an automatic focusing (AF) method of an imaging apparatus while performing LV. One of the main techniques is a contrast detection method. In the contrast detection method, a contrast evaluation value is generated from an imaging signal obtained by using an image sensor while moving a focus lens. A focus lens position that maximizes the contrast evaluation value is searched for to obtain an in-focus state.

However, according to the contrast detection method, it is not possible to determine with ease the focusing position and direction to put an object into a focus. As a result, the contrast detection method may take on unfavorable behavior, such as taking a long time to focus, mistaking the focusing direction, and passing over the in-focus position. In the moving image photographing in particular, unfavorable behavior is undesirable because all the focusing operations are recorded.

AF methods capable of favorable focusing even during LV photographing have been discussed. Among such methods is an imaging surface phase-difference detection (imaging surface phase-difference AF) method which is a phase-difference detection method performed on an image sensor surface. According to the phase-difference detection method, a defocus amount is calculated from a phase difference between a plurality of image signals obtained by receiving light fluxes which have passed through different exit pupil areas of a photographing optical system. The focus lens is moved by an amount of movement corresponding to the defocus amount, whereby an in-focus state is obtained.

As an imaging surface phase-difference detection method, Japanese Patent Application Laid-Open No. 2001-083407 discusses a method for arranging a plurality of photoelectric conversion elements under the same microlens, in an imaging pixel of an image sensor. In such a configuration, the plurality of photoelectric conversion elements receives light passed through respective different exit pupil areas, whereby focus detection can be performed simultaneously with imaging. Specifically, the outputs of the plurality of photoelectric conversion elements can be compared to perform phase-difference detection AF. By employing the imaging surface phase-difference detection method, even in LV photographing, AF using the phase-difference detection method can be carried out which enables high speed and favorable focusing.

As an imaging surface phase-difference detection method, Japanese Patent Application Laid-Open No. 2013-025129 discusses a configuration in which phase-difference detection AF is performed by arranging a focus detection pixel in an image sensor. Japanese Patent Application Laid-Open No. 2013-025129 further discusses a system combining the imaging surface phase-detection method with a contrast detection method to compensate disadvantages of contrast AF and phase-difference AF and thereby achieve AF of higher quality. For example, according to Japanese Patent Application Laid-Open No. 2013-025129, wobbling driving is performed if no focus detection result by the phase-difference AF is obtained. The focus lens is driven based on a calculation result of either the phase-difference AF or the contrast AF, whichever is earlier obtained.

However, a method for driving a focus lens based simply on a first-calculated result, like Japanese Patent Application Laid-Open No. 2013-025129, has a possibility to erroneously determine the driving direction of the focus lens. For example, if the focus lens is far from the in-focus position (a large blur), the image signals of the imaging surface phase-difference AF tend to become asymmetric. This increases the possibility of failing to identify a clear peak of image matching and calculating an erroneous result. In such a case, even if the result of the phase-difference AF is calculated first, the use of the result of the phase-difference AF carries a high risk and the contrast AF is likely to detect a more reliable focusing direction. However, the method discussed in Japanese Patent Application Laid-Open No. 2013-025129 is not able to determine an appropriate detection result between the phase-difference AF and the contrast AF according to the photographing situation.

As one of characteristic controls when capturing a moving image, the focus lens is stopped after coming into focus and drive again (restart) the focus lens when an object moves or a scene changes. The control of not driving the focus lens when a focus adjustment is not needed can prevent unnecessary focusing. The same applies when AF control is performed by using the phase-difference detection method.

FIGS. 27A and 27B illustrate a photographing scene where a person, a tree, and a mountain are included as objects. The objects illustrated in solid lines represent an in-focus state. The objects illustrated in broken lines represent an out-of-focus state. The left half of FIG. 27A illustrates a state where all the objects on the screen are out of focus. In such a case, the focus should be immediately adjusted to objects (person and tree) as illustrated in the right half. The left half of FIG. 27B illustrates a state where some objects (person and tree) are already in an in-focus state. In such a case, as illustrated in the right half, the focus lens should be controlled to stop without a restart if the scene does not change.

Japanese Patent Application Laid-Open No. 2012-128316 discuses a method for performing a restart determination while the focus lens is stopped, based on focus detection information of a phase-difference detection method obtained by an exterior measurement sensor, focus detection information of a contrast detection method, and waveform information of the phase-difference detection method.

According to Japanese Patent Application Laid-Open No. 2012-128316, the focus lens is immediately restarted once the focus detection result of the phase-difference detection method exceeds a determination threshold when an AF evaluation value varies. For example, the AF evaluation value can vary when another object comes into the detection area of the AF evaluation value. As a result, even if the main object is in the in-focus state at the current focus position, the focus lens can be needlessly restarted to cause blurring. Further, the AF evaluation value is less likely to change in low-luminance situations. In such situations, by the determination method according to Japanese Patent Application Laid-Open No. 2012-128316, the focus lens may fail to restart even if the scene changes.

SUMMARY OF THE INVENTION

The present invention is directed to a focus adjustment apparatus which can use a more appropriate detection result according to a photographing situation in a system using both imaging surface phase-difference AF and contrast AF.

According to a first aspect of the present invention, a focus adjustment apparatus includes an imaging unit configured to receive and photoelectrically convert a light flux passed through a photographing optical system including a focus lens, a first detection unit configured to detect a phase difference between a pair of image signals output from the imaging unit, a second detection unit configured to detect contrast information from a signal output from the imaging unit, and a control unit configured to control driving of the focus lens based on a detection result of at least one of the first detection unit and the second detection unit, wherein, if the detection result of the first detection unit satisfies a first condition, the control unit is configured to control the driving of the focus lens by using the detection result of the first detection unit, and to change the first condition according to the contrast information detected by the second detection unit.

According to a second aspect of the present invention, a focus adjustment apparatus includes an imaging unit configured to receive and photoelectrically convert a light flux passed through a photographing optical system including a focus lens, a first detection unit configured to detect a phase difference between a pair of image signals output from the imaging unit, a second detection unit configured to detect contrast information from a signal output from the imaging unit, and a control unit configured to control driving of the focus lens based on a detection result of at least one of the first detection unit and the second detection unit, wherein, in a state where the focus lens is stopped, the control unit is configured to determine whether the detection result of the first detection unit satisfies a second condition to restart the focus lens, and to change the second condition according to the contrast information detected by the second detection unit.

Further features of the present invention will become apparent from the following description of exemplary embodiments with reference to the attached drawings.

BRIEF DESCRIPTION OF THE DRAWINGS

FIG. 2A is a diagram illustrating a pixel configuration of an imaging surface phase-difference method, and FIG. 2B is a diagram illustrating a pixel configuration of an imaging surface phase-difference method according to the present exemplary embodiment.

FIG. 3 is a flowchart illustrating photographing processing according to the present exemplary embodiment.

FIGS. 15A and 15B are a flowchart and a chart illustrating effectiveness determination processing according to the first exemplary embodiment.

FIG. 18 is a flowchart illustrating wobbling driving processing according to the first exemplary embodiment.

FIG. 19 is a conceptual diagram illustrating the wobbling driving processing according to the present exemplary embodiment.

FIG. 20 is a flowchart illustrating lens driving setting processing during zooming according to a second exemplary embodiment.

FIGS. 24A and 24B are a flowchart and a chart illustrating effectiveness determination processing during zooming according to the second exemplary embodiment.

FIGS. 28A and 28B are diagrams illustrating restart conditions according to the third exemplary embodiment.

DESCRIPTION OF THE EMBODIMENTS

Various exemplary embodiments, features, and aspects of the invention will be described in detail below with reference to the drawings.

The exemplary embodiments described below are just a few examples of means for carrying out the present invention. The present invention is not limited to the following exemplary embodiments.

Figure 1:
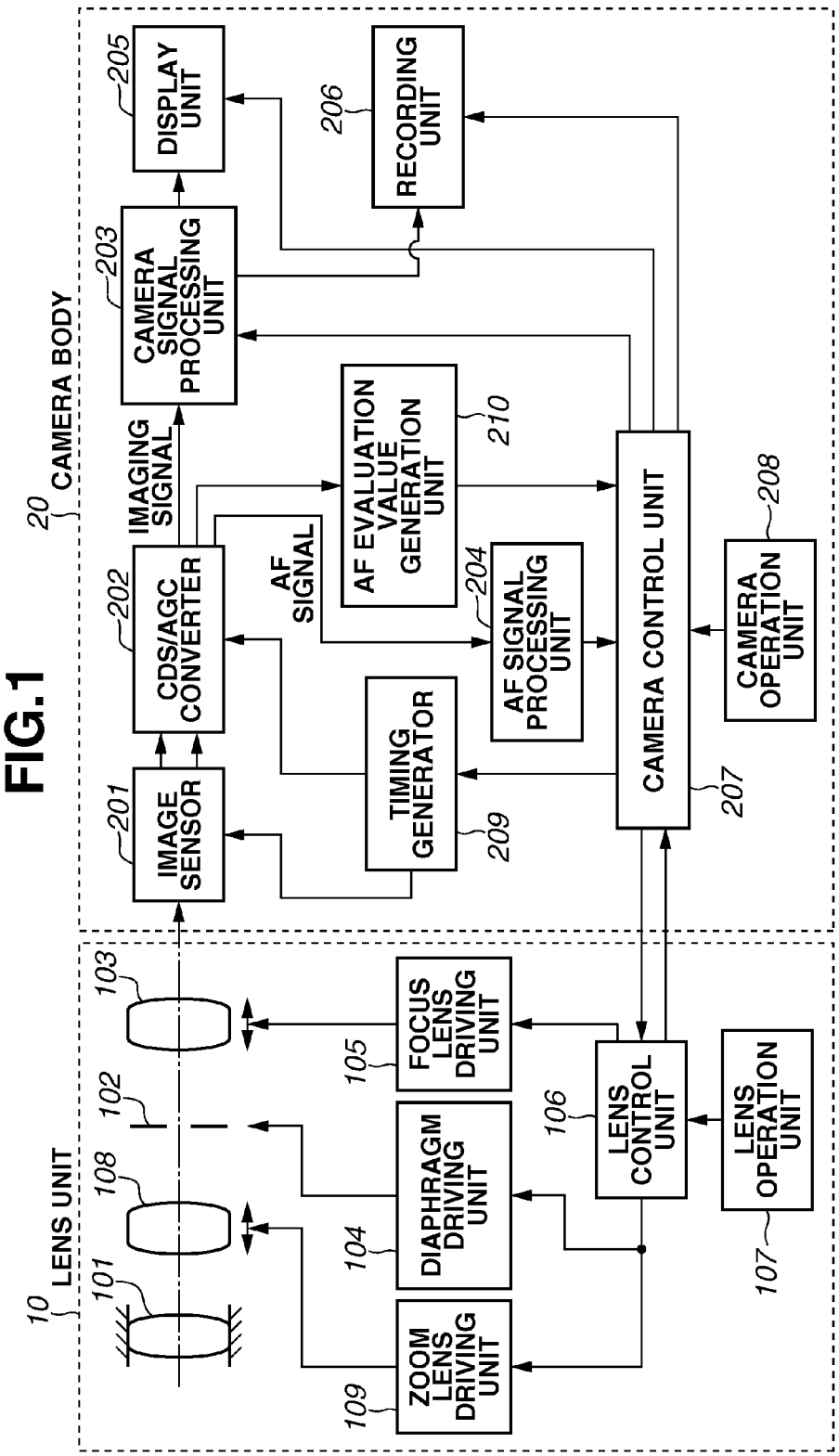
FIG. 1 is a block diagram illustrating a configuration of a camera body and a lens unit according to a first exemplary embodiment.

FIG. 1 is a block diagram illustrating a configuration of an interchangeable-lens camera including a lens unit and a camera body according to a first exemplary embodiment. As illustrated in FIG. 1, a camera system according to the present exemplary embodiment includes a lens unit 10 and a camera body 20. A lens control unit 106 controls operation of the entire lens unit 10 in a comprehensive manner. A camera control unit 207 controls operation of the entire camera. The lens control unit 106 and the camera control unit 207 communicate data with each other.

A configuration of the lens unit 10 will initially be described. The lens unit 10 includes a photographing optical system including a stationary lens 101, a zoom lens 108, a diaphragm 102, and a focus lens 103. A diaphragm driving unit 104 drives the diaphragm 102 to control the amount of light incident on an image sensor 201 to be described below. A focus lens driving unit 105 drives The focus lens 103 for focus adjustment. A zoom lens driving unit 109 drives the zoom lens 108 for zoom adjustment. In the present exemplary embodiment, the zoom lens 108 and the zoom lens driving unit 109 are not indispensable components.

The lens control unit 106 controls the diaphragm driving unit 104, the focus lens driving unit 105, and the zoom lens driving unit 109 to determine an aperture amount of the diaphragm 102 and the positions of the focus lens 103 and the zoom lean 108. If the user performs a focus or zoom operation via a lens operation unit 107, the lens control unit 106 performs control according to the user operation. The lens control unit 106 controls the diaphragm driving unit 104, the focus lens driving unit 105, and the zoom lens driving unit 109 according to control instructions and control information received from the camera control unit 207 to be described below. The lens control unit 106 transmits lens information to the camera control unit 207.

Next, a configuration of the camera body 20 including an automatic focus adjustment apparatus according to the present exemplary embodiment will be described. The camera body 20 is configured to be able to obtain an imaging signal from a light flux passed through the photographing optical system of the lens unit 10. The image sensor 201 includes a charge-coupled device (CCD) or complementary metal oxide semiconductor (CMOS) sensor. The light flux passed through the photographing optical system forms an image on a light receiving surface of the image sensor 201. The formed object image is converted (photoelectrically converted) by photodiodes into electrical charges according to the amount of incident light. The charges stored in the respective photodiodes are read from the image sensor 201 in succession as voltage signals according to the charges, based on drive pulses given from a timing generator 209 according to a command from the camera control unit 207.

An image sensor that does not support a focus adjustment of the imaging surface phase-difference method (hereinafter, referred to as imaging surface phase-difference AF) may have, for example, a Bayer-array pixel configuration as illustrated in FIG. 2A. To perform imaging surface phase-difference AF, the image sensor 201 according to the present exemplary embodiment includes a plurality (two, in the present exemplary embodiment) of photodiodes (photoelectric conversion elements) in each pixel as illustrated in FIG. 2B. The light flux is divided by a microlens to form images on the two photodiodes, so that two types of signals for imaging and AF can be obtained. A signal obtained by adding the signals of the two photodiodes (A+B) serves as an imaging signal. The signals of the respective photodiodes (A and B) serve as two AF image signals. The image sensor 201 is not necessarily configured to read the two image signals independently. For example, in view of processing load, the image sensor 201 may be configured so that the added signal (A+B) and either one of the image signals (for example, A) are read. The other image signal (for example, B) may be obtained from a difference therebetween. An AF signal processing unit 204 to be described below performs a correlation calculation on the two AF image signals to calculate the amount of image deviation and various types of reliability information.

In the present exemplary embodiment, each pixel is configured to include two photodiodes. However, the number of photodiodes is not limited to two, but may be greater. An image sensor supporting the imaging surface phase-difference AF is not limited to the configuration that each pixel includes a plurality of photodiodes as in the present exemplary embodiment. Like Japanese Patent Application Laid-Open No. 2013-025129 discussed above, a pixel for focus detection may be arranged in the image sensor.

The imaging signal and AF image signals read from the image sensor 201 are input to a correlated double sampling (CDS)/automatic gain control (AGC) converter 202. The CDS/AGC converter 202 performs correlated double sampling for removing reset noise, a gain adjustment, and signal digitization. The CDS/AGC converter 202 outputs the imaging signal to a camera signal processing unit 203 and an AF evaluation value generation unit 210. The CDS/AGC converter 202 outputs the signals for imaging surface phase-difference AF to the AF signal processing unit 204.

The camera signal processing unit 203 transmits the imaging signal output from the CDS/AGC converter 202 to a display unit 205. The display unit 205 is a display device such as a liquid crystal display (LCD) and an organic electroluminescent (EL) display. The display unit 205 displays the imaging signal. In a mode for recording the imaging signal, a recording unit 206 records the imaging signal.

The AF signal processing unit 204 performs a correlation calculation based on the two AF image signals output from the CDS/AGC converter 202. The AF signal processing unit 204 thereby calculates the amount of image deviation and reliability information (including a two-image matching level, a two-image steepness, contrast information, saturation information, and defect information). The AF signal processing unit 204 outputs the amount of the calculated image deviation and reliability information to the camera control unit 207. The correlation calculation will be described in detail below with reference to FIGS. 12A to 14D.

The AF evaluation value generation unit 210 extracts a high frequency component from the imaging signal to generate an AF evaluation value, and outputs the AF evaluation value to the camera control unit 207. The AF evaluation value indicates the sharpness (contrast state) of the image generated based on the output signal from the image sensor 201. Since the sharpness varies with the focus state (degree of in-focus) of the photographing optical system, the sharpness consequently serves as a signal indicating the focus state of the photographing optical system. The area of the image sensor 201 used to generate the AF evaluation value includes an area corresponding to the area used to generate the image signals for phase difference detection.

The camera control unit 207 exchanges information with the components in the camera body 20 to perform control. Aside from the processing inside the camera body 20, the camera control unit 207 performs camera functions operated by the user according to inputs from a camera operation unit 208. The camera functions include power on/off, changing a setting, start of recording, start of AF control, and checking a recorded image. The camera control unit 207 exchanges information with the lens control unit 106 in the lens unit 10 as described above. The camera control unit 207 thereby transmits control instructions and control information for the photographing optical system and obtains information inside the lens unit 10.

Next, an operation of the camera body 20 according to the present exemplary embodiment will be described with reference to the drawings.

FIG. 3 is a flowchart illustrating a procedure of photographing processing of the camera body 20. In steps S301 to S303, the camera control unit 207 initially performs initialization processing. In step S301, the camera control unit 207 sets various initial values of the camera. When the photographing processing is started or when a photographing mode is changed, the camera control unit 207 sets the initial values based on information about user settings and the photographing mode at that time. In step S302, the camera control unit 207 turns off an in-focus suspension flag. In step S303, the camera control unit 207 turns off a search drive flag, and ends the processing.

The in-focus suspension flag initialized in step S302 is a characteristic part of the present exemplary embodiment. If the focus lens 103 is determined to be in an in-focus state and stopped during moving image photographing, the in-focus suspension flag is turned on. If the focus lens 103 is not in the in-focus state and being driven, the in-focus suspension flag is turned off. The in-focus suspension flag is switched on/off to determine whether the focus lens 103 is currently being driven or stopped.

The search drive flag initialized in step S303 is turned off if a defocus amount detected by the imaging surface phase-difference detection method is reliable when driving the focus lens 103. The search drive flag is turned on if the defocus amount is unreliable. The case where the defocus amount is reliable refers to a case where the precision of the defocus amount and a defocus direction are certain, i.e., reliability is higher than a certain level. For example, if the focus lens 103 is focused near a main object or already in the in-focus state, the defocus amount is possibly reliable. In such a case, the camera control unit 207 drives the focus lens 103 by relying on the defocus amount. On the other hand, the defocus amount is unreliable when the defocus amount is not certain, i.e., the reliability is lower than a certain level. For example, if an object is largely blurred, it is possible that the defocus amount may not be correctly calculated. In such a case, the camera control unit 207 performs a search drive (drives the focus lens 103 in a constant direction to search for an in-focus position without using the defocus amount) because the calculated defocus amount is unreliable.

In step S304, the camera control unit 207 determines whether the photographing setting of the camera is a moving image photographing mode or a still image photographing mode. If the photographing setting is the moving image photographing mode (YES in step S304), the camera control unit 207 proceeds to step S305. If the photographing setting is the still image photographing mode (NO in step S304), the camera control unit 207 proceeds to step S306. In step S305, the camera control unit 207 performs moving image photographing processing, and proceeds to step S307. The moving image photographing processing in step S305 will be described in detail below with reference to FIG. 4. In step S306, the camera control unit 207 performs still image photographing processing, and proceeds to step S307. A detailed description of the still image photographing processing in step S306 will be omitted.

In step S307, the camera control unit 207 determines whether the photographing processing is stopped. If the photographing processing is not stopped (NO in step S307), the camera control unit 207 proceeds to step S308. If the photographing process is stopped (YES in step S307), the camera control unit 207 ends the photographing processing. The photographing processing is stopped when the camera is powered off or when operations other than photographing are performed. Examples of the other operations include user camera setting processing by the user and playback processing for checking a captured image or moving image.

In step S308, the camera control unit 207 determines whether the photographing mode is changed. If the photographing mode is changed (YES in step S308), the camera control unit 207 returns to step S301. If the photographing mode is not changed (NO in step S308), the camera control unit 207 returns to step S304. That is, if the photographing mode is not changed, the camera control unit 207 continues the processing of the current photographing mode. If the photographing mode is changed, then in steps S301 to S303, the camera control unit 207 performs the initialization processing before performing the processing of the changed photographing mode.

Next, the moving image photographing processing in step S305 of FIG. 3 will be described with reference to FIG. 4. In steps S401 to S404, the camera control unit 207 performs control about moving image recording. In step S401, the camera control unit 207 determines whether a moving image recording switch is on. If the moving image recording switch is on (YES in step S401), the camera control unit 207 proceeds to step S402. If the moving image recording switch is not on (NO in step S401), the camera control unit 207 proceeds to step S405.

In step S402, the camera control unit 207 determines whether a moving image is currently being recorded. If no moving image is currently being recorded (NO in step S402), the camera control unit 207 proceeds to step S403. In step S403, the camera control unit 207 starts recording a moving image, and proceeds to step S405. On the other hand, if a moving image is currently being recorded (YES in step S402), the camera control unit 207 proceeds to step S404. In step S404, the camera control unit 207 stops recording the moving image, and proceeds to step S405. In the present exemplary embodiment, the user presses the moving image recording switch to start and stop recording a moving image. Recording may be started and stopped by using other methods such as a selector switch.

In step S405, the camera control unit 207 performs focus detection processing. This focus detection processing includes obtaining defocus information and reliability information for performing the image surface phase-difference AF in the camera control unit 207 and the AF signal processing unit 204 of FIG. 1. The focus detection processing will be described in detail below with reference to FIG. 5.

In step S406, the camera control unit 207 obtains sharpness information. In this processing, the AF evaluation value generation unit 210 obtains sharpness information (AF evaluation value) from the imaging signal of a set focus detection area. A detailed description of the processing will be omitted because the processing is a conventional technique.

In step S407, the camera control unit 207 determines whether the camera is currently suspending in-focusing. If the camera is not suspending in-focusing (NO in step S407), the camera control unit 207 proceeds to step S408. If the camera is suspending the in-focusing (YES in step S407), the camera control unit 207 proceeds to step S409. Whether the camera is suspending the in-focusing is determined based on on/off of the in-focus suspension flag. In step S408, the camera control unit 207 performs AF processing, and ends the moving image photographing processing. In step S408, the camera control unit 207 performs the AF control based on the information detected in steps S405 and S406. The AF control will be described in detail below with reference to FIG. 7.

In step S409, the camera control unit 207 makes an AF restart determination, and ends the moving image photographing processing. The processing of step S409 includes determining whether to restart the AF control because the object has changed during the in-focus suspension. The processing of step S409 will be described in detail below with reference to FIG. 6.

Next, the focus detection processing in step S405 of FIG. 4 will be described with reference to FIG. 5. In step S501, the camera control unit 207 initially obtains a pair of image signals from a focus detection range which is set arbitrarily. In step S502, the camera control unit 207 calculates a correlation amount from the pair of image signals obtained in step S501.

In step S503, the camera control unit 207 calculates a correlation change amount from the correlation amount calculated in step S502. In step S504, the camera control unit 207 calculates an out-of-focus amount from the correlation change amount calculated in step S503.

In step S505, the camera control unit 207 calculates reliability which indicates how reliable the out-of-focus amount calculated in step S504 is. Note that the camera control unit 207 performs the processing of steps S501 to S505 as many times as the number of focus detection areas included in the focus detection range. In step S506, the camera control unit 207 converts the out-of-focus amount into a defocus amount with respect to each focus detection area. In step S507, the camera control unit 207 determines the focus detection area to be used for AF, and ends the focus detection processing.

Next, the focus detection processing described with reference in FIG. 5 will be described in detail by using FIGS. 12A to 14D.

Figure 12A:
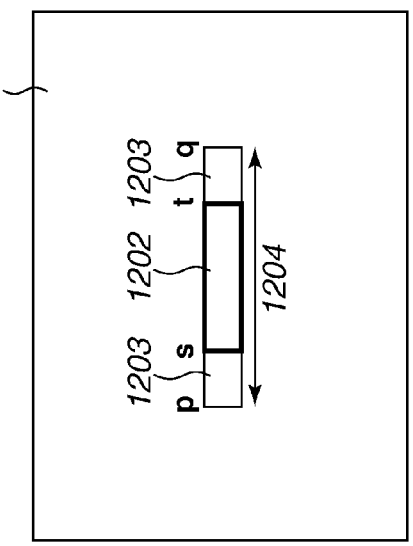
FIGS. 12A to 12D are diagrams illustrating focus detection areas according to the present exemplary embodiment.

FIGS. 12A to 12D are diagrams illustrating examples of areas for obtaining image signals indicating a focus detection range to be handled in the focus detection processing. FIG. 12A is a diagram illustrating a focus detection range on a pixel array 1201. An area 1204 required in performing a correlation calculation combines the focus detection range 1202 with shift areas 1203 required for the correlation calculation. In FIG. 12A, the area 1204 lies from coordinate p to coordinate q in an X-axis direction. The focus detection range 1202 lies from coordinate s to coordinate t in the X-axis direction.

Figure 12B:
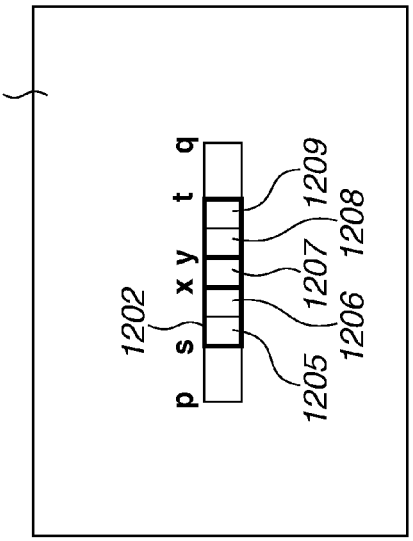

FIG. 12B is a diagram illustrating five focus detection areas 1205 to 1209 into which the focus detection range 1202 is divided. As an example, in the present exemplary embodiment, the camera control unit 207 calculates the out-of-focus amount and performs focus detection in units of the focus detection areas 1205 to 1209. The camera control unit 207 selects the focus detection result of the area that is the most reliable among the plurality of divided focus detection areas, and uses the out-of-focus amount calculated in that area for AF. Note that the number of divisions of the focus detection range is not limited to the foregoing.

Figure 12C:
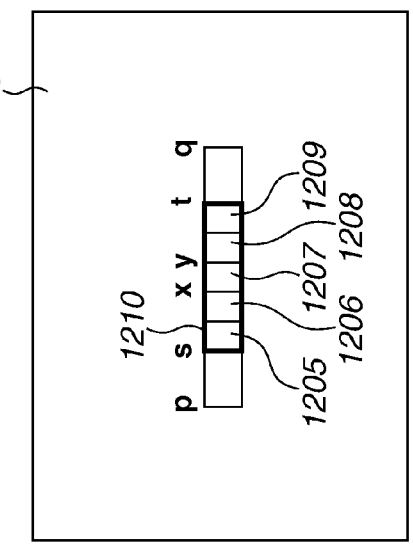

FIG. 12C is a diagram illustrating a temporary focus detection area 1210 obtained by connecting the focus detection areas 1205 to 1209 of FIG. 12B. As one example of the exemplary embodiment, the camera control unit 207 may use the out-of-focus amount calculated from such a connected focus detection area for AF.

Figure 12D:
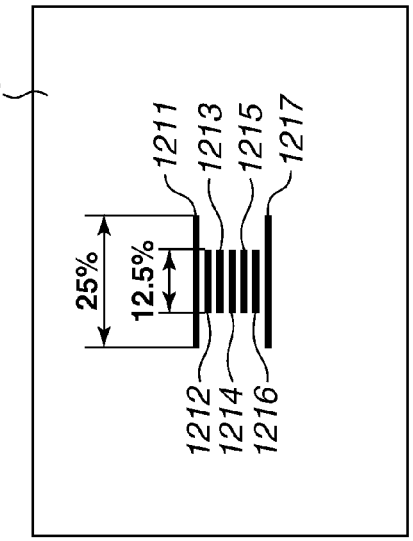

If the focus detection areas are limited or if a plurality of focus detection areas is unable to be arranged on the screen due to limited focus detection processing time, a focus detection area may be constituted by a plurality of areas of different lengths as illustrated in FIG. 12D. FIG. 12D is a diagram illustrating an arrangement of the focus detection area which includes seven areas 1211 to 1217. In FIG. 12D, two areas 1211 and 1217 having a size of 25% in ratio with respect to the photographing screen in the horizontal direction and five areas 1212 to 1216 having a size of 12.5% are arranged in the center of the photographing screen. In such a manner, the plurality of areas having different sizes is arranged so that the number of areas having a size of 12.5% in ratio with respect to the photographing screen is greater than the number of areas having a size of 25%. The camera control unit 207 then calculates an effective defocus amount and an effective defocus direction by combining the focus detection results obtained from the seven areas 1211 to 1217, and drives the focus lens 103 for focus adjustment by using the effective defocus amount and/or the effective defocus direction.

In the example of FIG. 12D, a large number of the areas 1212 to 1216 having a smaller ratio with respect to photographing screen is arranged. This enables the focusing to an object which is located closer to the center of the photographing screen. Further, the ratio of the focus detection area with respect to the photographing screen can be reduced to decrease the effect of objects at different distances on the AF. Moreover, since not only the areas 1212 to 1216 having a smaller ratio but also the areas 1211 and 1217 having a greater ratio with respect to the photographing screen are arranged, focus fluctuations due to deviations of an object from the focus detection area can be reduced. That is, even if an object temporarily deviates from the focus detection areas 1212 to 1216, the areas 1211 and 1217 having a greater ratio with respect to the photographing screen can keep track of the object to maintain the focus. The arrangement of the focus detection area and the sizes of the areas are not limited to those described in the present exemplary embodiment. Various forms may be used without departing from the gist of the present invention.

Figure 13A:
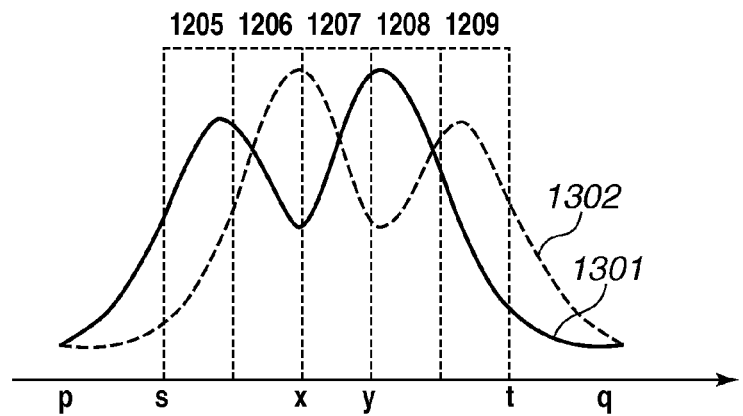
FIGS. 13A, 13B, and 13C are charts illustrating image signals obtained from focus detection areas according to the present exemplary embodiment.
Figure 13B:
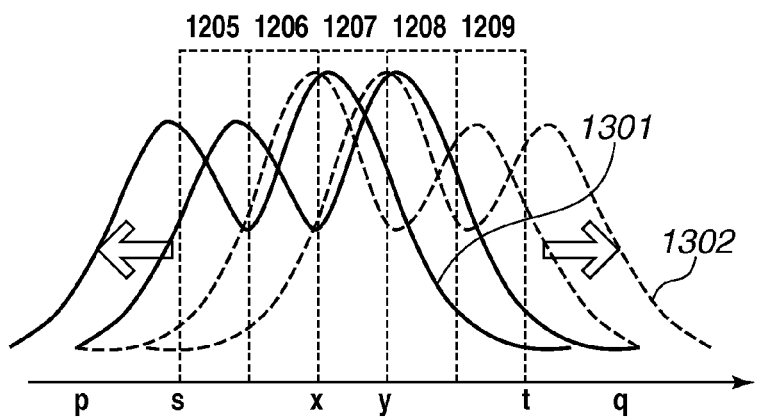
Figure 13C:
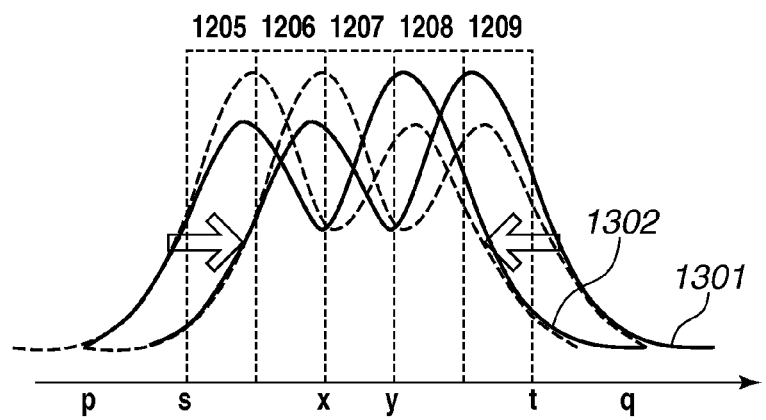

FIGS. 13A to 13C are charts illustrating image signals obtained from the focus detection areas 1205 to 1209 set in FIG. 12B. The focus detection range 1202 lies from s to t.

The range from p to q is needed for a focus detection calculation in consideration of the amount of shift. One divided range-fielding area 1207 lies from x to y.

FIG. 13A is a chart illustrating image signals yet to be shifted as waveforms. A solid line 1301 represents an image signal A. A broken line 1302 represents an image signal B. The areas 1205 to 1209 represent the respective divided focus detection areas in FIG. 12B.

FIG. 13B is a chart illustrating waveforms obtained by shifting the waveforms of the image signals of FIG. 13A yet to be shifted, in positive directions. FIG. 13C is a chart illustrated waveforms obtained by shifting the waveforms of the image signals of FIG. 13A yet to be shifted, in negative directions. When calculating the correlation amount, the camera control unit 207 shifts the image signal A 1301 and the image signal B 1302 in the directions of the respective arrows one bit at a time.

A method for calculating a correlation amount COR will be described. As described in FIGS. 13B and 13B, the camera control unit 207 shifts the image signal A and the image signal B one bit at a time, and calculates the sum of the absolute values of differences between the image signals A and B. The correlation amount COR can be calculated by the following Eq. (1):
where i is the amount of shift, p−s is the minimum shift number in FIGS. 13A to 13C, q−t is the maximum shift number in FIGS. 13A to 13C, x is the start coordinate of the focus detection area, and y is the end coordinate of the focus detection area.

$$COR[i] = \sum_{k=x}^{y} |A[k+i] - B[k-i]|  \quad (1)$$

$$\{(p-s) < i < (q-t)\}$$

Figure 14A:
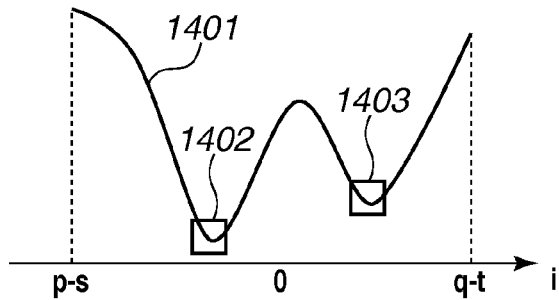
FIGS. 14A to 14D are diagrams for describing a correlation calculation method according to the present exemplary embodiment.

FIG. 14A is a chart illustrating the correlation amount COR as a waveform. The horizontal axis of the graph indicates the amount of shift i. The vertical axis indicates the correlation amount COR. The correlation amount waveform 1401 has extreme values near portions 1402 and 1403. The smaller the correlation amount COR, the higher the matching level between the image signals A and B.

Next, a method for calculating a correlation change amount ΔCOR will be described. Based on the correlation amount waveform 1401 of FIG. 14A, the camera control unit 207 initially calculates the correlation change amount ΔCOR from a difference between correlation amounts COR at every other shift. The camera control unit 207 can calculate the correlation change amount ΔCOR by the following Eq. (2):
where i is the amount of shift, p−s is the minimum shift number in FIGS. 13A to 13C, and q−t is the maximum shift number in FIGS. 13A to 13C.

$$\Delta COR[i] = COR[i-1] - COR[i+1] \{(p-s+1) < i < (q-t-1)\} \quad (2)$$

Figure 14B:
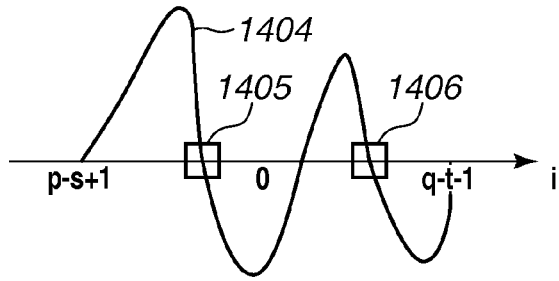

FIG. 14B is a diagram illustrating the correlation change amount ΔCOR as a waveform. The horizontal axis of the graph indicates the amount of shift i. The vertical axis indicates the correlation change amount ΔCOR. According to the correlation change amount waveform 1404, the correlation change amount ΔCOR changes from positive to negative near portions 1405 and 1406. Like the portion 1405, a point where the correlation change amount ΔCOR becomes 0 will be referred to as a zero cross. The matching level between the image signals A and B peaks at a zero cross, at which time the amount of shift is the out-of-focus amount.

Figure 14C:
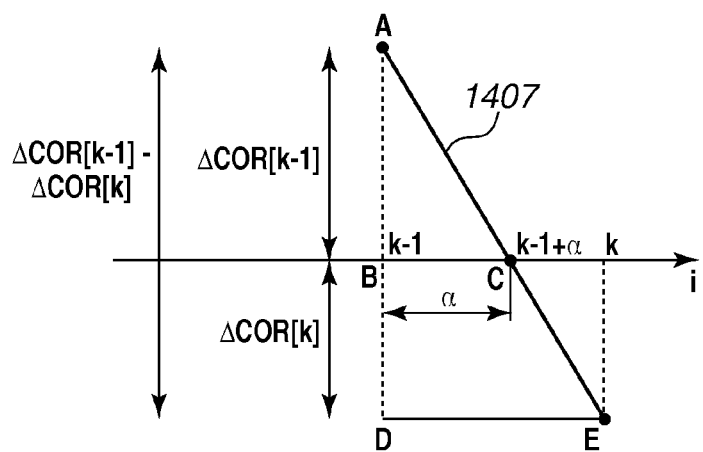

FIG. 14C enlarges the portion 1405 of FIG. 14B, including a portion 1407 of the correlation change amount waveform 1404. A method for calculating an out-of-focus amount PRD will be described with reference to FIG. 14C. The out-of-focus amount PRD is divided into an integer part β and a fractional part α. The fractional part α can be calculated from the similarity relationship between the triangle ABC and the triangle ADE in FIG. 14C by using the following Eq. (3):

$$AB:AD = BC:DE \quad (3)$$

$$\Delta COR[k-1]: \Delta COR[k-1] - \Delta COR[k] = \alpha:k - (k-1)$$

$$\alpha = \frac{\Delta COR[k-1]}{\Delta COR[k-1] - \Delta COR[k]}$$

The integer part β can be calculated based on FIG. 14C by using the following Eq. (4):

$$\beta = k-1 \quad (4)$$

The out-of-focus amount PRD can be calculated by adding α and β.

If there is a plurality of zero crosses like FIG. 14B, a zero cross at which the steepness maxder of change of the correlation amount (hereinafter, referred to as steepness) is highest is determined to be a first zero cross. The steepness maxder is an index indicating the easiness of AF. The greater the value, the easier AF is at that point. The steepness maxder can be calculated by the following Eq. (5):

$$maxder = |\Delta COR[k-1]| + |\Delta COR[k]| \quad (5)$$

As described above, if there is a plurality of zero crosses, the camera control unit 207 determines the first zero cross according to the steepness maxder.

Next, a method for calculating the reliability of the out-of-focus amount PRD will be described. The reliability can be defined by the steepness maxder and a matching level fnclvl between the two images of the image signals A and B (hereinafter, referred to as a two-image matching level). The two-image matching level fnclvl is an index indicating the precision of the out-of-focus amount PRD. The smaller the value, the higher the precision.

Figure 6:
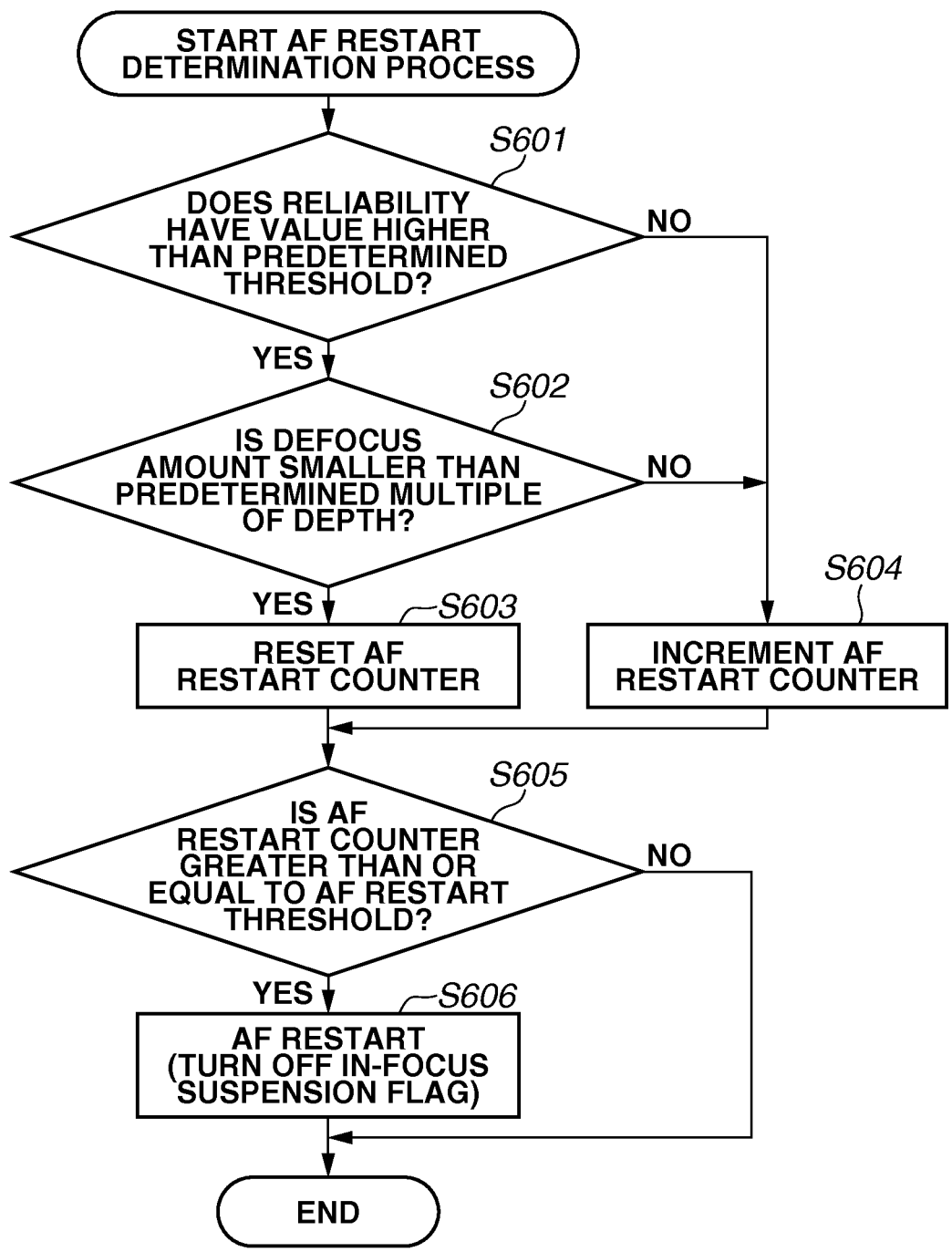
FIG. 6 is a flowchart illustrating AF restart determination processing according to the first exemplary embodiment.
Figure 14D:
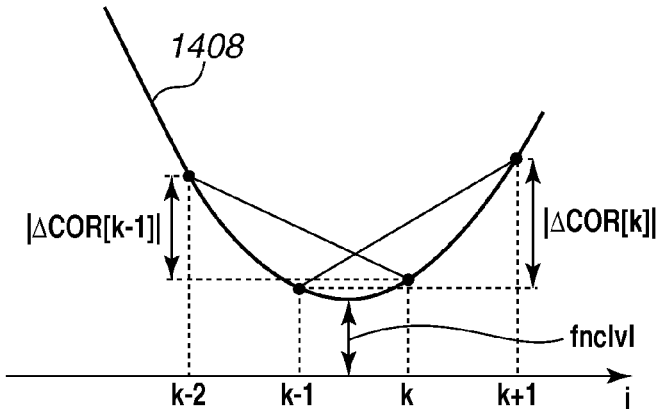

FIG. 14D enlarges the portion 1402 of FIG. 14A, illustrating a portion 1408 of the correlation amount waveform 1401. The two-image matching level fnclvl can be calculated by the following Eq. (6):

(i) $|\Delta COR[k-1]| \times 2 \leq maxder$ のとき $fnclvl = COR[k-1] + \Delta COR[k-1]/4$ (ii) $|\Delta COR[k-1]| \times 2 > maxder$ のとき $fnclvl = COR[k] - \Delta COR[k]/4 \quad (6)$ Next, the AF restart determination in step S409 of FIG. 4 will be described with reference to the flowchart of FIG. 6. The AF restart determination is processing for determining whether to drive the focus lens 103 again from a state where the focus lens 103 is in the in-focus state and stopped.

Figure 5:
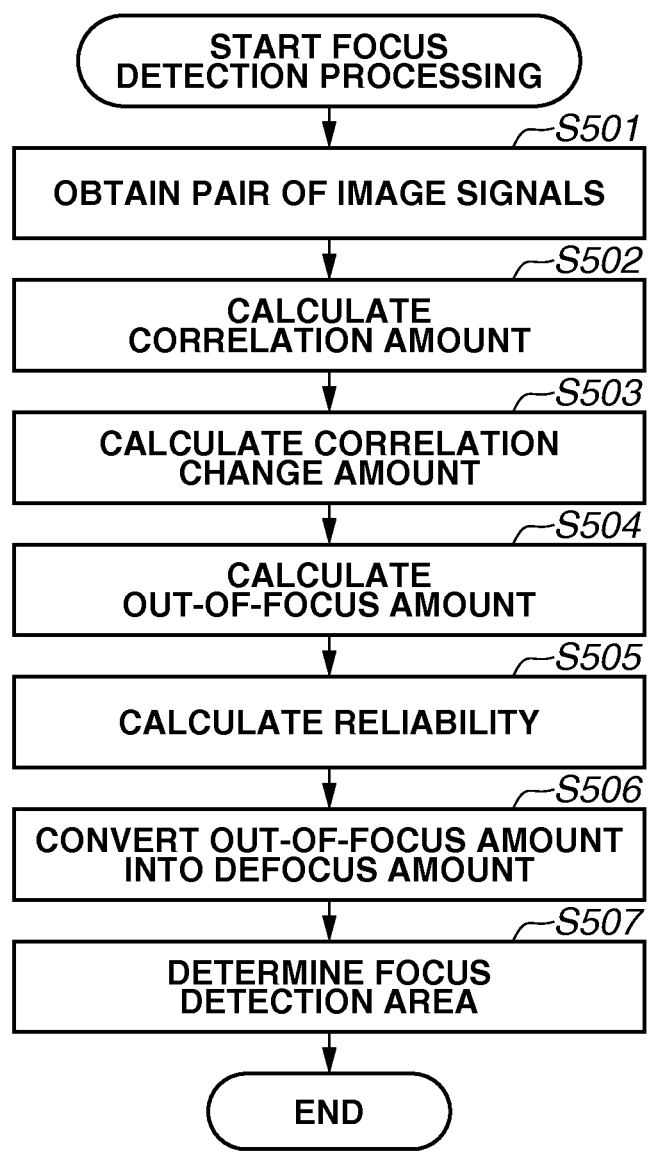
FIG. 5 is a flowchart illustrating focus detection processing according to the present exemplary embodiment.

In step S601, the camera control unit 207 determines whether the reliability calculated in step S505 of FIG. 5 has a value higher than a predetermined threshold. If the value is higher than the predetermined threshold (YES in step S601), the camera control unit 207 proceeds to step S602. If the value is lower than the predetermined threshold (NO in step S601), the camera control unit 207 proceeds to step S604.

In step S602, the camera control unit 207 determines whether the calculated defocus amount is smaller than a predetermined multiple of the depth (depth of field). If the defocus amount is smaller (YES in step S602), the camera control unit 207 proceeds to step S603. If not (NO in step S602), the camera control unit 207 proceeds to step S604.

In step S603, the camera control unit 207 resets an AF restart counter, and proceeds to step S605. In step S604, the camera control unit 207 increments the AF restart counter, and proceeds to step S605.

As described above, if the defocus amount is greater than a predetermined value or the reliability is lower than a predetermined threshold, the main object being photographed may have changed. In step S604, the camera control unit 207 therefore increments the AF restart counter in preparation to restart AF. If the detected defocus amount is smaller than a predetermined value and the reliability is maintained high, then in step S603, the camera control unit 207 resets the AF restart counter to keep the focus lens 103 stopped.

The threshold of the defocus amount (a predetermined multiple of the depth) set in step S602 is tuned to facilitate a restart if the main object has changed, and suppress an accidental restart if the main object has not changed. For example, the threshold is set to one time the depth at which the blurring of the main object becomes visible. The threshold of the reliability set in step S601 is set to a value, for example, such that the distance calculated from the defocus amount is reliable. In such a manner, the thresholds set in steps S601 and S602 are determined depending on a situation where the main object is considered to change.

In step S605, the camera control unit 207 determines whether the AF restart counter reaches or exceeds an AF restart threshold. If the AF restart counter reaches or exceeds the AF restart threshold (YES in step S605), the camera control unit 207 proceeds to step S606. If the AF restart counter falls below the AF restart threshold (NO in step S605), the camera control unit 207 ends the processing. In step S606, the camera control unit 207 turns off the in-focus suspension flag to restart AF, resumes drive of the focus lens 103, and ends the processing.

Figure 7:
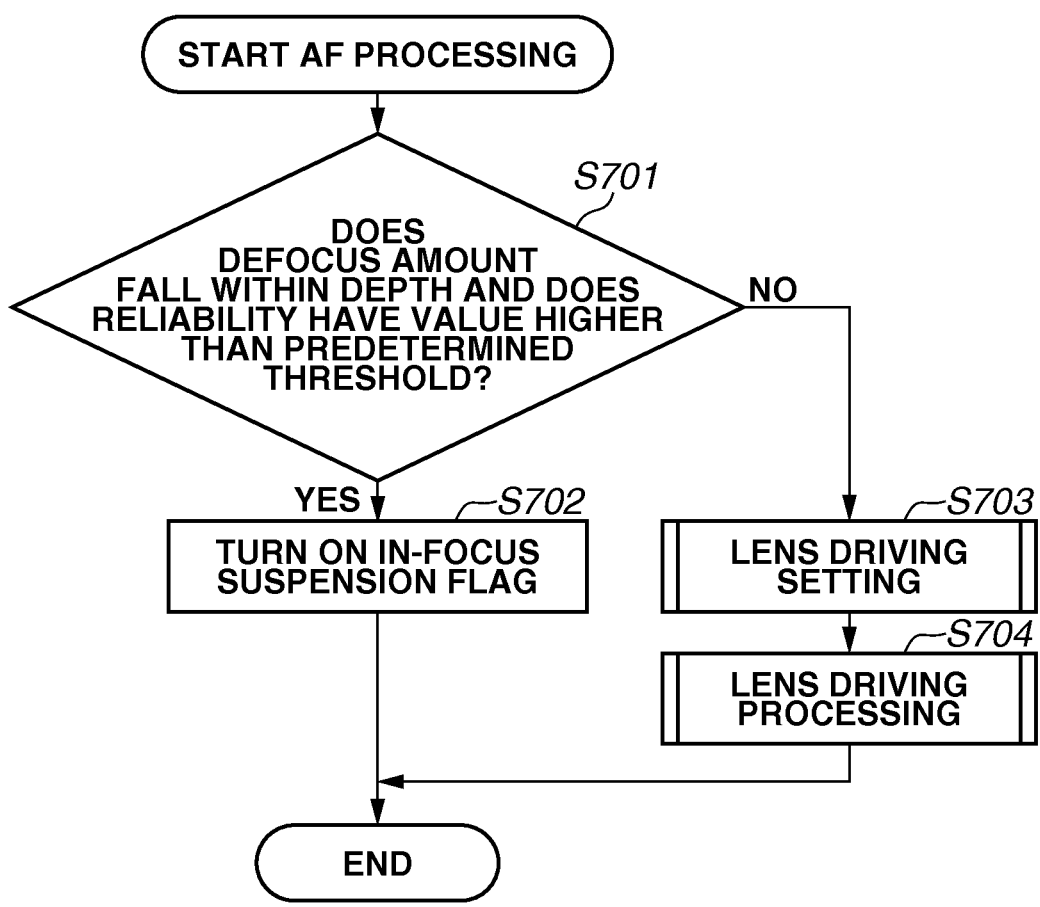
FIG. 7 is a flowchart illustrating AF processing according to the present exemplary embodiment.

Next, the AF processing in step S408 of FIG. 4 will be described with reference to the flowchart of FIG. 7. The AF processing is processing for driving the focus lens 103 that is not suspending the in-focusing, and making a determination about an in-focus suspension.

In step S701, the camera control unit 207 determines whether the defocus amount falls within the depth and the reliability calculated in step S505 of FIG. 5 has a value higher than a predetermined threshold. The threshold of the reliability here is set to a value, for example, such that the distance calculated from the defocus amount is reliable. If such a condition is satisfied (YES in step S701), the camera control unit 207 proceeds to step S702. If not (NO in step S701), the camera control unit 207 proceeds to step S703. In the present exemplary embodiment, the threshold used in step S701 is one time the depth. However, the threshold may be set to be greater or smaller according to need.

In step S702, the camera control unit 207 turns on the in-focus suspension flag, and ends the AF processing. As described above, if an object is determined to be in the in-focus state, the camera control unit 207 shifts the focus lens 103 from a driven state to a stopped state. The camera control unit 207 then makes the AF restart determination in step S409 of FIG. 4 to determine whether to drive the focus lens 103 again.

In step S703, the camera control unit 207 determines a lens driving speed and a driving method, and proceeds to step S704. The lens driving setting in step S703 will be described in detail below with reference to FIG. 8. In step S704, the camera control unit 207 performs lens driving processing, and ends the AF processing. The lens driving processing in step S704 will be described in detail below with reference to FIG. 9.

A series of processes characteristic of the present exemplary embodiment is described below. An overview will initially be given. Suppose that the image signals used for phase-difference AF have low reliability and the defocus amount based on the phase difference is unreliable (defocus direction is reliable). In such a case, according to the present exemplary embodiment, the camera control unit 207 performs wobbling driving to drive the focus lens 103 in closest and infinity distance directions. This enables an apparatus to obtain a focusing direction not only by phase-difference AF but also by contrast AF. Since a more reliable AF result can be used, the camera control unit 207 determines which AF is preferentially used in setting the driving direction, based on the reliability of the phase-difference AF (the number of areas determined to be effective) and an in-focus degree (degree of in-focus) of the contrast AF. The determination processing will be described in detail with reference to FIG. 15. Based on the determination result, the AF result to be used to set the driving method can be changed more reliably in determining the focusing direction.

Figure 8:
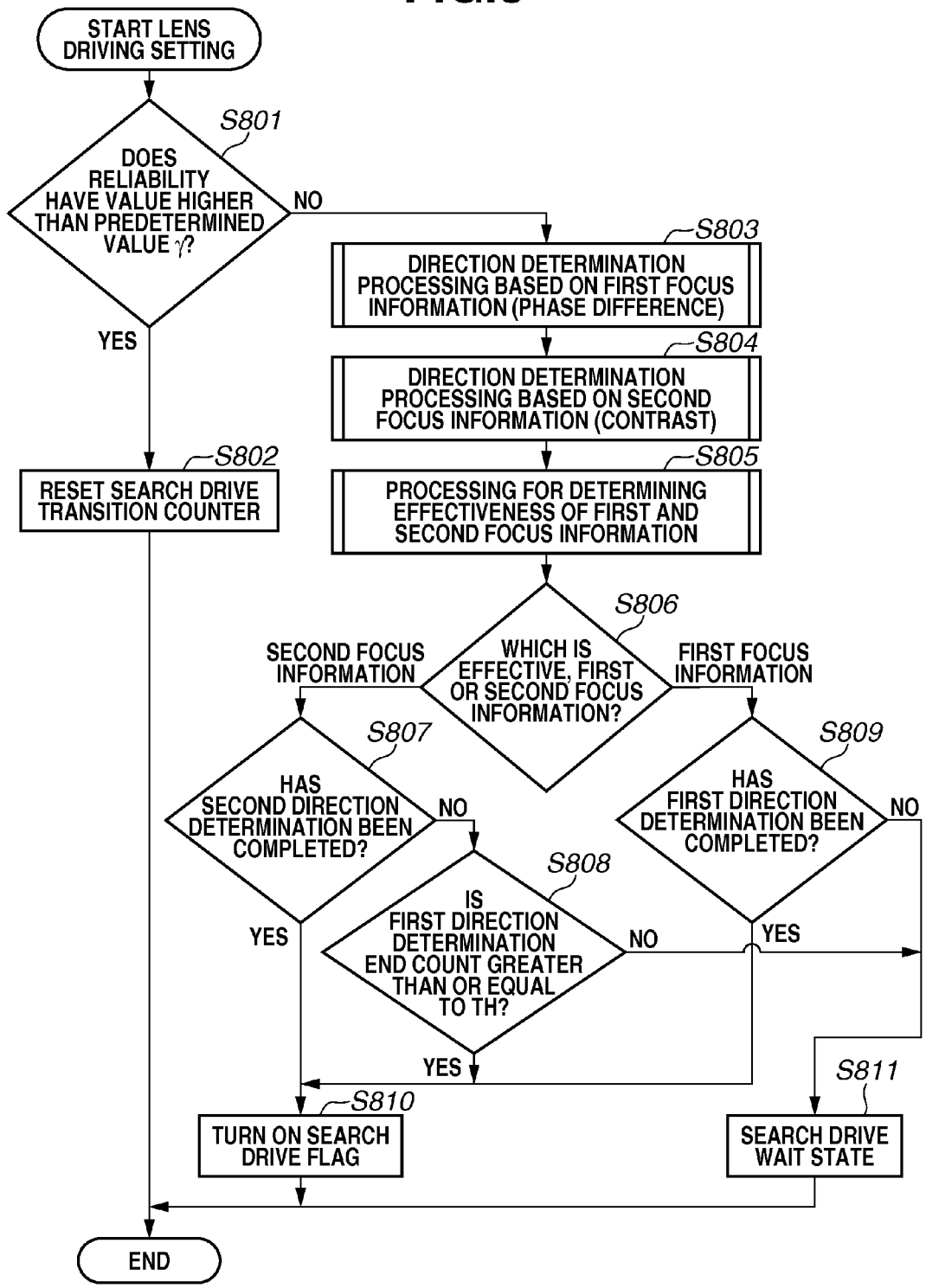
FIG. 8 is a flowchart illustrating lens driving setting processing according to the first exemplary embodiment.

The lens driving setting in step S703 of FIG. 7 will be described with reference to the flowchart of FIG. 8. In step S801, the camera control unit 207 determines whether the reliability of the image signals has a value higher than a predetermined value γ. The predetermined value γ (second level) is set to be a threshold such that the defocus amount calculated based on the phase difference between the image signals is sufficiently reliable. If the reliability has a value higher than the predetermined value γ (YES in step S801), the camera control unit 207 determines that the distance to the object is successfully measured, and proceeds to step S802. In step S802, the camera control unit 207 resets a search drive transition counter to drive the focus lens 103 as much as the measured distance, and ends the processing.

In step S801, if the reliability have a value lower than the predetermined value γ (NO in step S803), the camera control unit 207 proceeds to step S803. In step S803, the camera control unit 207 performs direction determination processing based on first focus information (phase difference). This processing will be described below with reference to FIG. 11A.

In step S804, the camera control unit 207 performs direction determination processing based on second focus information (contrast). This processing will be described below with reference to FIG. 11B.

In step S805, the camera control unit 207 performs processing for determining effectiveness of the first and second focus information. Here, the camera control unit 207 determines AF which is effective, according to the reliability of the phase-difference AF and the in-focus degree of the contrast AF. This processing will be described below with reference to FIG. 15.

In step S806, the camera control unit 207 determines which is effective, the first or second focus information, based on the determination result of step S805. If the first focus information is effective (FIRST FOCUS INFORMA- TION in step S806), the camera control unit 207 proceeds to step S809. If the second focus information is effective (SECOND FOCUS INFORMATION in step S806), the camera control unit 207 proceeds to step S807.

In step S807, the camera control unit 207 determines whether a direction determination by the contrast AF (second direction determination) has been completed. If the second direction determination has been completed (YES in step S807), the camera control unit 207 proceeds to step S810. If the second direction determination has not been completed (NO in step S807), the camera control unit 207 proceeds to step S808.

In step S808, the camera control unit 207 determines whether elapsed time (first direction determination end count) since the result of the phase-difference AF is identified, is greater than or equal to a threshold TH. If the first direction determination end count is greater than or equal to the threshold TH (YES in step S808), the camera control unit 207 proceeds to step S810. If not (NO in step S808), the camera control unit 207 proceeds to step S811. In the present exemplary embodiment, the threshold TH is 0.7 seconds. The threshold may be set to be an arbitrary value.

Step S809 is performed if the phase-difference AF is effective. In step S809, the camera control unit 207 determines whether a direction determination by the phase-difference AF (first direction determination) has been completed. If the first direction determination has been completed (YES in step S809), the camera control unit 207 proceeds to step S810. If the first direction determination has not been completed (NO in step S809), the camera control unit 207 proceeds to step S811.

In step S810, the camera control unit 207 turns on the search drive flag for starting a search drive because the driving direction is determined. The camera control unit 207 then ends the processing. In step S811, the camera control unit 207 enters a search drive wait state because the driving direction is not determined yet. The camera control unit 207 then ends the processing. In step S811, the camera control unit 207 may proceed to a search drive after a lapse of a predetermined time.

Figure 9:
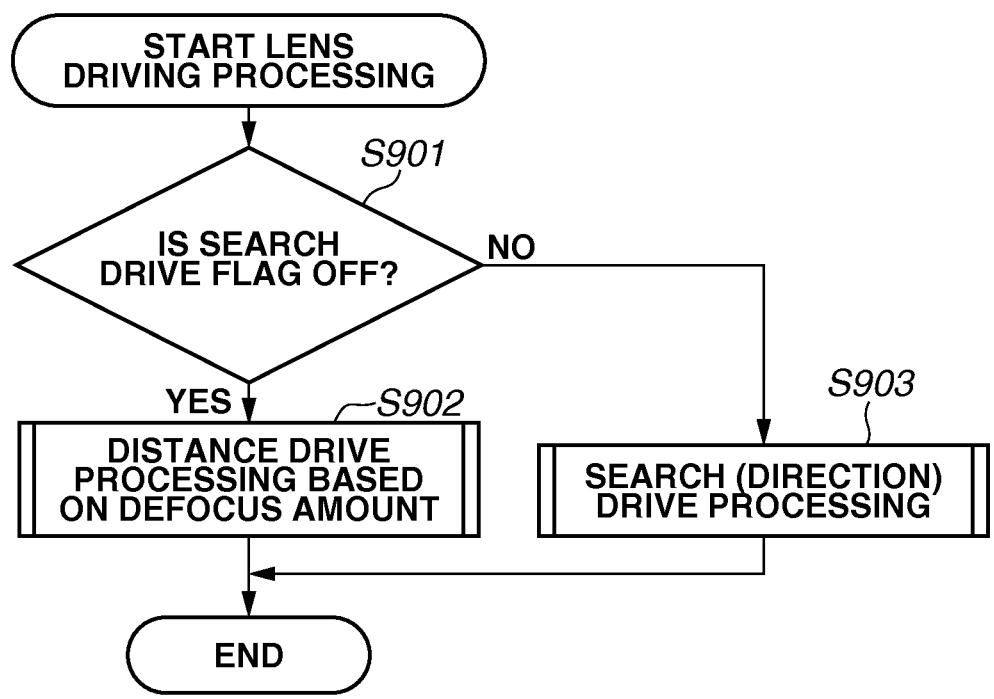
FIG. 9 is a flowchart illustrating lens driving processing according to the first exemplary embodiment.

Next, the lens driving processing in step S704 of FIG. 7 will be described with reference to the flowchart of FIG. 9.

In step S901, the camera control unit 207 determines whether the search drive flag is off. If the search drive flag is off (YES in step S901), the camera control unit 207 proceeds to step S902. If the search drive flag is on (NO in step S901), the camera control unit 207 proceeds to step S903.

In step S902, the camera control unit 207 performs a distance drive based on the defocus amount calculated from the phase difference between the image signals, and ends the lens driving processing. This distance drive processing is processing for converting the defocus amount calculated by the camera control unit 207 into a driving amount of the focus lens 103 and giving a drive instruction to the focus lens driving unit 105. In step S903, the camera control unit 207 performs a search (direction) drive, and ends the lens driving processing.

Figure 10:
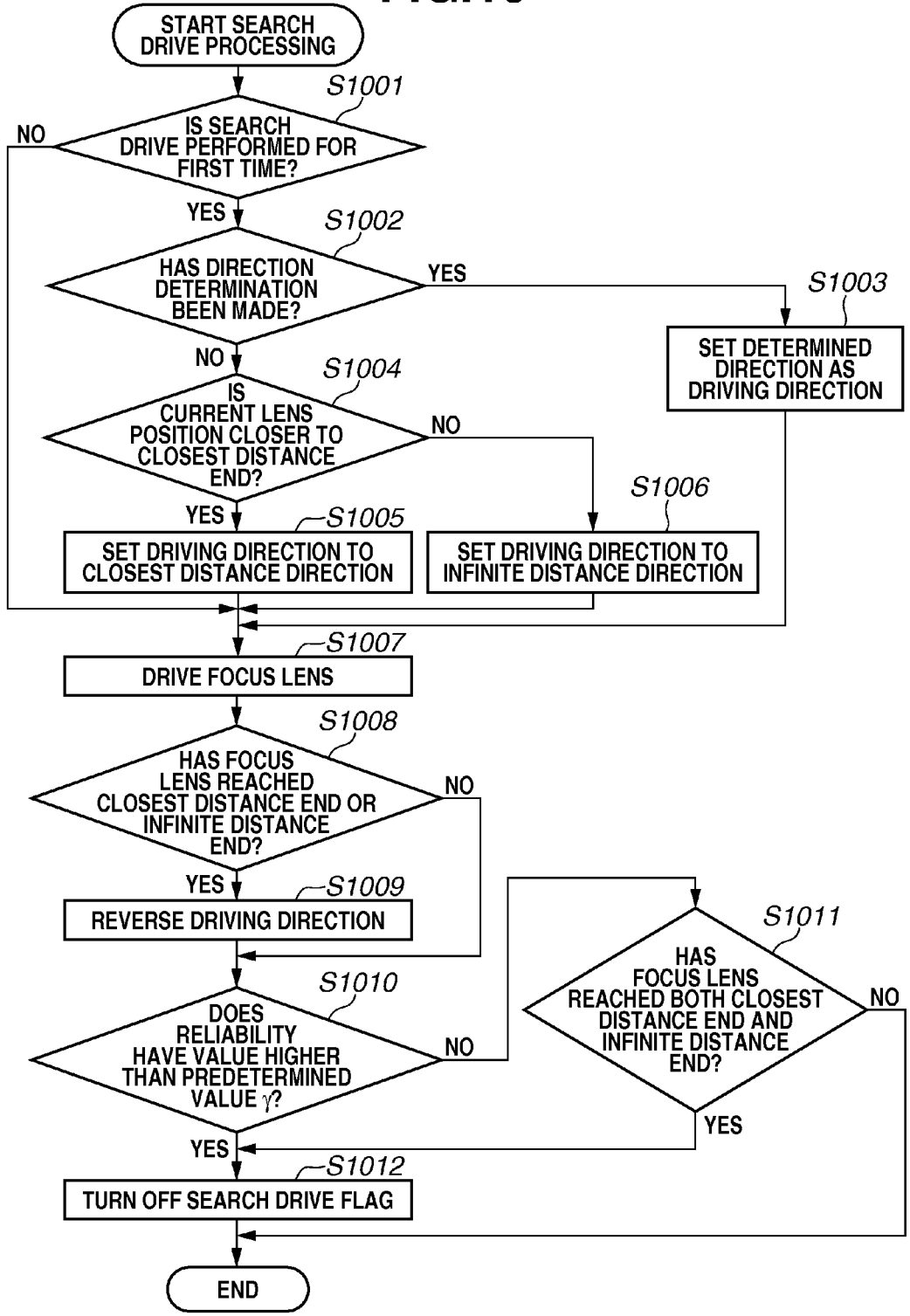
FIG. 10 is a flowchart illustrating search driving processing according to the present exemplary embodiment.

Next, the search drive processing in step S903 of FIG. 9 will be described with reference to the flowchart of FIG. 10. In step S1001, the camera control unit 207 determines whether the search drive is performed for the first time. If the search drive is performed for the first time (YES in step S1001), the camera control unit 207 proceeds to step S1002. If the search drive is not performed for the first time (NO in step S1001), the camera control unit 207 proceeds to step S1007.

Steps S1002 to S1006 are processing for setting the driving direction. If the search drive is performed for the first time, the camera control unit 207 needs to determine the driving direction of the focus lens 103.

In step S1002, the camera control unit 207 determines whether a direction determination has been made in the foregoing step S807 or S809. If a direction determination has been made (YES in step S1002), the camera control unit 207 proceeds to step S1003. If no direction determination has been made (NO in step S1002), the camera control unit 207 proceeds to step S1004. In step S1003, the camera control unit 207 sets the determined direction as the driving direction.

In step S1004, the camera control unit 207 determines whether the current lens position is closer to the closest distance end. If the current lens position is closer to the closest distance end (YES in step S1004), the camera control unit 207 proceeds to step S1005. If the current lens position is closer to the infinite distance end (NO in step S1004), the camera control unit 207 proceeds to step S1006.

In step S1005, the camera control unit 207 sets the driving direction of the focus lens 103 at the time of starting the search drive, to be the closest distance direction. In step S1006, the camera control unit 207 sets the driving direction of the focus lens 103 at the time of starting the search drive, to be the infinite distance direction. Such setting of the driving direction can reduce the time to perform a search drive over the entire lens driving area, whereby the maximum time needed to find an in-focus position by the search drive can be reduced. The camera control unit 207 sets the driving direction of the focus lens 103 by the processing of steps S1002 to S1006, and proceeds to step S1007.

In step S1007, the camera control unit 207 performs control to drive the focus lens 103 in the set lens driving direction and at the set lens driving speed, and proceeds to step S1008. In step S1008, the camera control unit 207 determines whether the focus lens 103 has reached the closest distance end or the infinite distance end. If the focus lens 103 has reached either of the ends (YES in step S1008), the camera control unit 207 proceeds to step S1009. If the focus lens 103 has reached neither end (NO in step S1008), the camera control unit 207 proceeds to step S1010. In step S1009, the camera control unit 207 reverses the driving direction of the focus lens 103, and proceeds to step S1010.

In step S1010, the camera control unit 207 determines whether the reliability is higher than a predetermined value γ. If the reliability is higher than the predetermined value γ (YES in step S1010), the camera control unit 207 proceeds to step S1012. If not (NO in step S1011), the camera control unit 207 proceeds to step S1011.

In step S1011, the camera control unit 207 determines whether the focus lens 103 has reached both the closest distance end and the infinite distance end. If the focus lens 103 has reached both ends (YES in step S1011), the camera control unit 207 proceeds to step S1012. If the focus lens 103 has not reached both ends (NO in step S1011), the camera control unit 207 ends the search drive processing. In step S1012, the camera control unit 207 turns off the search drive flag, and ends the search drive processing.

The condition for ending the search drive is that the reliability is higher than the predetermined value γ in step S1010, or that the focus lens 103 has reached both the closest distance end and the infinite distance end in step S1011. Like the threshold γ set in step S901 of FIG. 9, the reliability threshold γ set in step S1010 is such a value that at least the defocus amount calculated based on the phase difference between the image signals is reliable. If the reliability is higher than the threshold γ, it can be determined that the focus lens 103 is approaching an in-focus position. In such a case, the camera control unit 207 ends the search drive and switches again to the control for performing a distance drive based on the defocus amount. If the focus lens 103 has reached both the closest distance end and the infinite distance end in step S1011, the focus lens 103 has been driven over the entire focus driving area without identifying an object. In such a case, the camera control unit 207 turns off the search drive flag to restore the initial processing state. In a case of a configuration different from the present exemplary embodiment, if no object is identified, the camera control unit 207 may perform control to continue the search drive without turning off the search drive flag.

Figure 11A:
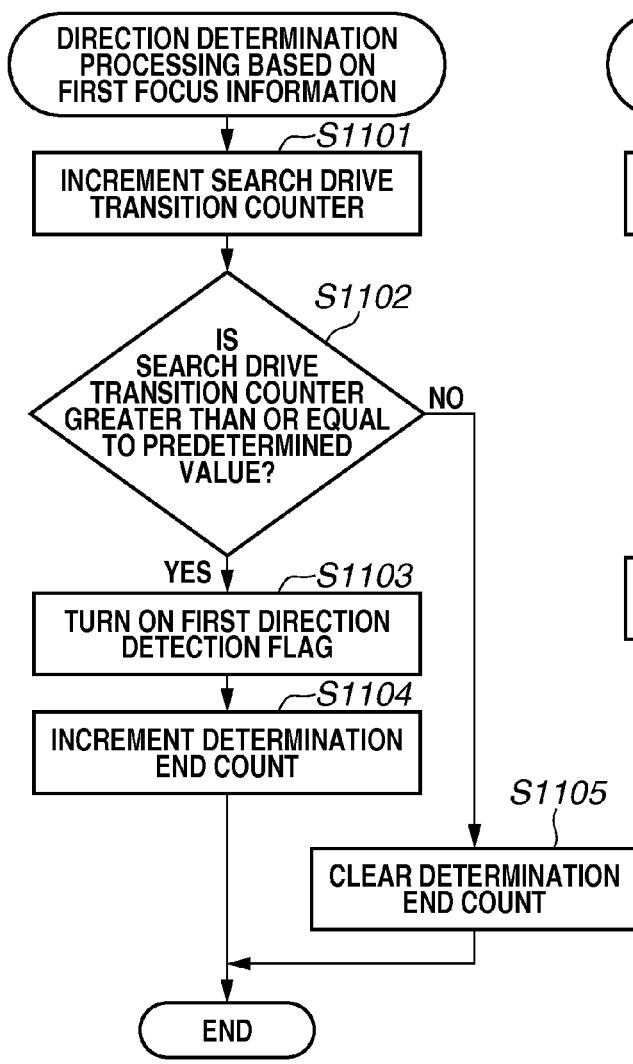
FIGS. 11A and 11B are flowcharts illustrating direction determination processing based on first focus information and second focus information according to the first exemplary embodiment.

Next, the direction determination processing based on the first focus information in step S803 of FIG. 8 will be described with reference to FIG. 11A. In step S1101, the camera control unit 207 increments a counter for direction detection (search drive transition counter). The camera control unit 207 then proceeds to step S1102.

In step S1102, the camera control unit 207 determines whether the search drive transition counter is greater than or equal to a predetermined value. If the search drive transition counter is greater than or equal to the predetermined value (YES in step S1102), the camera control unit 207 proceeds to step S1103. If not (NO in step S1102), the camera control unit 207 proceeds to step S1105.

In step S1103, the camera control unit 207 turns on a determination flag of the direction determination based on the first focus information (first direction determination flag). In the present exemplary embodiment, the camera control unit 207 refers to the first direction determination flag and starts a search drive of the focus lens 103.

In step S1104, the camera control unit 207 increments a determination end count. The determination end count is intended to monitor elapsed time since the completion of the direction determination. The determination end count is referred to in step S808 of FIG. 8.

In step S1105, the camera control unit 207 clears the determination end count. In this processing, the camera control unit 207 clears the determination end count because the search drive transition counter falls below the predetermined value and no direction has been identified. After such processing, the camera control unit 207 ends the direction determination processing based on the first focus information.

Figure 11B:
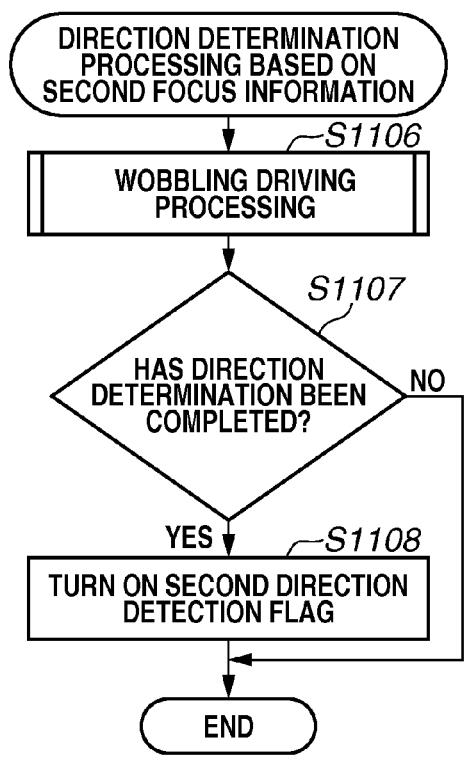

Next, the direction determination processing based on the second focus information in step S804 of FIG. 8 will be described with reference to FIG. 11B. In step S1106, the camera control unit 207 performs wobbling driving of the focus lens 103. This wobbling driving processing will be described below with respect to FIGS. 18 and 19.

In step S1107, the camera control unit 207 determines whether the direction determination based on the second focus information has been completed. If the direction determination of the wobbling driving has been completed by processing to be described below (YES in step S1107), the camera control unit 207 proceeds to step S1108. If not (NO in step S1107), the camera control unit 207 ends the direction determination processing based on the second focus information.

In step S1108, the camera control unit 207 turns on a determination flag of the direction determination based on the second focus information (second direction determination flag). The camera control unit 207 refers to the second direction determination flag and starts a search drive of the focus lens 103. After such processing, the camera control unit 207 ends the direction determination processing based on the second focus information.

Figure 15A:
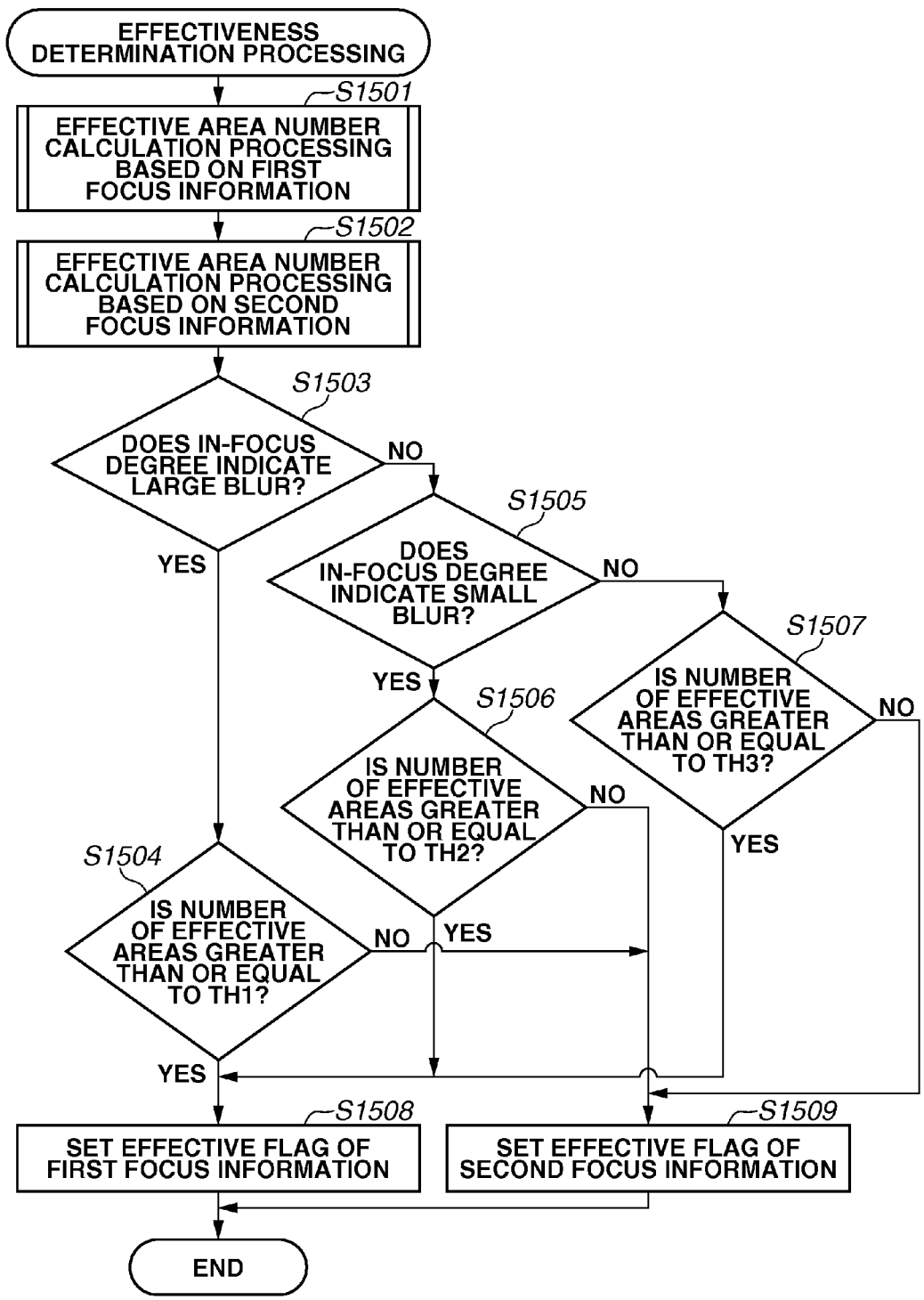

Next, the processing for determining the effectiveness of the first and second focus information in step S805 of FIG. 8 will be described with reference to FIG. 15A. In step S1501, the camera control unit 207 performs effective area number calculation processing based on the first focus information. If there is a plurality of areas in a focus detection frame like FIG. 12D described above, the camera control unit 207 determines effective areas and calculates the number of effective areas. This processing will be described in detail below with reference to FIG. 16.

In step S1502, the camera control unit 207 performs in-focus degree calculation processing based on the second focus information. Here, the camera control unit 207 calculates the in-focus degree from the obtained contrast information. This processing will be described in detail below with reference to FIG. 17.

In step S1503, the camera control unit 207 determines whether there is a large blur based on the in-focus degree calculated in step S1502. A large-blur state refers to a state where the in-focus degree is low and the focus is largely blurred. If the in-focus degree indicates the large-blur state (YES in step S1503), the camera control unit 207 proceeds to step S1504. If not (NO in step S1503), the camera control unit 207 proceeds to step S1505.

In step S1504, the camera control unit 207 determines whether the number of effective areas calculated in step S1501 is greater than or equal to TH1. If the number is greater than or equal to TH1 (YES in step S1504), the camera control unit 207 proceeds to step S1508. If the number is less than TH1 (NO in step S1504), the camera control unit 207 proceeds to step S1509.

In step S1505, the camera control unit 207 determines whether there is a small blur based on the in-focus degree. A small-blur state refers to a state where the in-focus degree is lower than an in-focus state and higher than the foregoing large-blur state. If the in-focus degree indicates the small-blur state (YES in step S1505), the camera control unit 207 proceeds to step S1506. If not (NO in step S1505), the camera control unit 207 determines that the focus lens 103 is in the in-focus state, and proceeds to step S1507.

In step S1506, the camera control unit 207 determines whether the number of effective areas calculated in step S1501 is greater than or equal to TH2. If the number is greater than or equal to TH2 (YES in step S1506), the camera control unit 207 proceeds to step S1508. If the number is less than TH2 (NO in step S1506), the camera control unit 207 proceeds to step S1509. TH2 is a value smaller than TH1.

In step S1507, the camera control unit 207 determines whether the number of effective areas calculated in step S1501 is greater than or equal to TH3. If the number is greater than or equal to TH3 (YES in step S1507), the camera control unit 207 proceeds to step S1508. If the number is less than TH3 (NO in step S1507), the camera control unit 207 proceeds to step S1509. TH3 is a value smaller than TH2. Step S1508 is the processing to which the camera control unit 207 proceeds if the effectiveness of the first focus information is high. In step S1508, the camera control unit 207 sets an effective flag of the first focus information, and ends the processing. The effective flag of the first focus information is referred to in step S806 of FIG. 8.

Step S1509 is the processing to which the camera control unit 207 proceeds if the effectiveness of the second focus information is high. In step S1509, the camera control unit 207 sets an effective flag of the second focus information, and ends the processing. The effective flag of the second focus information is referred to in step S806 of FIG. 8.

FIG. 15B is a chart illustrating such processing. In FIG. 15B, the symbol C indicates that the second focus information (contrast AF) is effective. The symbol P indicates that the first focus information (phase-difference AF) is effective. In the present exemplary embodiment, the camera control unit 207 sets a threshold of the phase-difference AF in terms of the number of direction-detected areas (reliability). In the example of FIG. 15B, if the focus lens 103 is determined to be in the in-focus state based on the second focus information, the threshold to make the result of the phase-difference AF effective is set to three. In other words, if the number of effective areas calculated in step S1501 is three or more, the detection result of the phase-difference AF is determined to be effective. In the case of a large blur, the threshold to make the result of the phase difference AF effective is set to five. According to such processing, if the in-focus degree based on the contrast information is high, the result of the phase-difference AF is actively used. If the in-focus degree is low, the result of the contrast AF is actively used.

If there are not many effective areas of the phase-difference AF, an erroneous defocus direction is more likely to be determined. With the imaging surface phase-difference AF in particular, the pair of image signals tend to become asymmetric and the reliability of the AF result tends to drop if the focus lens 103 is far from the in-focus position. In the present exemplary embodiment, the camera control unit 207 therefore uses the contrast information to determine the in-focus degree in a simplified manner, and changes the threshold which makes the phase-difference AF effective according to the determination result. Specifically, if the in-focus degree is high, the camera control unit 207 sets the threshold which makes the phase-difference AF effective to be low. If the in-focus degree is low, the camera control unit 207 sets the threshold which makes the phase-difference AF effective to be high.

The use of the contrast information to change the condition for using the result of the phase-difference AF is one of the characteristics of the present exemplary embodiment. When determining a focusing direction and performing a search drive in situations where the reliability of the phase-difference AF is not high (the defocus amount is unreliable), the camera control unit 207 determines whether the focusing direction based on the phase-difference AF is reliable. If the phase-difference AF is reliable, the camera control unit 207 can use the result of the direction determination by the phase-difference AF to quickly perform an AF operation. If the phase-difference AF is unreliable, the camera control unit 207 can use the focusing direction based on the more reliable contrast AF to perform an AF operation.

Figure 16:
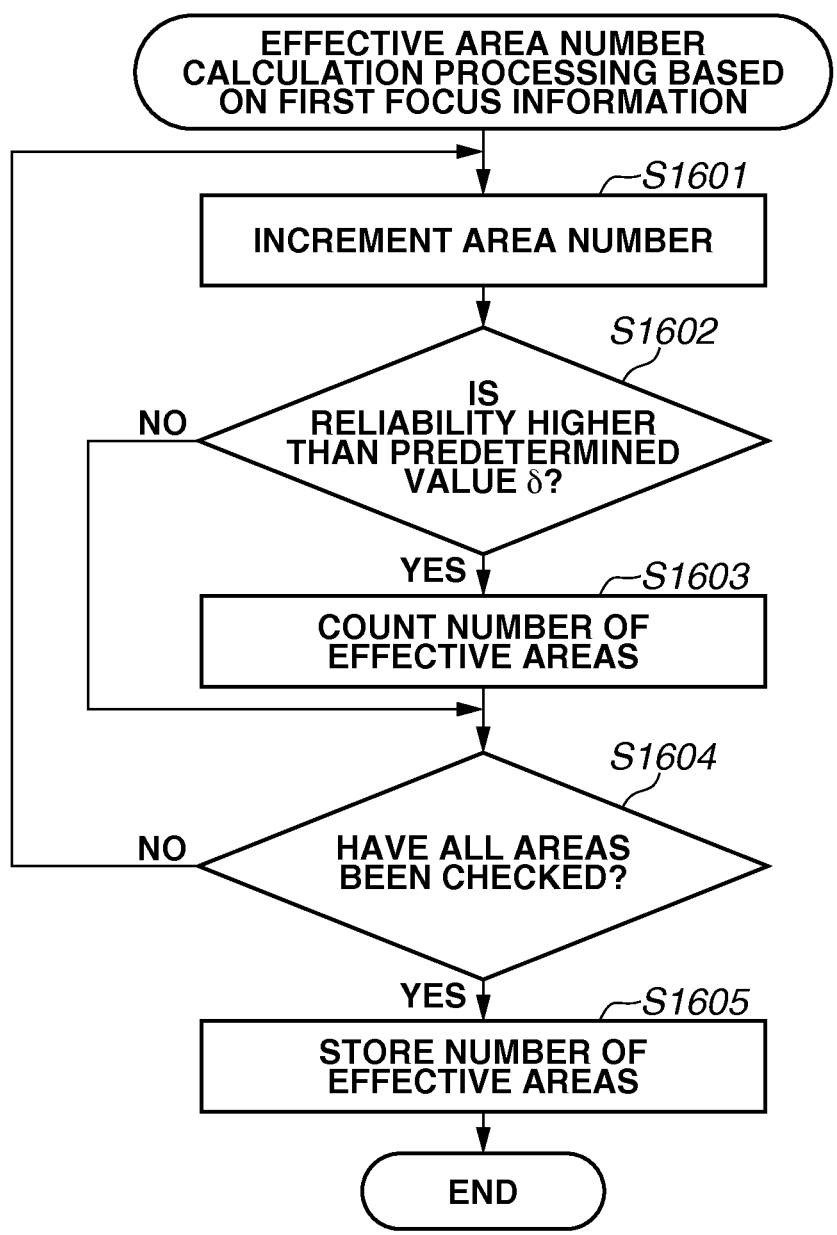
FIG. 16 is a flowchart illustrating effective area number calculation processing based on the first focus information according to the present exemplary embodiment.

Next, the effective area number calculation processing based on the first focus information in step S1501 of FIG. 15A will be described with reference to FIG. 16. In step S1601, to check the focus detection results of all focus detection area sensors such as illustrated in FIG. 12D, the camera control unit 207 increments an area number which covers the topmost to bottommost areas.

In step S1602, the camera control unit 207 determines whether the reliability of the phase-difference AF is higher than a predetermined value δ, based on the image signals obtained in the determination target area (detection area). The predetermined value δ (first level) is set to such a threshold that at least the defocus direction is reliable based on the phase difference between the image signals. If the reliability is higher than the predetermined value δ (YES in step S1602), the camera control unit 207 determines that the area is capable of identifying the direction to the object, and proceeds to step S1603. If the reliability is lower than the predetermined value δ (NO in step S1602), the camera control unit 207 determines that the area is incapable of identifying the direction, and proceeds to step S1604.

In step S1603, the camera control unit 207 counts the number of effective areas. In step S1604, the camera control unit 207 determines whether all the areas have been checked. If all the areas have been checked (YES in step S1604), the camera control unit 207 proceeds to step S1605. If all the areas have not been checked (NO in step S1604), the camera control unit 207 proceeds to step S1601.

In step S1605, the camera control unit 207 stores the number of effective areas. The stored number of effective areas is referred to in steps S1504, S1506, and S1507 of FIG. 15A. After the processing for storing the number of effective areas, the camera control unit 207 ends the effective area number calculation processing based on the first focus information.

Figure 17A:
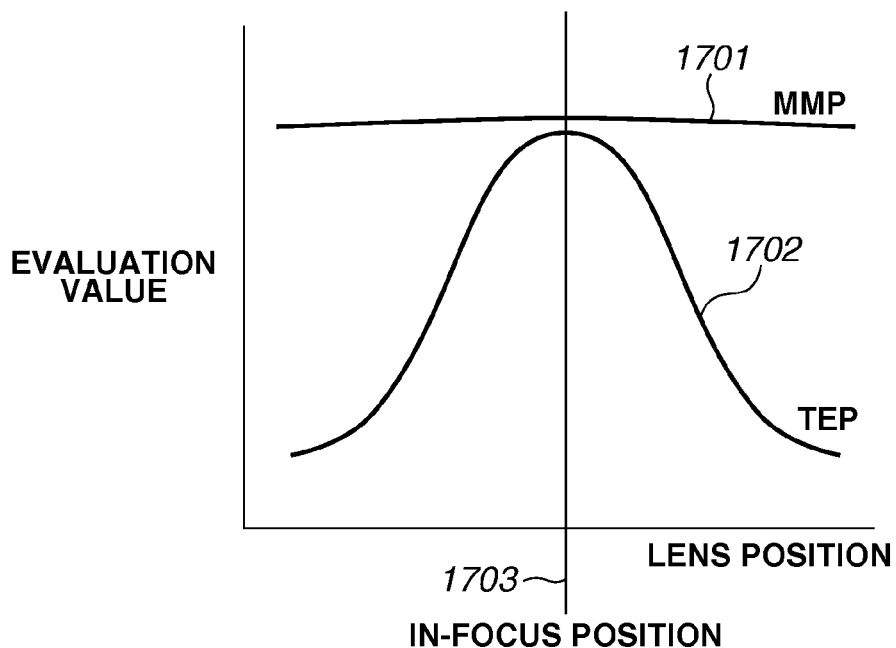
FIGS. 17A and 17B are charts illustrating a simplified method for calculating an in-focus degree according to the present exemplary embodiment.

Next, the in-focus degree calculation processing will be described by using FIGS. 17A and 17B. FIG. 17A is a graph illustrating contrast values generated from the imaging signal. The horizontal axis indicates the position of the focus lens 103. The vertical axis indicates evaluation values. The present exemplary embodiment uses two types of evaluation values, an MMP 1701 and a TEP 1702. The MMP 1701 indicates the peak value of contract in luminance. The TEP 1702 is a certain frequency component extracted from the imaging signal. The present exemplary embodiment uses a frequency band of 1.5 MHz, which is just an example. The TEP 1702 has a convex distribution about an in-focus position 1703. This is because as the focus lens 103 approaches an in-focus state from a large-blur state, the edges of the object become sharper and high-frequency components increase as compared to low-frequency components. The TEP 1703 thus peaks at the in-focus position 1703. Meanwhile, the MMP 1701 indicating the peak value of the contrast in luminance varies little in magnitude unless the object in the screen changes.

Figure 17B:
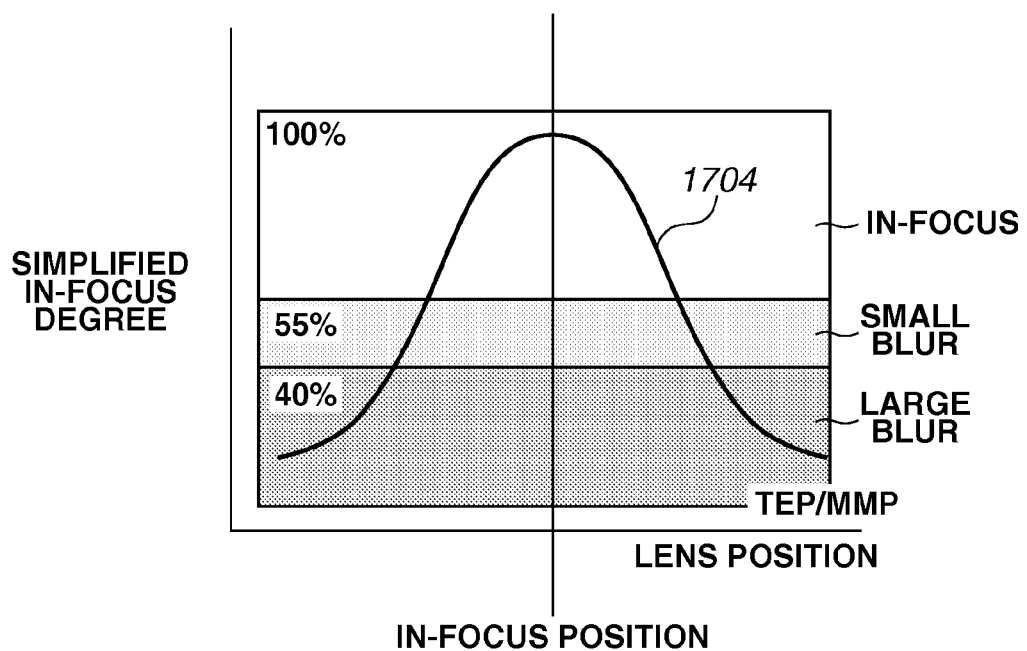

FIG. 17B illustrates a simplified in-focus degree calculated by using such a characteristic. The simplified in-focus degree 1704 is obtained by dividing TEP 1702 by MMP 1701. As illustrated in FIG. 17B, the simplified in-focus degree 1704 has a convex distribution. In the present exemplary embodiment, the convex distribution is expressed in percentages. A simplified in-focus degree of 55% or higher is determined to be in the in-focus state, 40% or higher a small blur, and lower than 40% a large blur. Such values are just an example, and may be changed depending on objects and conditions.

The lower the simplified in-focus degree is, the more likely the position of the focus lens 103 is far from the in-focus position. The higher the simplified in-focus degree, the more likely the position of the focus lens 103 is close to the in-focus position. The determination result of the in-focus degree calculated here is referred to in steps S1503 and S1505 of FIG. 15A to determine the threshold of the number of effective areas of the phase-difference AF.

Next, the wobbling driving processing in step S1106 of FIG. 11B will be described with reference to FIG. 18. In step S1801, the camera control unit 207 determines whether a counter indicating an operation state of wobbling driving is currently at zero. If the counter is at zero (YES in step S1801), the camera control unit 207 proceeds to step S1802. If the counter is not at zero (NO in step S1801), the camera control unit 207 proceeds to step S1803.

In step S1802, the camera control unit 207 stores the current AF evaluation value level in the processing when the focus lens 103 is on a closest distance side. The AF evaluation value level here derives from the imaging signal generated from a charge stored in the image sensor 201 when the focus lens 103 is on an infinite distance side in step S1810.

In step S1803, the camera control unit 207 determines whether the counter is currently at one. If the counter is at one (YES in step S1803), the camera control unit 207 proceeds to step S1804. If the counter is not at one (NO in step S1803), the camera control unit 207 proceeds to step S1809.

In step S1804, the camera control unit 207 calculates an oscillation amplitude and a center movement amplitude for driving the focus lens 103 in step S1808 to be described below. The camera control unit 207 usually sets the amplitudes within the depth of focus.

In step S1805, the camera control unit 207 compares the AF evaluation value level on the infinite distance side stored in step S1802 with the AF evaluation value level on the closest distance side stored in step S1810 described below. If the former is greater (YES in step S1805), the camera control unit 207 proceeds to step S1806. If the latter is greater (NO in step S1806), the camera control unit 207 proceeds to step S1807.

In step S1806, the camera control unit 207 adds the oscillation amplitude and the center movement amplitude and sets the sum as a driving amplitude. In step S1807, the camera control unit 207 sets the oscillation amplitude as the driving amplitude. That is, if the AF evaluation value level on the infinite distance side is greater, the center position of the oscillation is moved to the infinite distance side.

In step S1808, the camera control unit 207 performs control to drive the focus lens 103 in the infinite distance direction based on the driving amplitude determined in step S1806 or S1807.

In step S1809, the camera control unit 207 determines whether the counter is currently at two. If the counter is at two (YES in step S1809), the camera control unit 207 proceeds to step S1810. If the counter is not at two (NO in step S1809), the camera control unit 207 proceeds to step S1811.

In step S1810, the camera control unit 207 stores the current AF evaluation value level in the processing when the focus lens 103 is on the infinite distance side. The AF evaluation value level here derives from the imaging signal generated from a charge stored in the image sensor 201 when the focus lens is on the closest distance side in step S1802.

In step S1811, the camera control unit 207 calculates the oscillation amplitude and the center movement amplitude for driving the focus lens 103 in step S1815 to be described below. The camera control unit 207 usually sets the amplitudes within the depth of focus.

In step S1812, the camera control unit 207 compares the AF evaluation value level on the closest distance side stored in step S1810 with the AF evaluation value level on the infinite distance side stored in step S1802. If the former is greater (YES in step S1812), the camera control unit 207 proceeds to step S1813. If the latter is greater (NO in step S1812), the camera control unit 207 proceeds to step S1814.

In step S1813, the camera control unit 207 adds the oscillation amplitude and the center movement amplitude and sets the sum as the driving amplitude. In step S1814, the camera control unit 207 sets the oscillation amplitude as the driving amplitude. That is, if the AF evaluation value level on the closest distance side is greater, the center position of the oscillation is moved to the closest distance side.

In step S1815, the camera control unit 207 drives the focus lens 103 in the closest distance direction based on the driving amplitude determined in step S1813 or S1814.

In step S1816, the camera control unit 207 determines whether there are a predetermined number of in-focus points in a row in the same direction. If there are such in-focus points (YES in step S1816), the camera control unit 207 proceeds to step S1817. If not (NO in step S1816), the camera control unit 207 proceeds to step S1818.

In step S1817, the camera control unit 207 determines that a direction determination is successfully made, and proceeds to step S1818. In step S1818, if the counter indicating the operation state of the wobbling driving is at three, the camera control unit 207 resets the counter to zero. If the counter is at other values, the camera control unit 207 increments the counter.

FIG. 19 illustrates the operation of the focus lens 103 varying with time in the wobbling driving. The upper part of FIG. 19 illustrates a vertical synchronizing signal of the captured image. The lower part of FIG. 19 illustrates a graph in which the horizontal axis indicates time and the vertical axis the position of the focus lens 103. An AF evaluation value EVA of a charge accumulated in the image sensor 201 at the time of label A is received by the camera control unit 207 at time TA. An AF evaluation value EVB of a charge accumulated in the image sensor 201 at the time of label B is received by the camera control unit 207 at time TB. The camera control unit 207 compares the AF evaluation values EVA and EVB at time TC. Only if the AF evaluation value EVB in FIG. 19 is greater, the camera control unit 207 moves the oscillation center. Here, the focus lens 103 is moved with reference to the depth of focus. The amount of movement is set not to be recognizable on the screen.

As described above, according to the present exemplary embodiment, the imaging apparatus equipped with imaging surface phase-difference AF and contrast AF changes the threshold for making the phase-difference AF effective by using the contrast information if the reliability of the phase-difference AF is low (the defocus amount is unreliable). Suppose that the focus lens 103 is far from the in-focus position (in a large-blur state). In such a case, if AF is performed by using the result of the phase-difference detection, the focus lens 103 is likely to be driven in an erroneous direction. The camera control unit 207 then changes the use frequency of the result of the phase-difference detection by using the in-focus degree based on the contrast information so that an appropriate AF method can be selected according to the photographing situation.

Next, a second exemplary embodiment will be described. The second exemplary embodiment performs different processing depending on whether zooming is in process. In the following description, only differences of the second exemplary embodiment from the first exemplary embodiment will be described. A description of similar portions will be omitted.

Even in the present exemplary embodiment, the configuration of the interchangeable-lens camera illustrated in FIG. 1 is employed. In the present exemplary embodiment, the interchangeable-lens camera includes the configuration of the zoom lens 108 and the zoom lens driving unit 109.

A series of processes characteristic of the processing during zooming according to the present exemplary embodiment is described below. An overview will initially be given. During the zooming, the reliability of the phase-difference AF decreases because an F-number and a focal length vary.

If the focus lens 103 is driven by using the defocus amount based on the result of the phase-difference, a blur can occur. To prevent blurring, the focus lens 103 is desirably driven during the zooming by using the contrast AF as much as possible.

In the present exemplary embodiment, the camera control unit 207 performs the wobbling driving to drive the focus lens 103 to the closest distance side and the infinite distance side during zooming. The camera control unit 207 can thereby determine the focusing direction based on the contrast information. The status of the object may change during zoom driving in the focusing direction based on the contrast information. In such a case, it may take a long time to identify the in-focus position. In the present exemplary embodiment, the camera control unit 207 then uses the result of the phase-difference AF as well if a condition is met, and changes the condition by using the in-focus degree based on the contrast information. Specifically, suppose that the in-focus degree is relatively high, i.e., the focus lens 103 is somewhat close to the in-focus position. In such a case, the camera control unit 207 also uses the result of the phase-difference AF if the reliability of the phase difference (the number of effective areas) is high. If the in-focus degree is low (large blur), the camera control unit 207 uses both the results of the contrast AF and the phase-difference AF to give priority to quickly driving the focus lens 103 to near the in-focus position. Such determination processing will be described below with reference to FIG. 20. Based on the determination result, whether to use the phase-difference AF as well can be determined to enable smoother AF even during zooming.

In the present exemplary embodiment, like the first exemplary embodiment, the processing of FIGS. 4 to 7 described above is performed. The lens driving setting of the present exemplary embodiment in step S703 of FIG. 7 will be described with reference to FIG. 20.

In step S2001, the camera control unit 207 determines whether the zoom lens 108 is being driven. If the zoom lens 108 is being driven (YES in step S2001), the camera control unit 207 proceeds to step S2003. If the zoom lens 108 is not being driven (NO in step S2001), the camera control unit 207 proceeds to step S2002. In step S2002, the camera control unit 207 makes the same lens driving setting as that of the first exemplary embodiment (FIG. 8) because the zoom lens 108 is not in the process of zoom driving.

In step S2003, the camera control unit 207 performs direction determination processing based on the first focus information (phase difference) during zooming. This processing will be described below with reference to FIG. 22. After the determination of the direction based on the first focus information, the camera control unit 207 proceeds to step S2004.

In step S2004, the camera control unit 207 determines the effectiveness of the first and second focus information. This processing will be described below with reference to FIG. 24. After the determination of the effectiveness, the camera control unit 207 proceeds to step S2005.

In step S2005, the camera control unit 207 performs determination processing according to the in-focus degree calculated in step S2402 of FIG. 24 to be described below. If it is determined that the in-focus state indicates a large blur (YES in step S2005), the camera control unit 207 proceeds to step S2006. If it is determined that the in-focus state does not indicate a large blur (NO in step S2005), the camera control unit 207 proceeds to step S2007.

In step S2006, the camera control unit 207 determines whether the direction determination flag based on the first focus information is on. If the direction determination flag is on (YES in step S2006), the camera control unit 207 proceeds to step S2008. In step S2008, the camera control unit 207 turns on a center movement flag based on the first focus information. If the direction determination flag is not on (NO in step S2006), the camera control unit 207 proceeds to step S2009. In step S2009, the camera control unit 207 turns off the center movement flag based on the first focus information.

In step S2007, the camera control unit 207 refers to the determination of the effectiveness calculated in step S2004 and determines whether the first focus information is effective. If the first focus information is effective (YES in step S2007), the camera control unit 207 proceeds to step S2006. If the first focus information is not effective (NO in step S2007), the camera control unit 207 proceeds to step S2009.

Figure 21:
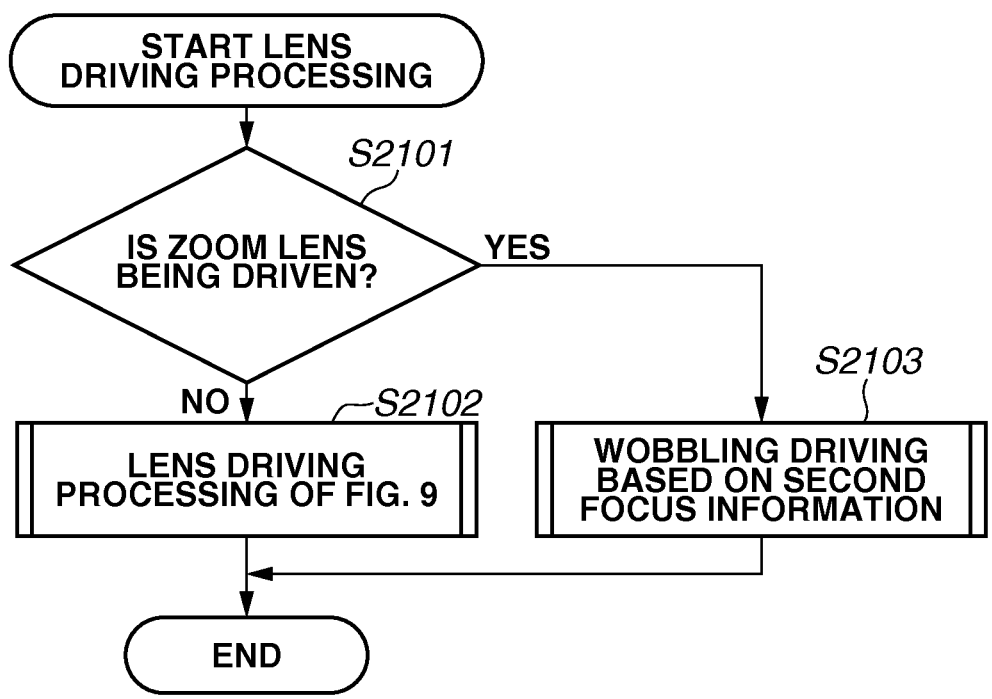
FIG. 21 is a flowchart illustrating lens driving processing during zooming according to the second exemplary embodiment.

Next, the lens driving processing of the present exemplary embodiment in step S704 of FIG. 7 will be described with reference to FIG. 21. In step S2101, the camera control unit 207 determines whether the zoom lens 108 is being driven. If the zoom lens 108 is being driven (YES in step S2101), the camera control unit 207 proceeds to step S2103. If the zoom lens 108 is not being driven (NO in step S2101), the camera control unit 207 proceeds to step S2102. In step S2102, the camera control unit 207 performs the same lens driving processing as that of the first exemplary embodiment (FIG. 9) because the zoom lens 108 is not being driven.

In step S2103, the camera control unit 207 performs wobbling driving based on the second focus information. This processing will be described below with reference to FIG. 23.

Figure 22:
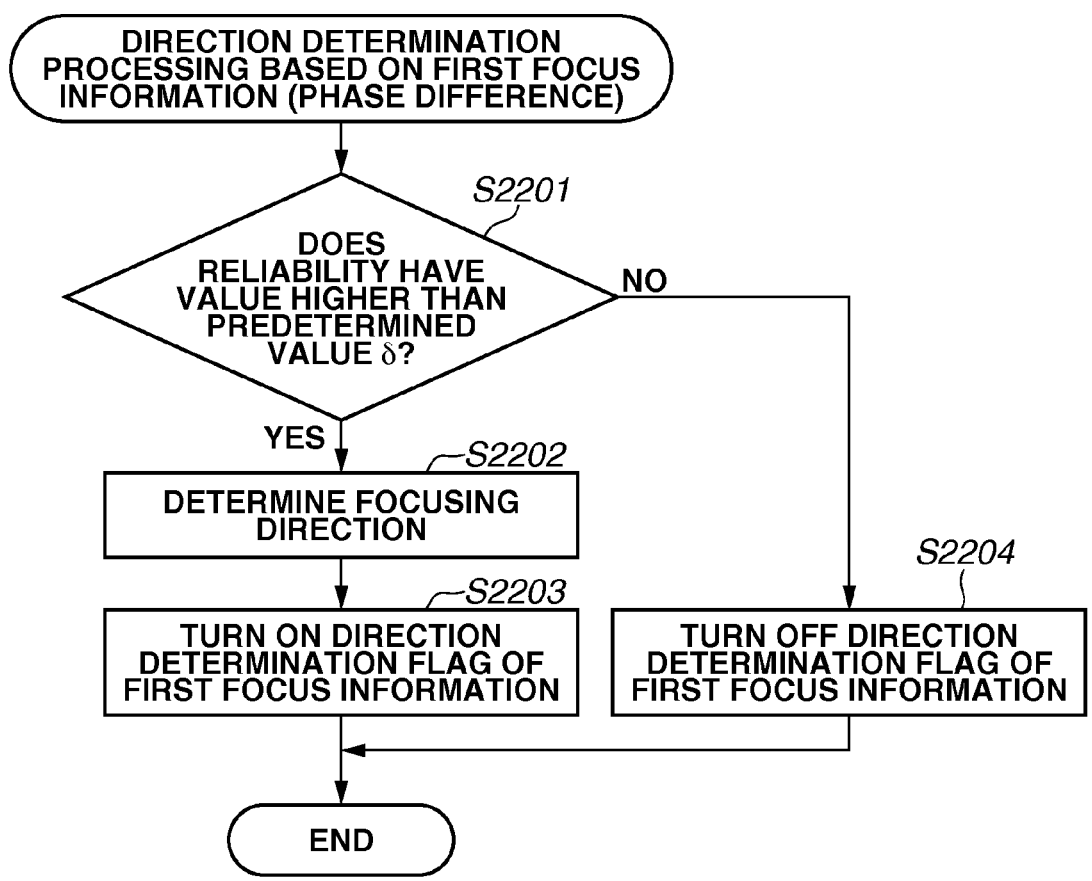
FIG. 22 is a flowchart illustrating direction determination processing based on first focus information during zooming according to the second exemplary embodiment.

Next, the direction determination processing based on the first focus information (phase difference) during zooming in step S2003 of FIG. 20 will be described with reference to FIG. 22. In step S2201, the camera control unit 207 determines whether the reliability of the first focus information has a value higher than a predetermined value δ. The predetermined value δ is set to a threshold such that the defocus direction based on the result of the phase-difference detection is reliable. If the reliability has a value higher than the predetermined value δ (YES in step S2201), the camera control unit 207 proceeds to step S2202.

In step S2202, the camera control unit 207 determines the focusing direction based on the first focus information, and proceeds to step S2203. The predetermined value δ is set to a threshold such that the defocus direction is reliable. In step S2203, the camera control unit 207 performs processing for turning on the direction determination flag of the first focus information, and then ends the processing.

If the reliability has a value lower than the predetermined value δ (NO in step S2201), the camera control unit 207 proceeds to step S2204. In step S2204, the camera control unit 207 performs processing for turning off the direction determination flag of the first focus information, and then ends the processing.

Figure 23:
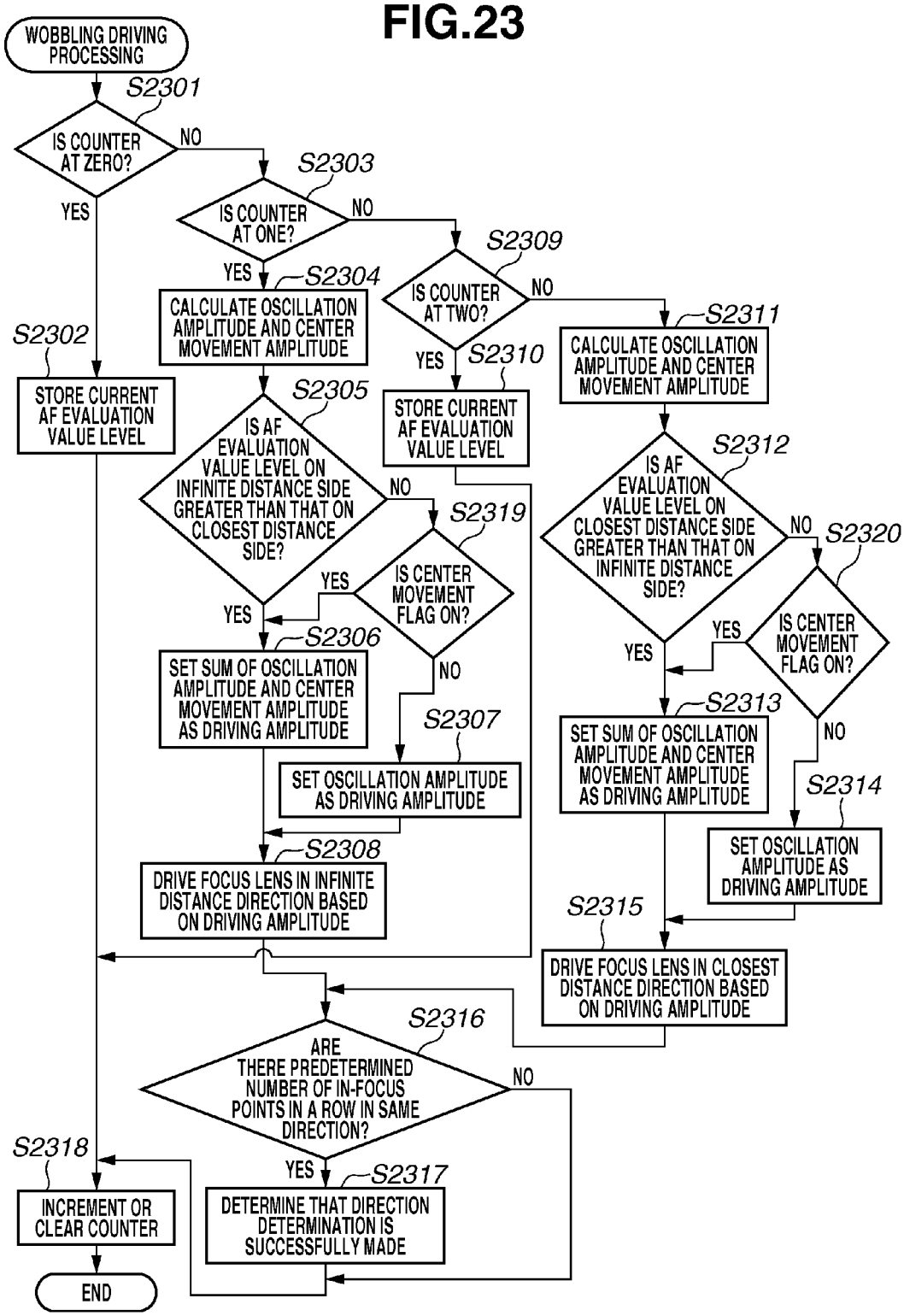
FIG. 23 is a flowchart illustrating wobbling driving processing during zooming according to the second exemplary embodiment.

Next, the wobbling driving processing based on the second focus information performed in step S2103 of FIG. 21 will be described with reference to FIG. 23. Since the flow of this processing is similar to that of the flowchart of FIG. 18 described in the first exemplary embodiment, only differences will be described. In the flowchart of FIG. 23, steps designated by numbers having the same last two digits as those of FIG. 18 represent respective corresponding processes.

In step S2319, the camera control unit 207 refers to the center movement flag described above and determines whether to move the oscillation center position. Suppose that the camera control 207 determines whether to move the oscillation center position based on the AF evaluation value like the first exemplary embodiment, and the oscillation center position does not need to be moved. Even in such a case, the camera control unit 207 moves the oscillation center position if the center movement flag based on the first focus information is set on in step S2008. If the center movement flag is on (YES in step S2319), the camera control unit 207 proceeds to step S2306. If the center movement flag is off (NO in step S2319), the camera control unit 207 proceeds to step S2307. In step S2306, the camera control unit 207 sets the driving amplitude of the focus lens 103 to move the oscillation center position to the infinite distance side. In step S2307, the camera control unit 207 sets the driving amplitude of the focus lens 103 without moving the oscillation center position.

In step S2320, the camera control unit 207 similarly refers to the center movement flag and determines whether to move the oscillation center position. If the center movement flag is on (YES in step S2320), the camera control unit 207 proceeds to step S2313. If the center movement flag is off (NO in step S2320), the camera control unit 207 proceeds to step S2314. In step S2313, the camera control unit 207 sets the driving amplitude of the focus lens 103 to move the oscillation center position to the closest distance side. In step S2314, the camera control unit 207 sets the driving amplitude of the focus lens 103 without moving the oscillation center position.

Figure 24A:
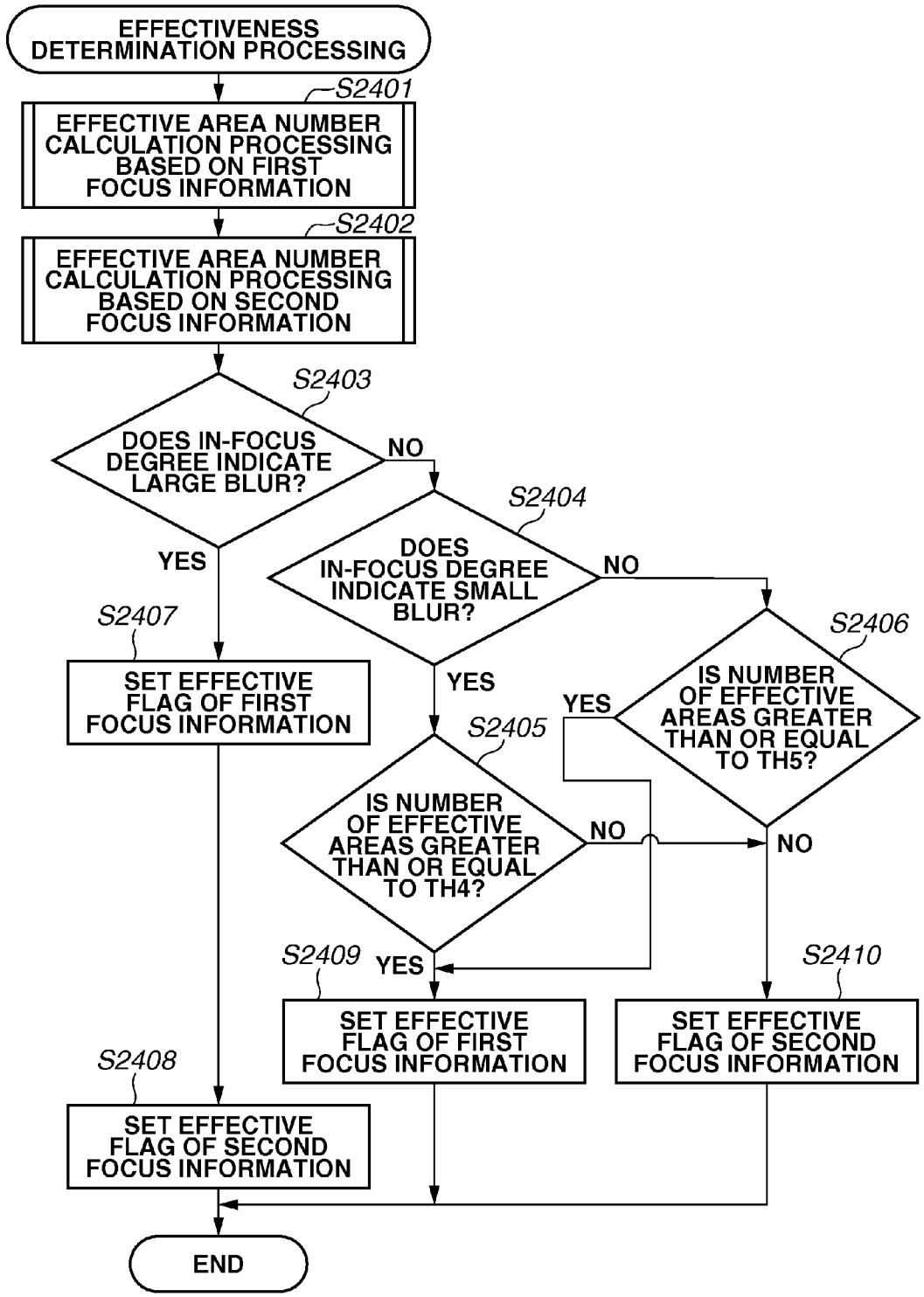

Next, the effectiveness determination processing during zooming in step S2004 of FIG. 20 will be described with reference to FIG. 24A. In step S2401, the camera control unit 207 performs effective area number calculation processing based on the first focus information. This processing is similar to that of step S1501 of FIG. 15. A description thereof will thus be omitted.

In step S2402, the camera control unit 207 performs in-focus degree calculation processing based on the second focus information. This processing is similar to that of step S1502 of FIG. 15. A description thereof will thus be omitted.

In step S2403, the camera control unit 207 determines whether the in-focus degree calculated in step S2402 indicates a large blur. If the in-focus degree indicates a large blur (YES in step S2403), the camera control unit 207 proceeds to step S2407. If not (NO in step S2403), the camera control unit 207 proceeds to step S2404.

In step S2407, the camera control unit 207 sets the effective flag of the first focus information because of the large-blur state. In step S2408, the camera control unit 207 sets the effective flag of the second focus information, and ends the processing.

In step S2404, the camera control unit 207 determines whether the in-focus degree indicates a small blur. If the in-focus degree indicates a small blur (YES in step S2404), the camera control unit 207 proceeds to step S2405. If the in-focus degree does not indicate a small blur (if in-focus; NO in step S2404), the camera control unit 207 proceeds to step S2406.

In step S2405, the camera control unit 207 determines whether the number of effective areas calculated in step S2401 is greater than or equal to a threshold TH4. If the number is greater than or equal to TH4 (YES in step S2405), the camera control unit 207 proceeds to step S2409. If the number is less than TH4 (NO in step S2405), the camera control unit 207 proceeds to step S2410.

In step S2406, the camera control unit 207 determines whether the number of effective areas calculated in step S2401 is greater than or equal to a threshold TH5. If the number is greater than or equal to TH5 (YES in step S2406), the camera control unit 207 proceeds to step S2409. If the number is less than TH5 (NO in step S2406), the camera control unit 207 proceeds to step S2410. TH5 is a value greater than TH4. The thresholds TH4 and TH5 according to the present exemplary embodiment are set to values higher than the thresholds TH1 to TH3 according to the first exemplary embodiment. The reason is that since the F-number and the focal length vary during zooming, if the focus lens 103 is driven by using the first focus information, blurring is more likely to occur as compared to when zooming is not in operation.

Step S2409 is processing to be performed if it is determined that the first focus information is effective. In step S2409, the camera control unit 207 sets the effective flag of the first focus information, and ends the processing.

Step S2410 is processing to be performed if it is determined that the second focus information is effective. In step S2410, the camera control unit 207 sets the effective flag of the second focus information, and ends the processing.

FIG. 24B is a chart illustrating such processing. In FIG. 24B, the symbol C indicates that the second focus information (contrast AF) is effective. The symbol P indicates that the first focus information (phase-difference AF) is effective. In the present exemplary embodiment, the camera control unit 207 initially sets a threshold of the phase-difference AF in terms of the number of direction-detected areas (reliability). In the example of FIG. 24B, if the focus lens 103 is determined to be in the in-focus state based on the second focus information, the threshold to make the result of the phase-difference AF effective is set at seven. In the case of a small blur, the threshold to make the result of the phase-difference AF effective is set at six. The reason is that the reliability of the phase-difference AF decreases during zooming because the F-number and the focal length vary. The camera control unit 207 therefore uses the phase-difference AF as well only if the reliability of the first focus information is sufficiently high. If the reliability of the first focus information is low, the camera control unit 207 performs AF by using only the second focus information.

In the case of a large blur, the camera control unit 207 performs AF by using the first focus information and the second focus information regardless of the number of direction-detected areas (reliability). The reason is that if the in-focus degree is low and there is a large blur, it is more efficient to perform AF by using the results of both the contrast AF and the phase-difference AF to drive the focus lens 103 to the in-focus position as quickly as possible. If the focusing direction determined from the first focus information is opposite to the focusing direction determined from the second focus information, higher priority is given to the result of the second focus information. The reason is that the imaging surface phase-difference AF, in the case of a large blur, is likely to make the image signals asymmetric and lower the focus detection performance. The values illustrated in FIG. 24B may be set to arbitrary values and not limited to the illustrated values.

As described above, in the present exemplary embodiment, the camera control unit 207 basically uses the result of the second focus information (contrast AF) actively during zooming. If the in-focus degree is low and the focus lens 103 should be quickly driven to the in-focus position, the camera control unit 207 uses the result of the first focus information (phase-difference AF) as well. Such a control enables a high-quality AF operation with less blurs even during zooming.

Figure 25:
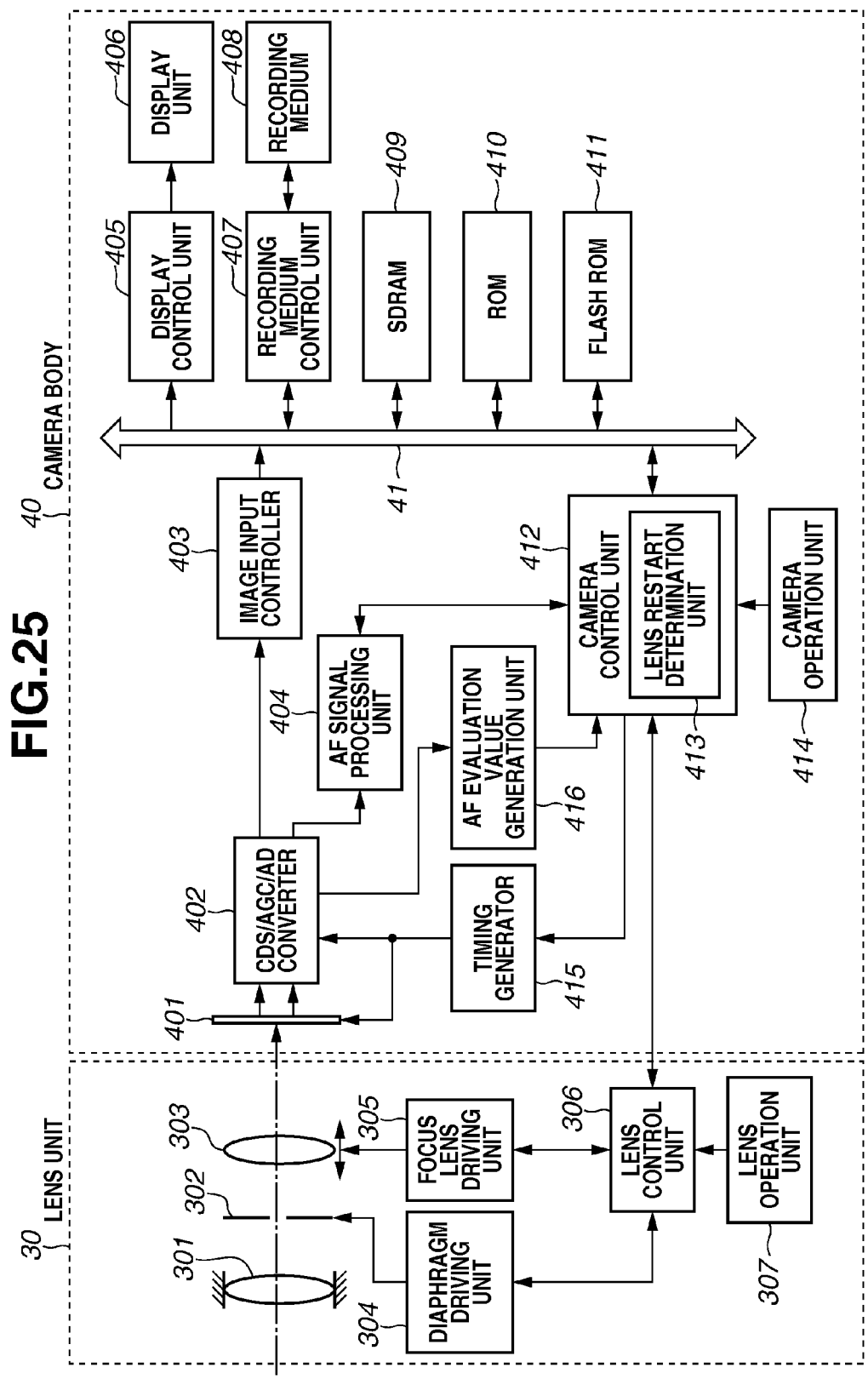
FIG. 25 is a block diagram illustrating a configuration of a camera body and a lens unit according to a third exemplary embodiment.

FIG. 25 is a block diagram illustrating a configuration of an interchangeable-lens camera including a lens unit and a camera body according to a third exemplary embodiment. As illustrated in FIG. 25, the camera system according to the present exemplary embodiment includes a lens unit 30 and a camera body 40. A lens control unit 306 controls operation of the entire lens unit 30 in a comprehensive manner. A camera control unit 412 controls operation of the entire camera. The lens control unit 306 and the camera control unit 412 communicate data with each other.

A configuration of the lens unit 30 will initially be described. The lens unit 30 includes a photographing optical system including a stationary lens 301, a diaphragm 302, and a focus lens 303. A diaphragm driving unit 304 drives the diaphragm 302 to control the amount of light incident on an image sensor 401 to be described below. A focus lens driving unit 305 drives the focus lens 303 for focus adjustment.

The lens control unit 306 controls the diaphragm drive unit 304 and the focus lens driving unit 305 to determine an aperture amount of the diaphragm 302 and a position of the focus lens 303. If the user makes a focus operation via a lens operation unit 307, the lens control unit 306 performs control according to the user operation. The lens control unit 306 controls the diaphragm driving unit 304 and the focus lens driving unit 305 according to control commands and control information received from the camera control unit 412 to be described below. The lens control unit 306 transmits lens information to the camera control unit 412.

Next, a configuration of the camera body 40 including an automatic focus adjustment apparatus according to the present exemplary embodiment will be described. The camera body 40 is configured to be able to obtain an imaging signal from a light flux passed through the photographing optical system of the lens unit 30. The image sensor 401 includes a CCD or CMOS sensor. The light flux passed through the photographing optical system forms an image on a light receiving surface of the image sensor 401. The formed object image is converted (photoelectrically converted) by photodiodes into electrical charges according to the amount of incident light. The charges stored in the respective photodiodes are read from the image sensor 201 in succession as voltage signals according to the charges, based on drive pulses given from a timing generator 415 according to a command from the camera control unit 412. The image sensor 401 has a similar configuration to that of the image sensor 201 described in the first exemplary embodiment with reference to FIG. 2. A description thereof will thus be omitted.

The imaging signal and AF signals read from the image sensor 401 are input to a CDS/AGC/analog-to-digital (AD) converter 402. The CDS/AGC/AD converter 402 performs correlated double sampling for removing reset noise, a gain adjustment, and signal digitization. The CDS/AGC/AD converter 402 outputs the imaging signal to an image input controller 403 and an AF evaluation value generation unit 416. The CDS/AGC/AD converter 402 outputs signals for imaging surface phase-difference AF to an AF signal processing unit 404.

The image input controller 403 stores the imaging signal output from the CDS/AGC/AD converter 402 in a synchronous dynamic random access memory (SDRAM) 409. A display control unit 405 displays the imaging signal stored in the SDRAM 409 on a display unit 406 via a bus 41. In a mode for recording the imaging signal, a recording medium control unit 407 records the imaging signal on a recording medium 408.

A ROM 401 is connected with the bus 41. The ROM 401 stores a control program for the camera control unit 412 to execute and various types of data needed for control. A flash ROM 411 stores various types of setting information related to the operation of the camera body 40, including user setting information.

The AF signal processing unit 404 performs a correlation calculation based on two AF image signals output from the CDS/AGC/AD converter 402 to calculate the amount of image deviation and reliability information (including a two-image matching level, a two-image steepness, contrast information, saturation information, and defect information). The CDS/AGC/AD converter 402 outputs the calculated amount of image deviation and the reliability information to the camera control unit 412. Based on the amount of image deviation and the reliability information obtained, the camera control unit 412 notifies the AF signal processing unit 404 of a change of settings for calculating the amount of image deviation and the reliability information. For example, if the amount of image deviation is large, the camera control unit 412 may set a wider area for the correlation calculation. The camera control unit 412 may change the type of a band-pass filter according to contrast information. Details of the correlation calculation are similar to those described above with reference to FIGS. 12A to 14D.

The AF evaluation value generation unit 416 extracts a high frequency component from the imaging signal output from the CDS/AGC/AD converter 402 to generate an AF evaluation value signal, and outputs the AF evaluation value signal to the camera control unit 412. The AF evaluation value signal indicates the sharpness (contrast state) of the image generated based on the output signal from the image sensor 401. Since the sharpness varies with the focus state (degree of in-focus) of the photographing optical system, the AF evaluation value signal consequently serves as a signal indicating the focus state of the photographing optical system. The area of the image sensor 401 used to generate the AF evaluation value includes an area corresponding to the area used to generate the image signals for phase-difference detection.

The camera control unit 412 exchanges information with the components in the camera body 40 for control. Aside from the processing inside the camera body 40, the camera control unit 412 performs camera functions operated by the user according to inputs from a camera operation unit 414. Examples of the camera functions include power on/off, change of a setting, recording start, AF control start, and check of a recorded image. The camera control unit 412 further exchanges information with the lens control unit 306 in the lens unit 30 as described above. The camera control unit 412 thereby transmits control commands and control information about the photographing optical system, and obtains information inside the lens unit 30. As a characteristic part of the present exemplary embodiment, the camera control unit 412 sets a threshold for restart determination which is used by a lens restart determination unit 413 to be described below. Details will be given below.

The lens restart determination unit 413 included in the camera control unit 412 determines whether to drive again (restart) the focus lens 303 from a stopped state. If the camera control unit 412 determines that an object is in the in-focus state, the camera determination unit 412 stops driving the focus lens 303 via the lens control unit 306 and the focus lens driving unit 305 in the lens unit 30. The lens restart determination unit 413 then determines whether to drive the focus lens 303 again, based on the information of the AF signal processing unit 404. If the lens restart determination unit 413 determines to restart the focus lens 303, the camera control unit 412 resumes driving the focus lens 303 via the lens control unit 306 and the focus lens driving unit 305 in the lens unit 30.

When capturing a still image, an AF control for quick focusing is desired. When capturing a moving image, the quality of the focusing operation is important because the appearance itself of the video image resulting from the focusing operation is recorded. One control for improving the quality includes stopping the focus lens 303 when an object is in the in-focus state, instead of continuing to drive the focus lens 303 all the time. The driving of the focus lens 303 is not resumed until the object changes or is determined to be blurred. Continuing driving the focus lens 303 without a stop has the following problem. For example, the camera may accidentally measure the distance to an object having low focus detection accuracy such as a low contrast portion. Objects other than the intended one may cut across. In such cases, accidental focusing can cause a blur, which deceases the quality of the moving image. When capturing an moving image, the camera control unit 412 therefore performs control to once stop the focus lens 303 if the object is determined to be in the in-focus state. If the camera control unit 412 determines that the object has changed, it resumes focusing. Such a control can suppress useless focusing operations and improve the quality.

As described above, when resuming drive of the focus lens 303 from a stopped state, the camera control unit 412 can desirably prevent accidental focusing operations by performing control to restart the focus lens 303 only if it is determined that the status of the object (in-focus state) has surely changed. For example, the camera control unit 412 may perform processing for not restarting the focus lens 303 if the defocus amount falls within the depth, and restarting the focus lens 303 if a defocus amount outside the depth is detected for a certain time. In such a manner, the camera control unit 412 can determine that the in-focus state has changed.

However, in some photographing scenes, focusing may not be desired even if the in-focus state changes. For example, if an object temporarily goes off the focus detection area and back, the object having been in the in-focus state can be kept in the in-focus state without a restart. On the other hand, if the scene is changed by panning from the state where the focus lens 303 is stopped, a restart should be quickly performed to minimize the blurring period for focus tracking.

In the present exemplary embodiment, when restarting the focus lens 303 from a stopped state, the camera control unit 412 (lens restart determination unit 413) determines whether the main object is being captured or the main object or scene has changed, based on the detected AF evaluation value signal and defocus amount. If the former is the case, the camera control unit 412 performs control to restrict a restart to maintain the stopped state of the focus lens 303 as much as possible. If the latter is the case, the camera control unit 412 performs control to quickly restart the focus lens 303 for focus tracking. Even in the former case, the camera control unit 412 can perform a restart because the status of the main object may be changed. The processing related to the restart determination will be described in detail below with reference to FIGS. 29 to 31.

An operation of the camera body 40 according to the present exemplary embodiment is similar to that of the camera body 20 according to the first exemplary embodiment described with reference to FIG. 3. A description thereof will thus be omitted. The moving image photographing processing in step S305 of FIG. 3 is similar to that of FIG. 4. A description thereof will thus be omitted. The focus detection processing in step S405 of FIG. 4 and the AF processing in step S408 are similar to the processing of FIGS. 5 and 7, respectively. A description thereof will thus be omitted.

The AF restart determination processing according to the present exemplary embodiment in step S409 of FIG. 4 will be described with reference to the flowchart of FIG. 26. The AF restart determination processing is intended to determine whether to drive the focus lens 303 again from a state where the focus lens 303 is in the in-focus state and stopped. The processing of this flow is performed by the camera control unit 412 (lens restart determination unit 413) unless otherwise specified.

In step S2601, the camera control unit 412 determines whether the reliability calculated in step S505 of FIG. 5 has a value higher than a predetermined threshold (predetermined level). If the reliability has a value higher than the predetermined threshold (YES in step S2601), the camera control unit 412 proceeds to step S2602. If the reliability has a value lower than the predetermined threshold (NO in step S2601), the camera control unit 412 proceeds to step S2604.

In step S2602, the camera control unit 412 determines whether the calculated defocus amount is smaller than a predetermined multiple of the depth. If the defocus amount is smaller than the predetermined multiple of the depth (YES in step S2602), the camera control unit 412 proceeds to step S2603. If not (NO in step S2602), the camera control unit 412 proceeds to step S2608. In step S2603, the camera control unit 412 resets AF restart counters a and b, and ends the processing.

On the other hand, in step S2604, the camera control unit 412 resets the AF restart counter a. In step S2605, the camera control unit 412 determines whether the focusing direction based on the result of the phase-difference detection is the same as last time. If the focusing direction is the same as last time (YES in step S2605), the camera control unit 412 proceeds to step S2606. In step S2606, the camera control unit 412 increments the AF restart counter b, and proceeds to step S2610. If the focusing direction is not the same as last time (NO in step S2605), the camera control unit 412 proceeds to step S2607. In step S2607, the camera control unit 412 resets the AF restart counter b, and ends the processing. The AF restart counter b indicates the number of times the same focusing direction is detected when the reliability is low (only the detected direction is usable).

In step S2608, the camera control unit 412 determines whether the focusing direction based on the result of the phase-difference detection is the same as last time. If the focusing direction is the same as last time (YES in step S2608), the camera control unit 412 proceeds to step S2609. If the focusing direction is not the same as last time (NO in step S2608), the camera control unit 412 proceeds to step S2613.

In step S2613, the camera control unit 412 resets the AF restart counter b. In step S2609, the camera control unit 412 increments the AF restart counter a, and proceeds to step S2610. The AF restart counter a indicates the number of times a defocus amount greater than or equal to the predetermined value (predetermined multiple of the depth) is detected.

As described above, if the defocus amount is greater than or equal to the predetermined value or the same focusing direction continues being detected, the status of the main object may be changed. In step S2606 or S2609, the camera control unit 412 therefore increments the AF restart counter b or a to make preparations for an AF restart. If the detected defocus amount is smaller than the predetermined value and the reliability of the result of the phase-difference detection remains high, then in step S2603, the camera control unit 412 resets the AF restart counters a and b to keep the focus lens 303 stopped.

The reliability threshold set in step S2601 is set to a value, for example, such that the distance calculated from the result of the phase-difference detection is reliable. In step S2601, if the reliability is lower than the predetermined threshold, the distance calculated from the defocus amount is unreliable and only the focusing direction is usable. The threshold of the defocusing amount set in step S2602 is tuned to facilitate a restart if the main object changes, and suppress an accidental restart if the main object does not change. For example, the threshold is set to one time the depth at which the blurring of the main object becomes visible.

In step S2610, the camera control unit 412 sets an AF restart threshold. The AF restart threshold setting processing of step S2610 is a characteristic part of the present exemplary embodiment. Here, the camera control unit 412 sets the threshold to be used when making an AF restart determination by using the AF restart counter a or b in step S2611. The AF restart threshold setting processing will be described in detail below with reference to the flowchart of FIG. 30.

The camera control unit 412 proceeds to step S2611. In step S2611, the camera control unit 412 determines whether the AF restart counter a or b is greater than or equal to the AF restart threshold. If the AF restart counter a or b is greater than or equal to the AF restart threshold (YES in step S2611), the camera control unit 412 proceeds to step S2612. If the AF restart counter a or b is smaller than the AF restart threshold (NO in step S2611), the camera control unit 412 ends the processing. In step S2612, the camera control unit 412 turns off the in-focus suspension flag to restart AF, resumes drive of the focus lens 303, and ends the processing.

In the foregoing step S2611, to restart AF, the camera control unit 412 determines whether the AF restart counter a or b incremented in step S2606 or S2609 is greater than the AF restart threshold set in step S2610. In such a manner, the camera control unit 412 performs control to check for a certain time whether the focus plane of the main object has changed. In the present exemplary embodiment, the camera control unit 412 changes the AF restart threshold set in step S2610 according to the degree of in-focus, thereby changing the condition for restart determination. If it is determined that the focus plane of the main object has changed, the camera control unit 412 performs control to quickly restart AF for focus tracking. If the focus plane has not changed (remains in-focus), the camera control unit 412 performs control to restrict the restart, thereby preventing accidental focusing which brings on a low quality behavior.

Next, the AF restart threshold setting processing in step S2610 of FIG. 26 will be described with reference to FIG. 30. In step S3001, the camera control unit 412 determines whether the degree of in-focus obtained in step S406 of FIG. 4 is higher than a threshold TH1. If the degree of in-focus is higher than TH1 (YES in step S3001), the camera control unit 412 proceeds to step S3003. If not (NO in step S3001), the camera control unit 412 proceeds to step S3002.

In step S3002, the camera control unit 412 determines whether the foregoing degree of in-focus is higher than a threshold TH2 (<TH1). If the degree of in-focus is higher than TH2 (YES in step S3002), the camera control unit 412 proceeds to step S3004. If not (NO in step S3002), the camera control unit 412 proceeds to step S3005.

As an example of the degree of in-focus, the present exemplary embodiment uses a simplified in-focus degree obtained by normalizing an AF evaluation value (TEP) with the contrast value (MMP). The AF evaluation value (TEP) is generated by extracting a specific frequency component from the imaging signal. The lower the simplified in-focus degree, the more likely the position of the focus lens 303 is far from the in-focus position. The higher the simplified in-focus degree, the more likely the position of the focus lens 303 is close to the in-focus position. The determination of the degree of in-focus is not limited to the simplified in-focus degree, and evaluation values calculated by other methods may also be used for the determination.

Figure 30:
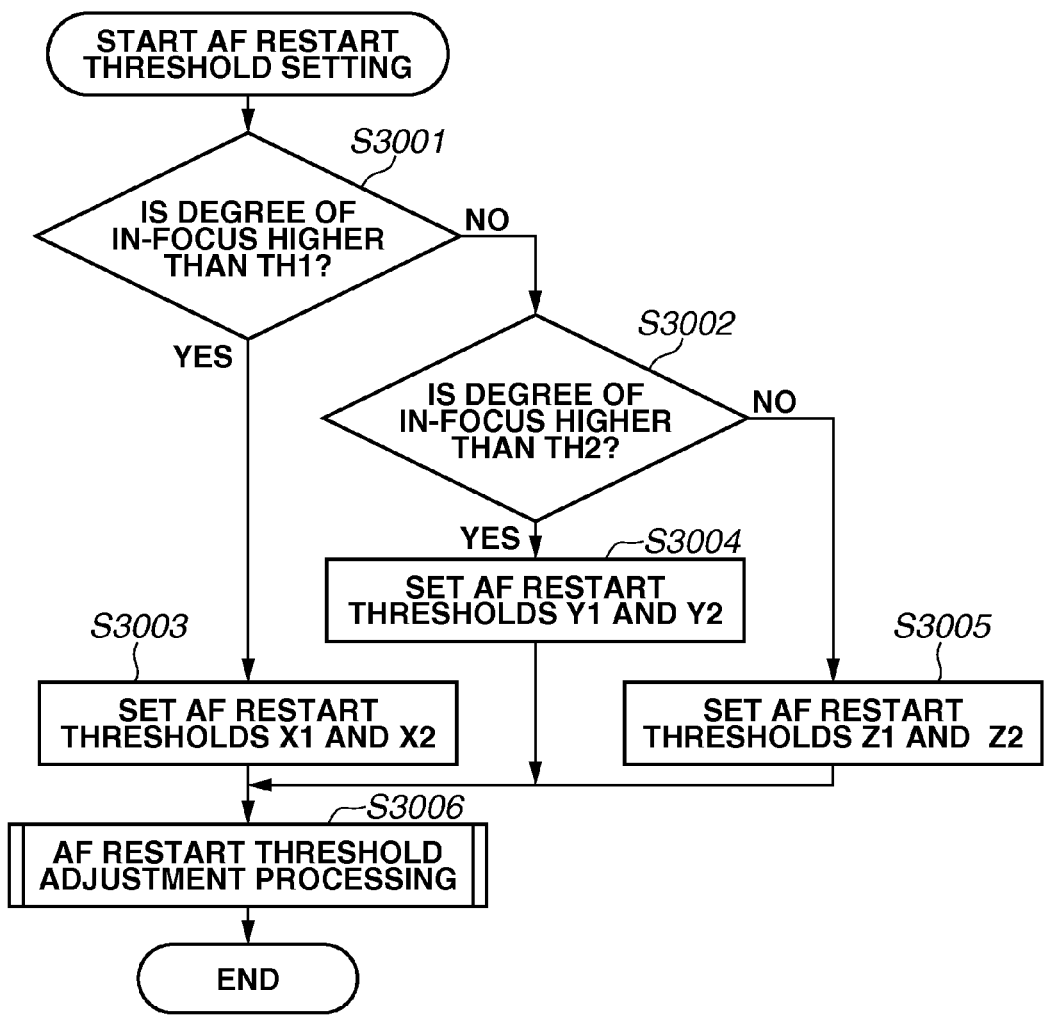
FIG. 30 is a flowchart illustrating AF restart threshold setting processing according to the third exemplary embodiment.

In steps S3003 to S3005, the camera control unit 412 sets the AF restart thresholds X1, Y1, Z1 X2, Y2, and Z2 as illustrated in FIG. 30. The AF restart thresholds X1, Y1, and Z1 are used to make a determination by the AF restart counter a. The AF restart thresholds X2, Y2, and Z2 are used to make a determination by the AF restart counter b. The AF restart thresholds X1, Y1, Z1, X2, Y2, and Z2 have the following relationship:

$$X1>Y1>Z1$$

$$X2>Y2>Z2$$

$$X1<X2, Y1<Y2, \text{ and } Z1<Z2.$$

According to such settings, if a defocus amount greater than the predetermined multiple of the depth is detected in an in-focus state, the camera control unit 412 monitors the output defocus amount for a predetermined time without immediately driving the focus lens 303. The camera control unit 412 can thereby reduce AF malfunctions. On the other hand, if a defocus amount greater than the predetermined multiple of the depth is detected in a blurred state, the camera control unit 412 can quickly drive the focus lens 303 for focus adjustment.

In step S3006, the camera control unit 412 performs processing for adjusting the set AF restart threshold, and ends the processing of the present flow. The AF restart threshold adjustment processing of step S3006 will be described in detail below with reference to FIG. 31.

As described above, in the process of AF control when capturing a moving image, the camera control unit 412 may stop the focus lens 103 with an object in focus. Then, if the camera control unit 412 determines that the object (scene) is changed, the camera control unit 412 can quickly restart the focus lens 303 to perform focusing while a user does not feel a sense of incongruity. If it is determined that the object (scene) has not changed, the focus lens 303 can be kept stopped to capture a scene without giving a sense of incongruity.

An example of a specific operation will be described with reference to FIG. 28. Suppose that in step S2601 of FIG. 26, the camera control unit 412 determines that the reliability of the detected defocus amount is higher than the predetermined value, i.e., the focus detection result is usable. In such a case, the camera control unit 412 determines whether the defocus amount falls "within the depth" or "outside the depth" illustrated in FIG. 28A. If the defocus amount falls "within the depth," the camera control unit 412 performs control to not drive but keep the focus lens 303 stopped. This corresponds to the case of YES in step S2602 of FIG. 26.

If the detected defocus amount falls "outside the depth," the camera control unit 412 sets the restart condition according to the foregoing degree of in-focus. FIG. 28B illustrates AF restart thresholds according to the degree of in-focus in a table form. In the table of FIG. 28B, if the degree of focus is determined to be "in-focus" and a defocus amount "outside the depth" is output X1=10 times or more by the focus detection processing in step S404 of FIG. 4, the camera control unit 412 restarts the focus lens 303 by using the output defocus amount. When the object is in the in-focus state, the camera control unit 412 sets the AF restart threshold to be high (10 times) to prevent an unnecessary restart. Consequently, even if the defocus amount falls "outside the depth" due to variations of the defocus result and/or temporary comings and goings of objects into/out of the focus detection area, the camera control unit 412 can perform stable focus control.

Figure 4:
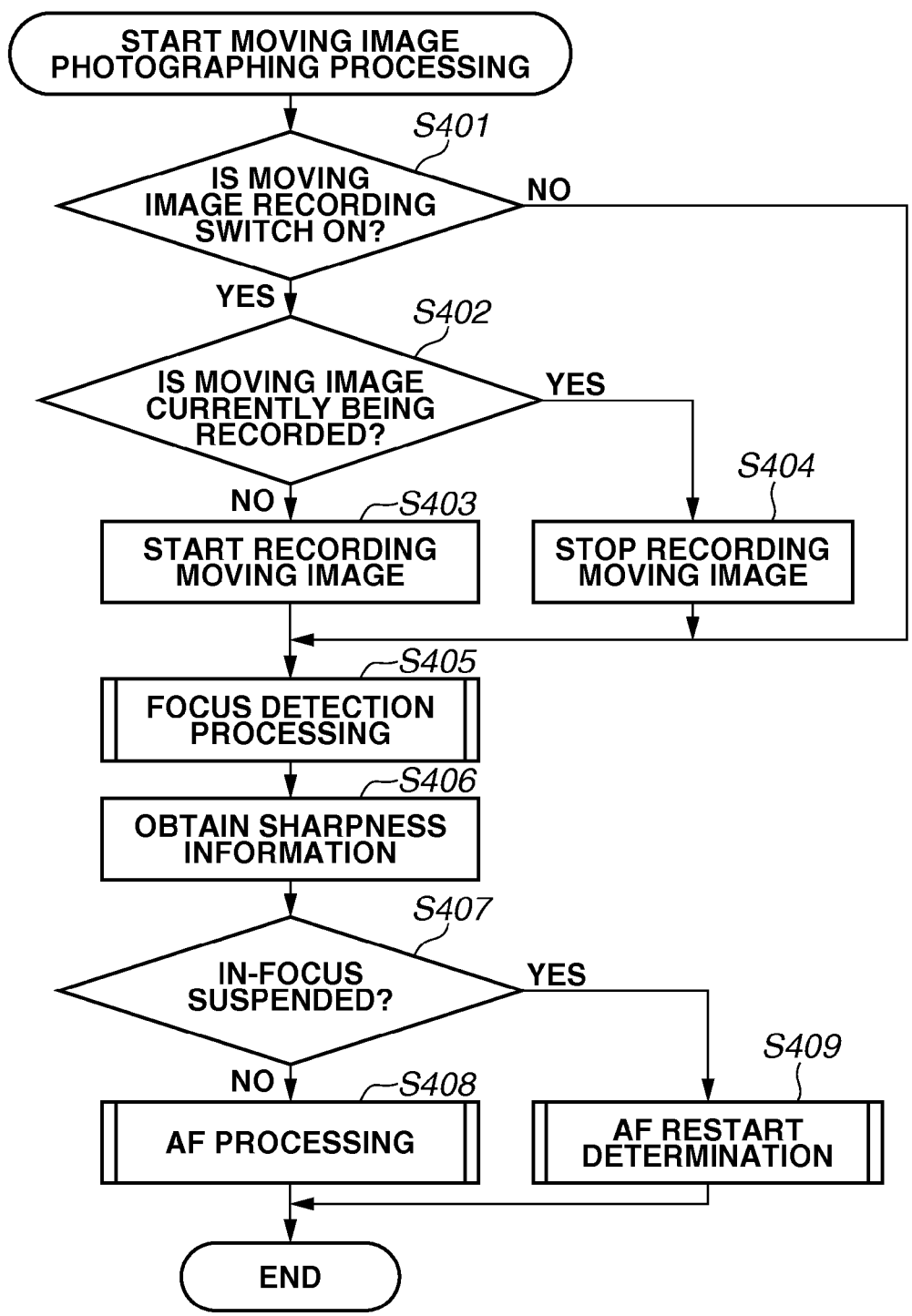
FIG. 4 is a flowchart illustrating moving image photographing processing according to the present exemplary embodiment.

If the degree of in-focus is determined to be a "small blur" and a defocus amount "outside the depth" is output Y1=5 times or more by the focus detection processing in step S404 of FIG. 4, the camera control unit 412 restarts the focus lens 303 by using the detected defocus amount. If the degree of in-focus is determined to be a "large blur" and a defocus amount "outside the depth" is output Z1=3 times or more by the focus detection processing in step S404 of FIG. 4, the camera control unit 412 restarts the focus lens 303 by using the output defocus amount.

In such a manner, if the degree of in-focus is low, the camera control unit 412 sets the AF restart threshold to be low to quickly restart the focus lens 303. Consequently, if the object or scene is changed by panning or if a new object comes into the screen to cause a blur, the camera control unit 412 can immediately restart the focus lens 303. This enables highly-responsive focus driving. The defocus amount used for a restart in the foregoing example may be the value output when the restart condition is satisfied. Alternatively, an average of defocus amounts in the past may be used.

Figure 26:
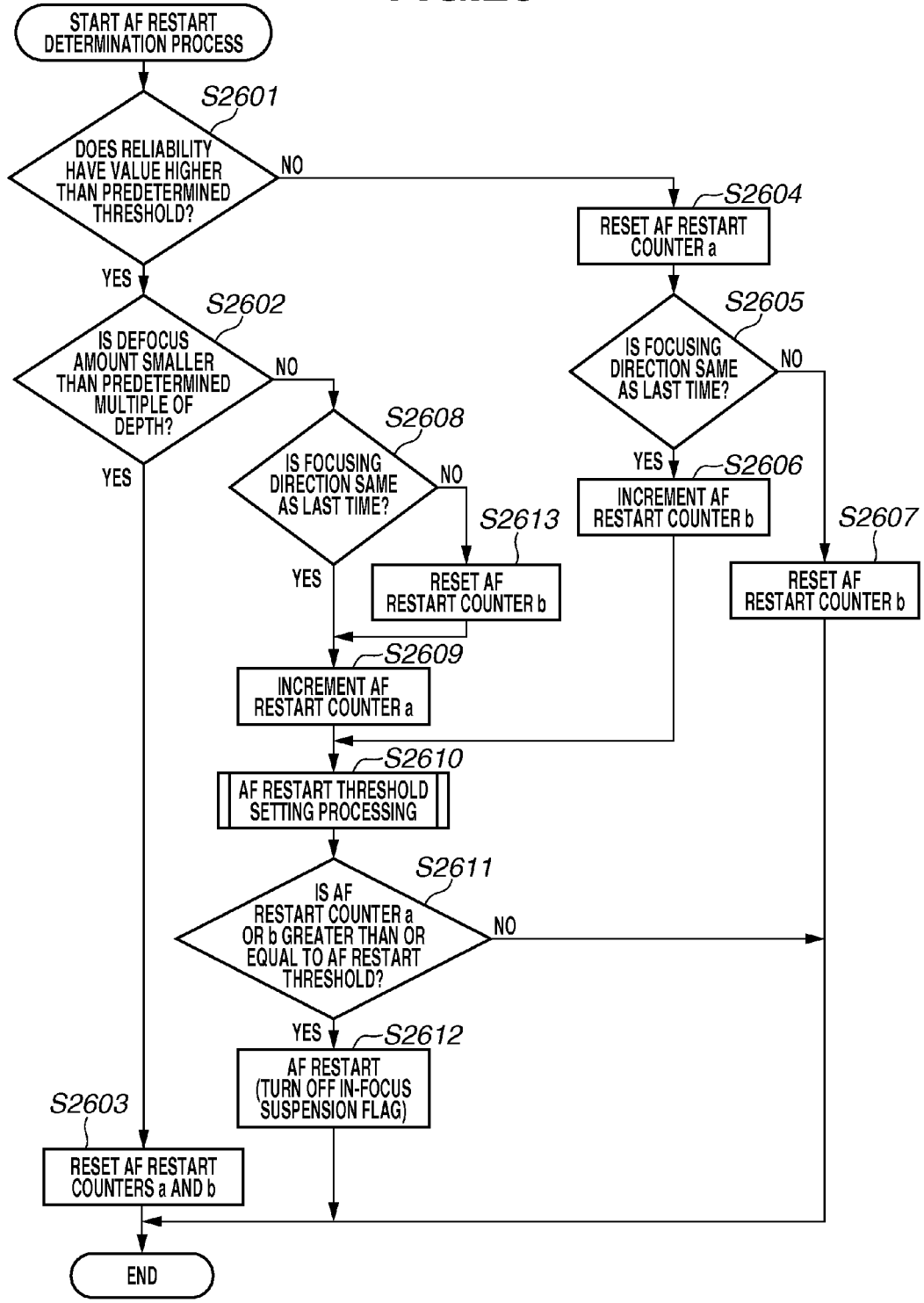
FIG. 26 is a flowchart illustrating AF restart determination processing according to the third exemplary embodiment.
Figure 27A:
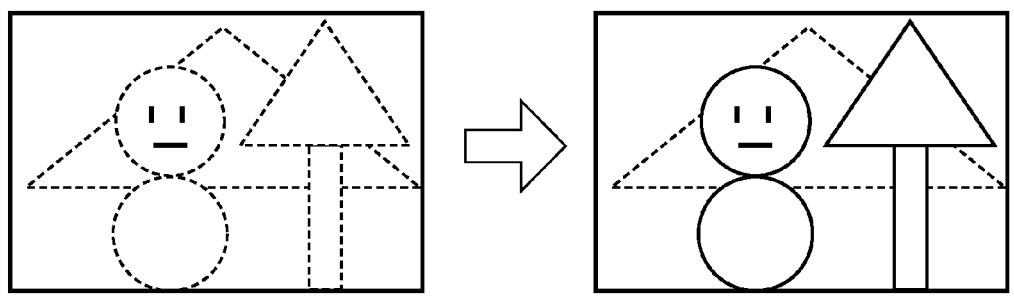
FIGS. 27A and 27B are diagrams for describing a problem about a restart determination.
Figure 27B:
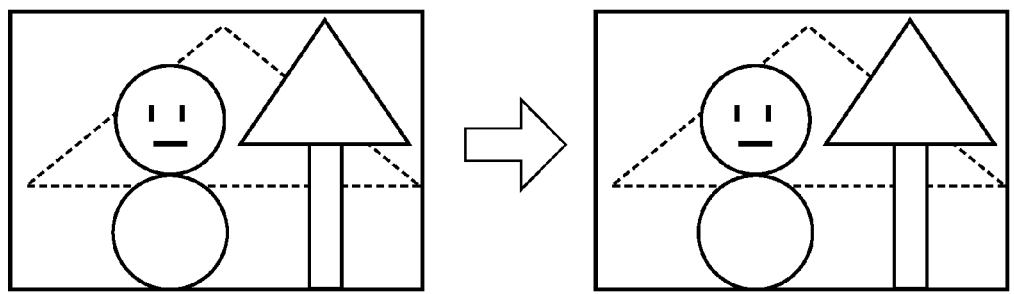

In step S2601 of FIG. 26, the camera control unit 412 may determine that the reliability of the detected focus amount is lower than the predetermined value, i.e., the focus detection result is unusable and only the direction is useable. Even in such a case, similar to the case where the reliability is high, the camera control unit 412 sets the restart condition according to the degree of in-focus. However, if the reliability is lower than the predetermined value, the camera control unit 412 sets a severer condition for performing a restart by using the result of the phase-difference AF, i.e., sets a higher AF restart threshold as compared to when the reliability is high.

Suppose that only the direction is usable. In the table of FIG. 28B, if the degree of focus is determined to be "in-focus" and the same direction is output X2=12 times or more by the focus detection processing in step S404 of FIG. 4, the camera control unit 412 restarts the focus lens 303 in the output direction. If the in-focus state is determined to be a "small blur" and the same direction is output Y2=8 times or more by the focus detection processing in step S404 of FIG. 4, the camera control unit 412 restarts the focus lens 303 in the output direction. If the in-focus state is determined to be a "large blur" and the same direction is output Z2=4 times or more by the focus detection processing in step S404 of FIG. 4, the camera control unit 412 restarts the focus lens 303 in the output direction.

The AF restart thresholds described above are empirically-determined values. The AF restart thresholds are not limited to the foregoing values as long as the relationship of X1>Y1>Z1 and X2>Y2>Z2 holds.

As described above, in the present exemplary embodiment, the camera control unit 412 changes the condition for restarting the focus lens 303 according to the degree of in-focus. If the degree of in-focus is high, the camera control unit 412 sets the AF restart threshold to be higher. Consequently, even if the object temporarily goes off the focus detection area and back or the object blurs or shakes momentarily and a defocus amount beyond the depth is detected, an unnecessary restart can be avoided. Even if the object moves within the screen, another object temporarily comes into the frame, or another object cuts across in front of the object, the camera control unit 412 can perform stable focus control. In the present exemplary embodiment, increasing the AF restart threshold is, put another way, lengthening the period to a restart.

If the degree of in-focus is low, the camera control unit 412 decreases the restart threshold. This enables quick restart if it is almost apparent that the entire screen is blurred and objects are not in the in-focus state. Consequently, if the object goes out of the frame or the scene is changed by panning, the camera control unit 412 can immediately perform a focus control. In the present exemplary embodiment, decreasing the AF restart threshold is, put another way, shortening the period to a restart.

Figure 31:
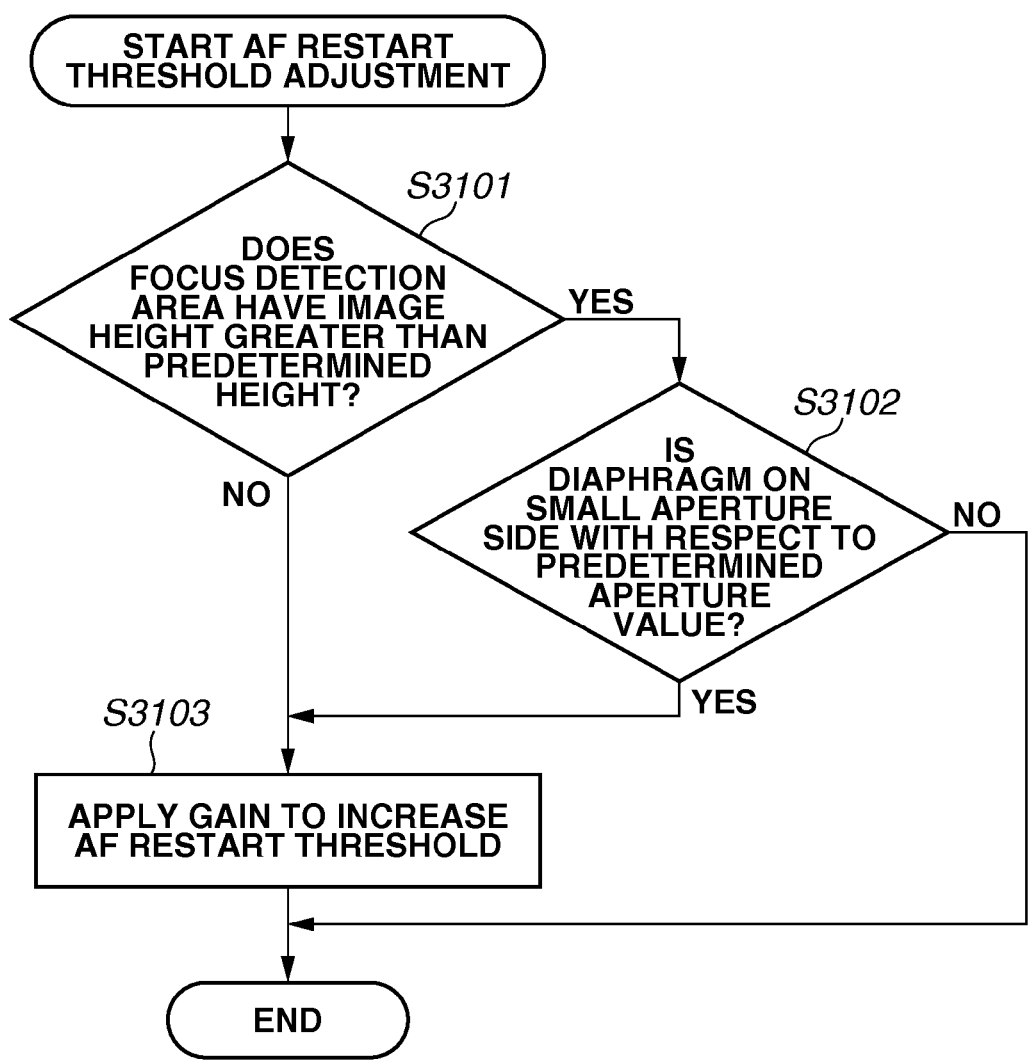
FIG. 31 is a flowchart illustrating AF restart threshold adjustment processing according to the third exemplary embodiment.

Next, the AF restart threshold adjustment processing of step S3006 in FIG. 30 will be described with reference to the flowchart of FIG. 31. In step S3101, the camera control unit 412 determines whether the focus detection area determined in step S507 of FIG. 5 has an image height greater than a predetermined height. If the image height is greater than the predetermined height (YES in step S3101), the camera control unit 412 proceeds to step S3102. If not (NO in step S3101), the camera control unit 412 proceeds to step S3103.

In step S3102, the camera control unit 412 determines whether the diaphragm 302 shows a smaller aperture compared with a predetermined aperture value, based on the obtained aperture value. If the aperture value is smaller (YES in step S3102), the camera control unit 412 proceeds to step S3103. If not (NO in step S3102), the camera control unit 412 ends the processing. In step S3103, the camera control unit 412 applies a gain to increase the AF restart threshold set in steps S3003 to S3005 of FIG. 30, and ends the processing.

The imaging surface phase-difference detection method has the characteristic that while the image height increases, a difference between the amounts of light incident on pupils A and B obtaining the image signals A and B increases typically, and the pupil intensity varies depending on the position within a pupil. At higher image positions, the difference in level between the image signals A and B becomes significant and image matching of the image signals A and B drops, which aggravates the defocus detection accuracy.

The imaging surface phase-difference detection method also has the characteristic that the conversion factor for converting the amount of image deviation between the image signals A and B into the defocus amount increases in conjunction with the aperture value. The reason is that a narrow aperture reduces the base length at which the image signals A and B are focused. At the narrow aperture, the conversion factor therefore become extremely large, so that a small amount of image deviation can be converted into a large defocus amount which deteriorates defocus accuracy.

As described above, (1) if the focus detection area has a large image height or (2) if the diaphragm 302 shows the small aperture, the defocus detection accuracy drops and variations in the detected defocus amount increase. In such a condition, defocus amounts outside the depth are detected more often, and an unexpected AF restart determination can be made, for example, despite the in-focus state. This produces the problem that accidental focusing can occur which lowers the quality of the AF control.

In the foregoing condition, the camera control unit 412 then applies a gain to increase the AF restart threshold so that a restart determination is less likely to be made. This can suppress unnecessary focusing operations due to an unexpected AF restart determination, and improve the quality of the AF control.

In the present exemplary embodiment, the camera control unit 412 changes the AF restart threshold according to the aperture value. The reason is that the conversion factor for converting the amount of image deviation into the defocus amount in the imaging surface phase-difference method increases in principle as the aperture becomes narrower. The camera control unit 412 may therefore change the AF restart threshold according to the conversion factor instead of the aperture value. The camera control unit 412 may be configured to change the AF restart threshold according to other parameters than the aperture value if such parameters can vary the conversion factor.

As described above, in the present exemplary embodiment, when the camera control unit 412 makes a restart determination from the state where the focus lens 303 is stopped, the camera control unit 412 changes the restart condition according to the degree of in-focus based on the imaging signal. If the degree of in-focus is low, it is estimated that the scene is switched or the object is changed. The camera control unit 412 then sets a condition facilitating a restart. This enables quick focus to track the main object, whereby blurs can be suppressed and AF quality is improved. If the degree of in-focus is high, it is estimated that the scene is not changed and the object continues being captured. In such a case, the camera control unit 412 sets a severe restart condition. This can suppress the transition of the focus to objects other than the main object, whereby the main object is likely to be maintained in focus and AF quality is improved.

In the present exemplary embodiment, the camera control unit 412 makes a restart determination according to the number of times a defocus amount is detected. However, the camera control unit 412 may perform control to make a restart determination by using a time period instead of the number of times. For example, the camera control unit 412 may perform control to measure time from when a defocus amount outside the depth is detected or when the reliability becomes lower than a predetermined level, and set an elapsed time as the AF restart threshold.

According to the present exemplary embodiment, when performing an AF control using the imaging surface phase-difference detection method, the camera control unit 412 can make an appropriate focus lens restart determination according to the photographing condition and achieve high-quality focusing.

A fourth exemplary embodiment of the present invention will be described below. In the present exemplary embodiment, a modification is made to the method for the AF restart determination that has been described as a characteristic part of the third exemplary embodiment. In the third exemplary embodiment, when making an AF restart determination, the camera control unit 412 performs an AF restart if a defocus amount outside the depth is detected a predetermined number of times in succession. In the present exemplary embodiment, the threshold of the defocus amount for restarting the focus lens is changed in each in-focus state.

An interchangeable-lens camera including a lens unit and a camera body according to the present exemplary embodiment has a similar configuration to that of the third exemplary embodiment described based on FIG. 25. A description thereof will thus be omitted. The present exemplary embodiment includes processing similar to that described in the first or third exemplary embodiment with reference to the flowcharts of FIGS. 3, 4, 5, 7, and/or 31. A description thereof will be omitted.

Figure 29:
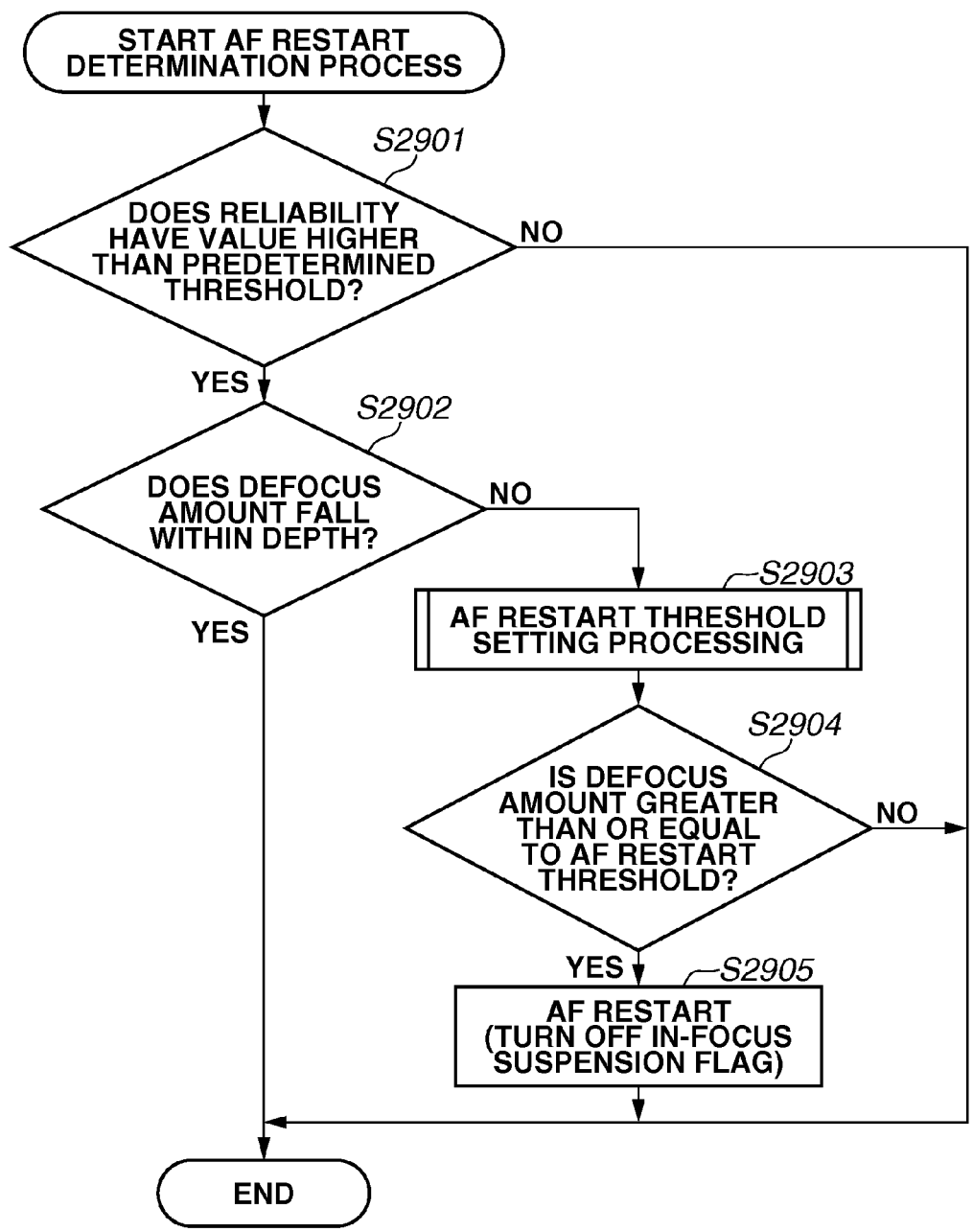
FIG. 29 is a flowchart illustrating AF restart determination processing according to a fourth exemplary embodiment.

The AF restart determination processing of the present exemplary embodiment in step S409 of FIG. 4 will be described with reference to the flowchart of FIG. 29. In step S2901, the camera control unit 412 determines whether the reliability calculated in step S505 of FIG. 5 has a value higher than a predetermined threshold. If the reliability has a value higher than the predetermined threshold (YES in step S2901), the camera control unit 412 proceeds to step S2902. If the reliability has a value lower than the predetermined threshold (NO in step S2901), the camera control unit 412 ends the processing. Like step S2601 of FIG. 26, the predetermined threshold here is set to a value such that the distance calculated from the defocus amount becomes a reliable value.

In step S2902, the camera control unit 412 determines whether the calculated defocus amount falls within the depth. If the defocus amount falls within the depth (YES in step S2902), the camera control unit 412 ends the processing. If the defocus amount falls outside the depth (NO in step S2903), the camera control unit 412 proceeds to step S2903.

In step S2903, the camera control unit 412 performs AF restart threshold setting processing, and proceeds to step S2904. The AF restart threshold setting processing of the present exemplary embodiment in step S2903 will be described in detail below.

In step S2904, the camera control unit 412 determines whether the detected defocus amount is greater than or equal to the AF restart threshold set in step S2903. If the defocus amount is smaller than the AF restart threshold (NO in step S2904), the camera control unit 412 ends the processing. If the defocus amount is greater than or equal to the AF restart threshold (YES in step S2904), the camera control unit 412 proceeds to step S2905. In step S2905, the camera control unit 412 turns off the in-focus suspension flag to restart AF, resumes drive of the focus lens 303, and ends the processing.

Figure 32:
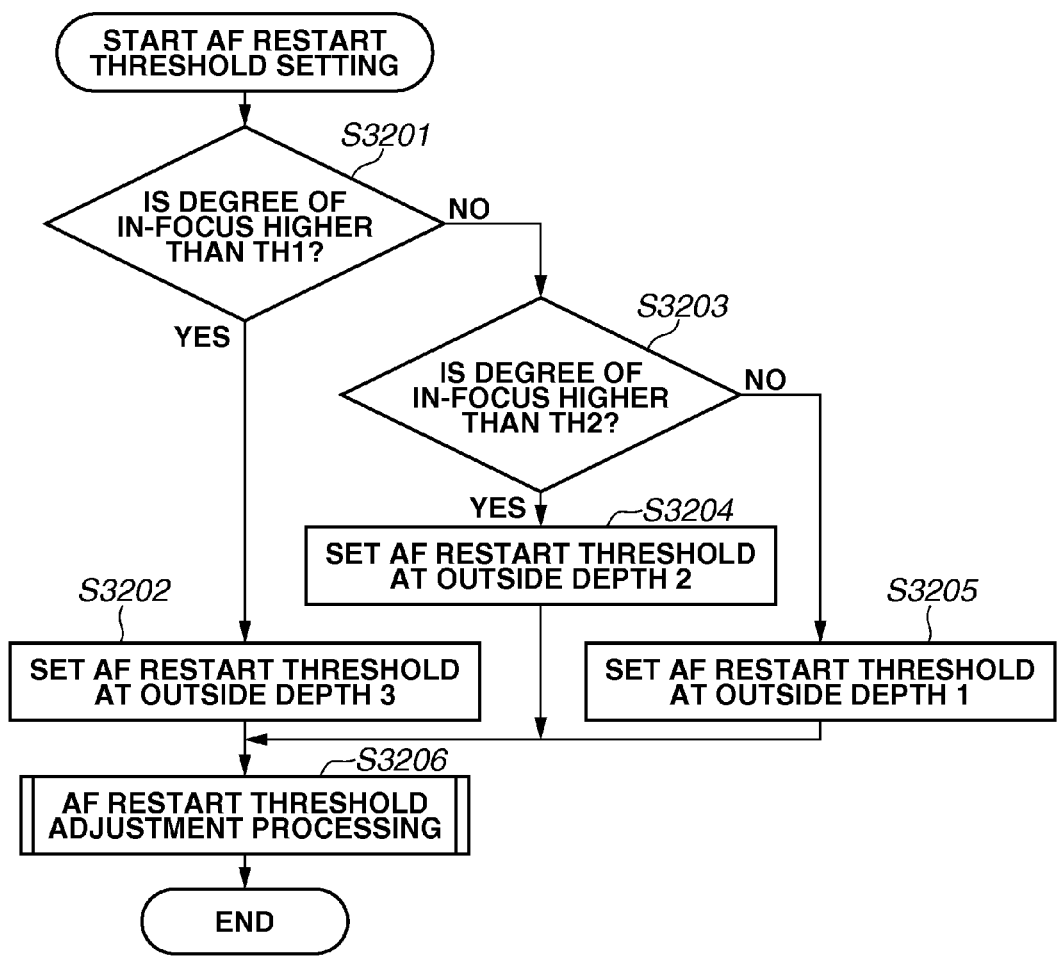
FIG. 32 is a flowchart illustrating AF restart threshold setting processing according to a fourth exemplary embodiment.

Next, the AF restart threshold setting processing in step S2903 of FIG. 29 will be described in detail with reference to FIG. 32. The processing of steps S3201, S3203, and S3206 in FIG. 32 is similar to that of steps S3001, S3002, and S3006 in FIG. 30, respectively. A description thereof will thus be omitted.

Step S3202 corresponds to the case where the degree of focus is determined to be "in-focus." In step S3202, the camera control unit 412 sets the AF restart threshold (defocus amount) to "outside depth 3," and proceeds to step S3206.

Step S3204 corresponds to the case where the degree of in-focus is determined to be a "small blur." In step S3204, the camera control unit 412 sets the AF restart threshold to "outside depth 2," and proceeds to step S3206.

Step S3205 corresponds to the case where the degree of in-focus is determined to be a "large blur." In step S3205, the camera control unit 412 sets the AF restart threshold to "outside depth 1," and proceeds to step S3206.

Figure 33:
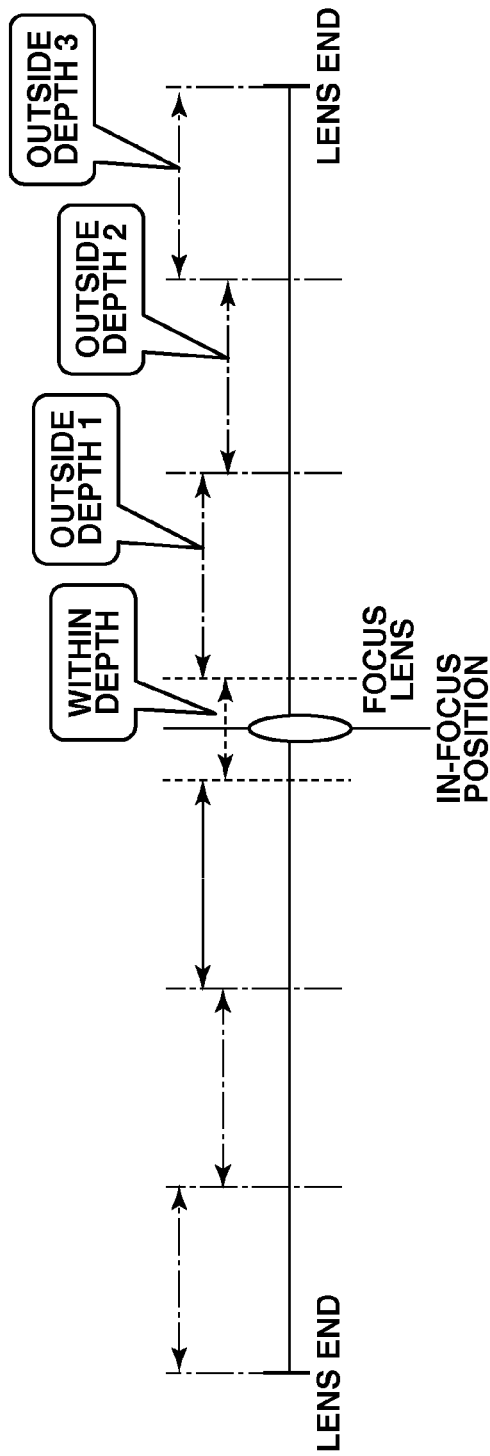
FIGS. 33A and 33B are diagrams illustrating restart conditions according to the fourth exemplary embodiment.

The AF restart thresholds set in the processing of FIG. 32 will be described with reference to FIGS. 33A and 33B. FIG. 33A illustrates the relationship of "outside depth 1," "outside depth 2," and "outside depth 3" serving as the AF restart thresholds. The thresholds of the defocus amount set in the present exemplary embodiment need to satisfy the following condition:

outside depth 3>outside depth 2>outside depth 1.

If the degree of focus is "in-focus," the camera control unit 412 sets the AF restart threshold at "outside depth 3" so that the focus lens 303 is restarted only if the defocus amount is large. This can suppress instability of the focus control due to variations of the defocus amount output when an object is in the in-focus state. If the degree of in-focus is a "large blur," the camera control unit 412 sets the AF restart threshold at "outside depth 1" so that the focus lens 303 is restarted if the defocus amount exceeds the depth. This enables control for quick focus adjustment at the time of a "large blur." The AF restart thresholds are adjusted to facilitate a restart if the main object changes, and suppress an accidental restart if the main object does not change.

As described above, in the present exemplary embodiment, the condition to restart the focus lens 303 is changed according to the degree of in-focus. When performing an AF control using the image surface phase-difference detection method, the camera control unit 412 can thus make an appropriate focus lens restart determination according to the photographing condition and achieve high-quality focusing.

A fifth exemplary embodiment of the present invention will be described below. In the present exemplary embodiment, a modification is made to the method of the AF restart determination that has been described as a characteristic part of the third exemplary embodiment. In the third exemplary embodiment, when making an AF restart determination, the camera control unit 412 performs an AF restart if a defocus amount outside the depth is detected a predetermined number of times in succession. In the present exemplary embodiment, the camera control unit 412 performs control to perform an AF restart if a defocus amount outside the depth (or reliability lower than a predetermined level) is detected a predetermined number of times or more out of a predetermined number of times of focus detection. In other words, according to this control method, the camera control unit 412 performs an AF restart even if a defocus amount outside the depth is not continuously detected.

An interchangeable-lens camera including a lens unit and a camera body according to the present exemplary embodiment has a similar configuration to that described in the third exemplary embodiment with reference to FIG. 25. A description thereof will thus be omitted. In the present exemplary embodiment, the operation of the camera body 20 is performed by processing similar to that described in the first or third exemplary embodiment with reference to the flowcharts of FIGS. 3, 4, 5, 7, 30, and/or 31. A description thereof will thus be omitted.

Figure 34:
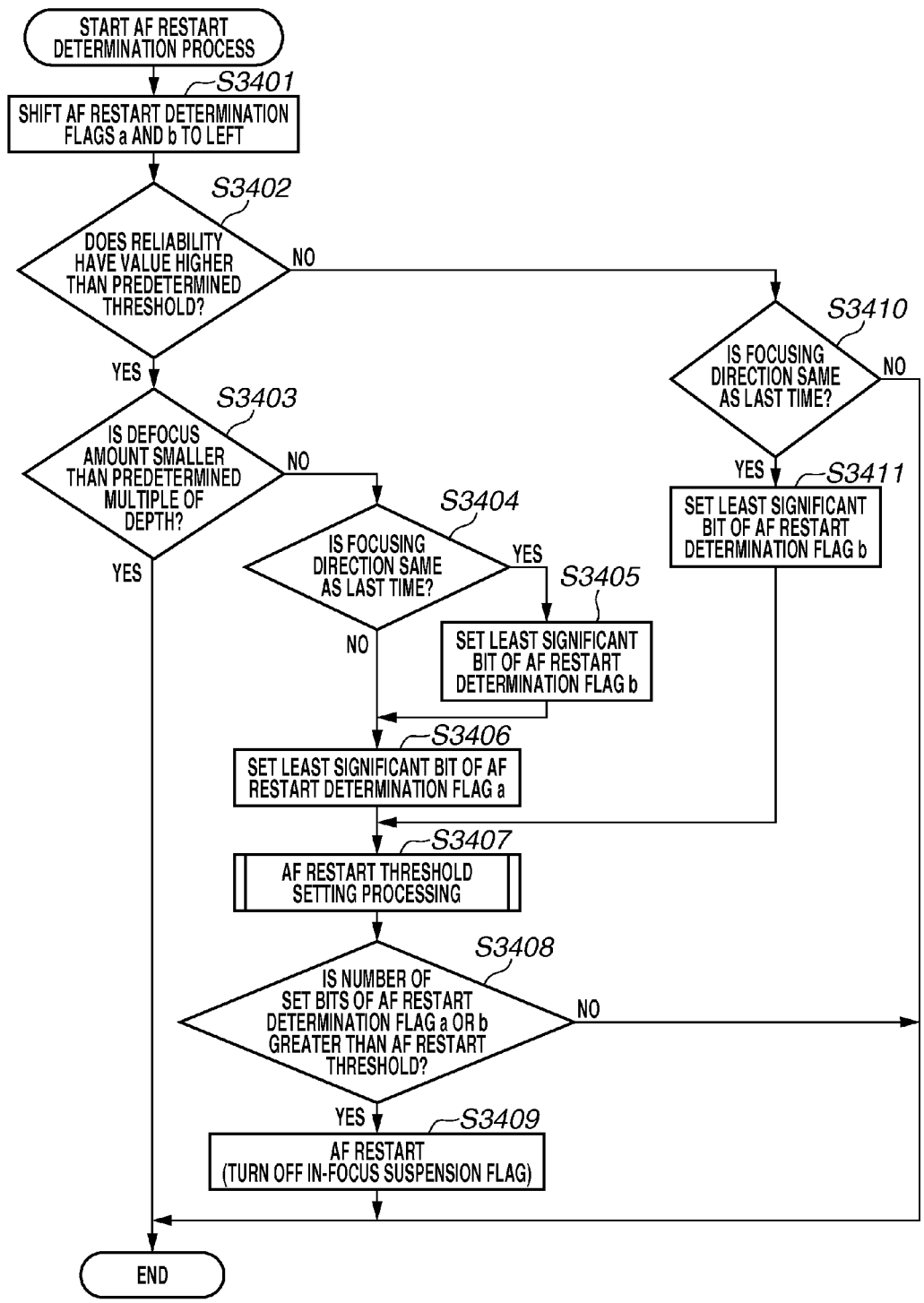
FIG. 34 is a flowchart illustrating AF restart determination processing according to a fifth exemplary embodiment.

The AF restart determination processing of the present exemplary embodiment in step S409 of FIG. 4 will be described with reference to the flowchart of FIG. 34. The processing of step S3402, S3403, S3407, and S3409 in FIG. 34 is similar to that of steps S2601, S2602, S2610, and S2612 in FIG. 26 according to the third exemplary embodiment, respectively. A description thereof will thus be omitted. The processing of this flow is performed by the camera control unit 412 (lens restart determination unit 413) unless otherwise specified.

In step S3401, the camera control unit 412 shifts AF restart determination flags a and b to the left, and proceeds to step S3402. The processing of step S3401 enables referring to the number of times of focus detection.

If in step S3402 the reliability is higher than a predetermined threshold (YES in step S3402) and if in step S3403 the defocus amount is greater than a predetermined multiple of the depth (NO in step S3403), the camera control unit 412 proceeds to step S3404. In step S3404, the camera control unit 412 determines whether the focusing direction based on the result of the phase-difference detection is the same as last time. If the focusing direction is the same as last time (YES in step S3404), the camera control unit 412 proceeds to step S3405. If the focusing direction is not the same as last time (NO in step S3404), the camera control unit 412 proceeds to step S3406. In step S3405, the camera control unit 412 sets the least significant bit of the AF restart determination flag b, and proceeds to step S3406. In step S3406, the camera control unit 412 sets the least significant bit of the AF restart determination flag a, and proceeds to step S3407.

In step S3402, if the reliability is lower than the predetermined threshold (NO in step S3402), the camera control unit 412 proceeds to step S3410. In step S3410, the camera control unit 412 determines whether the focusing direction based on the result of the phase-difference detection is the same as last time. If the focusing direction is the same as last time (YES in step S3410), the camera control unit 412 proceeds to step S3411. In step S3411, the camera control unit 412 sets the least significant bit of the AF restart determination flag b, and proceeds to step S3407. If the focusing direction is not the same as last time (NO in step S3410), the camera control unit 412 ends the processing.

In step S3407, the camera control unit 412 sets an AF restart threshold, and proceeds to step S3408. In step S3408, the camera control unit 412 determines whether the number of set bits of the AF restart determination flag a or b is greater than or equal to the AF restart threshold. Here, if the reliability is high and the defocus amount falls outside the depth, the camera control unit 412 makes the determination by using the AF restart determination flag a. If the reliability is low, the camera control unit 412 makes the determination by using the AF restart determination flag b. If the condition of step S3408 is satisfied (YES in step S3408), the camera control unit 412 proceeds to step S3409. If not (NO in step S3408), the camera control unit 412 ends the processing.

In the third exemplary embodiment, the camera control unit 412 makes the AF restart determination by using the AF restart counters a and b. In the present exemplary embodiment, the camera control unit 412 uses the AF restart determination flags a and b instead of the AF restart counters a and b. In step S3401, the camera control unit 412 shifts the AF restart determination flags a and b to the left each time an AF restart determination is made, regardless of the detected defocus amount or reliability. If the detected defocus amount is greater than a predetermined level or the obtained direction is the same as last time, the camera control unit 412 sets the least significant bit(s) of the AF restart determination flag(s) a and/or b in steps S3405, S3406, and/or S3411. Consequently, the camera control unit 412 can handle the AF restart determination flags a and b to check how many bits are set among all the bits, as indexes for indicating the number of times the detected defocus amount has exceeded a predetermined value in a predetermined number of times of focus detection in the past (reliability was low). The numbers of bits of the AF restart determination flags a and b correspond to the number of times the camera control unit 412 has detected a defocus amount for making an AF restart determination in step S3408. The numbers of bits need to be set to be greater than a maximum possible AF restart threshold set by the AF restart threshold setting in step S3407. For example, suppose that the AF restart determination flag a is set to four bits and the AF restart threshold is set to three. If a defocus amount greater than a predetermined amount has been detected three times or more in the past four times of focus detection, the camera control unit 412 performs control to perform a restart.

The AF restart determination method according to the present exemplary embodiment can perform an AF restart even if a defocus amount greater than a predetermined amount is not continuously detected. A restart is thus easier than in the third exemplary embodiment. As advantages of the AF restart determination method according to the present exemplary embodiment, a restart can be easier performed in a case of a photographing condition where the defocus detection accuracy is low, such as when imaging is performed under low illumination or when the object has low contrast. The technique of the third exemplary embodiment can suppress erroneous determinations but has the following disadvantage. The detection result varies more greatly in a photographing condition where the defocus detection accuracy drops. For example, in a condition where a quick restart is desired in a "large blur" state, a defocus amount within the depth may be temporarily detected. In such a case, it takes a long time to perform a restart. In contrast, according to the technique of the present exemplary embodiment, an AF restart can be performed without continuously detecting a defocus amount greater than a predetermined level. This can facilitate a restart in a restart-desired scene, which improves the quality of the AF control.

Meanwhile, an AF restart determination may be performed by using the AF restart determinations of the third and fourth exemplary embodiments together with that of the fifth exemplary embodiment.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-228317 filed Nov. 1, 2013, and No. 2013-228318 filed Nov. 1, 2013, which are hereby incorporated by reference herein in their entirety.

What is claimed is:

1. A focus adjustment apparatus comprising:
An image sensor configured to capture an image formed by a photographing optical system including a focus lens;
a processor; and
a first memory containing instructions that, when executed by the processor, cause the processor to perform operations comprising:
setting focus detection areas corresponding to respective areas of the image sensor,
detecting, as a first detecting, a focus state which includes a defocus amount and a focusing direction of each of the focus detection areas by detecting a phase difference between a pair of image signals output from the mage sensor,
detecting, as a second detecting, contrast information of the focus detection areas based on signals output from the image sensor, and
controlling driving of the focus lens based on a detection result of at least one of the first detecting and the second unit detecting,
wherein, in a case where a reliability of a detection result of the first detecting is lower than a second level, controlling includes determining whether a number of detection areas where the detection result of the first detecting indicates a reliability that is higher than a reliability indicated by a first level is greater than or equal to a first threshold,
wherein, determining a number of detection areas where a detection result of the first detecting indicates a reliability that is higher than a reliability indicated by a first level is greater than or equal to the first threshold, controlling the driving of the focus lens by using the detection result of the first detecting,
wherein the second level is set to value such that the defocus amount and the focusing direction each have a reliability that is higher than a predetermined value, and the first level is set to a value such that the focusing direction has a reliability that is higher than a predetermined value.

2. The focus adjustment apparatus according to claim 1, wherein the first threshold is set lower in case of a first degree of in-focus than in case of a second degree of in-focus, wherein the degree of in-focus is determined based on the contrast information and the second degree of in-focus is higher than the first degree of in-focus.

3. The focus adjustment apparatus according to claim 1, wherein, in, in a case where a number of detection areas where the detection result of the first detecting indicates a reliability that is higher than a reliability indicated by a first level is greater than or equal to a first threshold, controlling includes controlling driving of the focus lens based on the second detection result.

4. The focus adjustment apparatus according to claim 1, wherein areas where the contrast information is detected correspond to the focus detection area.

5. The focus adjustment apparatus according to claim 1, wherein the image sensor is configured to include a plurality of photoelectric conversion elements under a microlens, and the plurality of photoelectric conversion elements is configured to receive light fluxes passed through respective different exit pupil areas of the photographing optical system.

6. A focus adjustment apparatus comprising:
an image sensor configured to capture an image formed by a photographing optical system including a focus lens;
a processor; and
a memory containing instructions that, when executed by the processor, cause the processor to perform operations comprising:
setting focus detection areas corresponding to respective areas of the image sensor, detecting, as a first detecting, a focus state which includes a defocus amount and a focusing direction of each of the focus detection areas by detecting a phase difference between a pair of image signals output from the image sensor, detecting, as a second detecting, contrast information of the focus detection areas based on signals output from the image sensor, and controlling driving of the focus lens based on a detection result of at least one of first detecting and the second detecting, wherein, in a case where the detection result of the first detecting satisfies a first condition, controlling includes controlling driving of the focus lens by using the detection result of the first detecting, wherein, in a case where a number of detection areas where a detection result of the first detecting indicates a reliability that is higher than a reliability indicated by a first level is greater than or equal to a first threshold, the first condition is satisfied, and wherein the first threshold is set lower in case of a first degree of in-focus than in case of a second degree of in-focus, wherein the degree of in-focus is determined based on the contrast information and the second degree of in-focus is higher than the first degree of in-focus.

7. The focus adjustment apparatus according to claim 6, wherein, in a case where the reliability indicated by the detection result of the first detecting in the detection area used to drive the focus lens is lower than a reliability indicated by a second level, controlling includes determining whether the detection result satisfies the first condition, and wherein the reliability indicated by the second level is higher than the reliability indicated by the first level.

8. The focus adjustment apparatus according to claim 7, wherein controlling includes detecting a defocus amount and a focusing direction based on the detection results of the first detecting in the plurality of detection areas, and wherein the second level is set to a value such that the defocus amount has a reliability that is higher than a predetermined value, and the first level is set to a value such that at least the focusing direction has a reliability that is higher than a predetermined value.

9. A focus adjustment apparatus comprising:
an image sensor configured to capture an image formed by a photographing optical system including a focus lens;
a processor; and
a memory containing instructions that, when executed by the processor, cause the processor to perform operations comprising:
setting focus detection areas corresponding to respective areas of the image sensor,
detecting, as a first detecting, a focus state which includes a defocus amount and a focusing direction of each of the focus detection areas by detecting a phase difference between a pair of image signals output from the image sensor,
detecting, as a second detecting, contrast information of the focus detection areas based on signals output from the image sensor, and
controlling driving of the focus lens based on a detection result of at least one of the first detecting and the second detecting, wherein, in a case where a number of detection areas where a detection result of the first detecting indicates a reliability that is higher than a reliability indicated by a first level is greater than or equal to a first threshold, the first condition is satisfied, wherein the photographing optical system is configured to further include a zoom lens, and wherein, in a case where the zoom lens is being driven, controlling includes setting the first threshold to be higher than when the zoom lens is stopped.

10. The focus adjustment apparatus according to claim 9, wherein, in a case where the zoom lens is being driven, controlling includes setting the first threshold so that, as a degree of in-focus determined based on the contrast information becomes higher, the first threshold becomes higher.

11. The focus adjustment apparatus according to claim 9, wherein, in a case where the zoom lens is being driven and the detection result of the first detecting satisfies the first condition, controlling includes controlling the driving of the focus lens based on the detection results of the first detecting and the second detecting.

12. The focus adjustment apparatus according to claim 9, wherein, in a case where the zoom lens is being driven and a degree of in-focus determined based on the contrast information is lower than a predetermined degree, controlling includes controlling the driving of the focus lens based on the detection results of the first detecting and the second detecting.

13. A method for controlling a focus adjustment apparatus having an image sensor configured to capture an image formed by a photographing optical system including a focus lens, the method comprising:
setting focus detection areas corresponding to respective areas of the image sensor;
detecting, as a first detecting, a focus state which includes a defocus amount and a focusing direction of each of the focus detection areas by detecting a phase difference between a pair of image signals output from the image sensor;
detecting, as a second detecting, contrast information of the focus detection areas based on signals output from the image sensor; and
controlling driving of the focus lens based on a detection result of at least one of the first detecting and the second detecting, wherein, in a case where a reliability of a detection result of the first detecting is lower than a second level, controlling includes determining whether a number of detection areas where the detection result of the first detecting indicates a reliability that is higher than a reliability indicated by a first level is greater than or equal to a first threshold, wherein, determining a number of detection areas where a detection result of the first detecting indicates a reliability that is higher than a reliability indicated by a first level is greater than or equal to the first threshold, controlling the driving of the focus lens by using the detection result of the first detecting, wherein the second level is set to a value such that the defocus amount and the focusing direction each have a reliability that is higher than a predetermined value, and the first level is set to a value such that the focusing direction has a reliability that is higher than a predetermined value.

14. A method for controlling a focus adjustment apparatus having an image sensor configured to capture an image formed by a photographing optical system including a focus lens, the method comprising:
- setting focus detection areas corresponding to respective areas of the image sensor;
- detecting, as a first detecting, a focus state which includes a defocus amount and a focusing direction of each of the focus detection areas by detecting a phase difference between a pair of image signals output from the image sensor;
- detecting, as a second detecting, contrast information of the focus detection areas based on signals output from the image sensor; and
- controlling driving of the focus lens based on a detection result of at least one of first detecting and the second detecting,
- wherein, in a case where the detection result of the first detecting satisfies a first condition, controlling includes controlling driving of the focus lens by using the detection result of the first detecting,
- wherein, in a case where a number of detection areas where a detection result of the first detecting indicates a reliability that is higher than a reliability indicated by a first level is greater than or equal to a first threshold, the first condition is satisfied, and
- wherein the first threshold is set lower in case of a first degree of in-focus than in case of a second degree of in-focus, wherein the degree of in-focus is determined based on the contrast information and the second degree of in-focus is higher than the first degree of in-focus.

15. A method for controlling a focus adjustment apparatus having an image sensor configured to capture an image formed by a photographing optical system including a focus lens, the method comprising:
- setting focus detection areas corresponding to respective areas of the image sensor;
- detecting, as a first detecting, a focus state which includes a defocus amount and a focusing direction of each of the focus detection areas by detecting a phase difference between a pair of image signals output from the image sensor;
- detecting, as a second detecting, contrast information of the focus detection areas based on signals output from the image sensor; and
- controlling driving of the focus lens based on a detection result of at least one of the first detecting and the second detecting,
- wherein, in a case where a number of detection areas where a detection result of the first detecting indicates a reliability that is higher than a reliability indicated by a first level is greater than or equal to a first threshold, the first condition is satisfied,
- wherein the photographing optical system is configured to further include a zoom lens, and
- wherein, in a case where the zoom lens is being driven, controlling includes setting the first threshold to be higher than when the zoom lens is stopped.

* * * * *